US009671016B2

(12) United States Patent
Nakayama

(10) Patent No.: US 9,671,016 B2
(45) Date of Patent: Jun. 6, 2017

(54) POWER PLANT

(71) Applicant: HONDA MOTOR CO., LTD., Tokyo (JP)

(72) Inventor: Shigeru Nakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/117,369

(22) PCT Filed: Jun. 10, 2015

(86) PCT No.: PCT/JP2015/066744
§ 371 (c)(1),
(2) Date: Aug. 8, 2016

(87) PCT Pub. No.: WO2015/190523
PCT Pub. Date: Dec. 17, 2015

(65) Prior Publication Data
US 2016/0341307 A1 Nov. 24, 2016

(30) Foreign Application Priority Data

Jun. 10, 2014 (JP) .................................. 2014-119984
Jun. 10, 2014 (JP) .................................. 2014-119985
Jun. 10, 2014 (JP) .................................. 2014-119986

(51) Int. Cl.
*B60K 17/30* (2006.01)
*F16H 61/4035* (2010.01)
(Continued)

(52) U.S. Cl.
CPC .......... *F16H 61/4035* (2013.01); *B60K 6/00* (2013.01); *B60K 17/16* (2013.01); *B60K 17/165* (2013.01);
(Continued)

(58) Field of Classification Search
CPC ..... B60K 17/356; B60K 17/34; B60K 17/354
See application file for complete search history.

(56) References Cited

U.S. PATENT DOCUMENTS 6,024,182 A * 2/2000 Hamada .................... B60K 1/00
180/243
6,125,953 A * 10/2000 Arai ........................ B60K 6/365
180/243
(Continued)

FOREIGN PATENT DOCUMENTS

| JP | 2001-199254 A | 7/2001 |
| JP | 2005-282597 A | 10/2005 |
| JP | 2013-204605 A | 10/2013 |

OTHER PUBLICATIONS

International Search Report & Written Opinion dated Sep. 1, 2015 corresponding to International Patent Application No. PCT/JP2015/066744 and English translation thereof.

*Primary Examiner* — Derek D Knight
(74) *Attorney, Agent, or Firm* — Squire Patton Boggs (US) LLP

(57) ABSTRACT

When a second member of a power plant is in a first position with respect to a first member, a first communication port communicates with a fluid pressure supply source and second and third communication ports communicate with first and second pressure chambers of a fluid pressure motor. The second and third communication ports are shut off from a fourth communication port connected to a reservoir. Different positions of the second member result different communication and shut off relationships among the first to fourth ports. The first to fourth communication ports are provided in a plurality of communication port groups each formed by the first to fourth communication ports.

15 Claims, 43 Drawing Sheets

(51) Int. Cl.
| | |
|---|---|
| *B60K 17/16* | (2006.01) |
| *B60K 17/356* | (2006.01) |
| *B62D 11/18* | (2006.01) |
| *F16H 48/27* | (2012.01) |
| *B60K 6/00* | (2006.01) |
| *F16H 39/02* | (2006.01) |
| *F16H 47/04* | (2006.01) |
| *F16H 48/10* | (2012.01) |
| *F16H 48/36* | (2012.01) |
| *F16H 61/433* | (2010.01) |
| *H02K 7/116* | (2006.01) |
| *B62D 11/24* | (2006.01) |
| *F16H 39/00* | (2006.01) |

(52) U.S. Cl.
CPC ............ *B60K 17/30* (2013.01); *B60K 17/356* (2013.01); *B62D 11/18* (2013.01); *B62D 11/183* (2013.01); *B62D 11/24* (2013.01); *F16H 39/02* (2013.01); *F16H 47/04* (2013.01); *F16H 48/10* (2013.01); *F16H 48/27* (2013.01); *F16H 48/36* (2013.01); *F16H 61/433* (2013.01); *H02K 7/116* (2013.01); *B60Y 2300/045* (2013.01); *B60Y 2400/84* (2013.01); *F16H 2039/005* (2013.01); *F16H 2048/104* (2013.01); *F16H 2048/106* (2013.01); *F16H 2048/364* (2013.01)

(56) References Cited

U.S. PATENT DOCUMENTS

| | | | | |
|---|---|---|---|---|
| 2013/0152570 | A1* | 6/2013 | Hoshinoya | B60K 6/387 60/396 |
| 2015/0045170 | A1* | 2/2015 | Ohmura | F16H 48/42 475/221 |
| 2016/0312873 | A1* | 10/2016 | Nakayama | F16H 48/10 |

* cited by examiner

· VALVE ELEMENT ROTATIONAL ANGLE POSITION θVA: NEUTRAL POSITION

F I G. 1 4
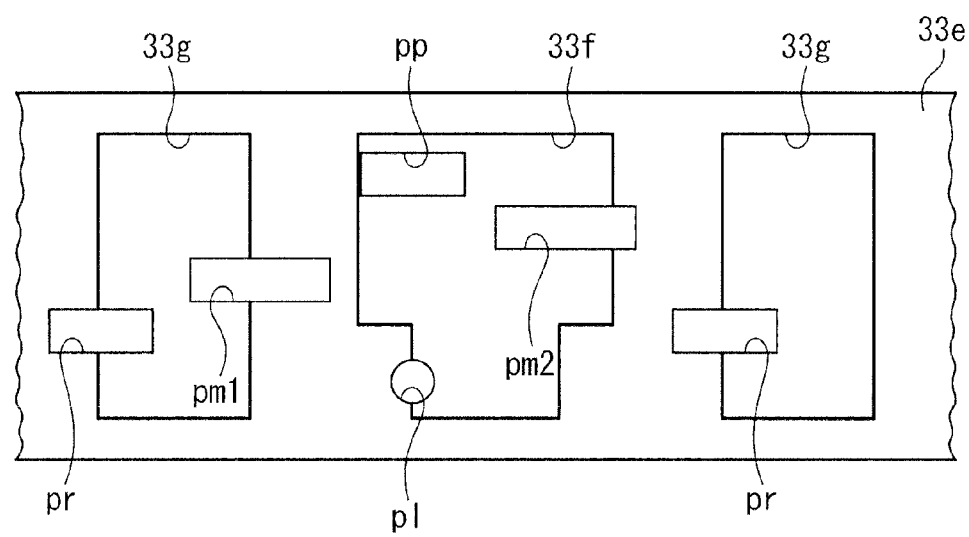

- $TRL = TIL - LOP/2 + TFM/2$
- $TRR = TIR - LOP/2 - TFM/2$

· TRL = TRR = TIL − LOP/2 + TCD/2

· SH MODE (LEFT TURNING : NWRL < NWRR)

· TRL = TIL − LOP/2 − TOM/2
· TRR = TIR − LOP/2 + TOM/2

·LSD MODE (LEFT TURNING: NWRL＜NWRR)

· TRL＝TIL−LOP/2＋TOM/2
· TRR＝TIR−LOP/2−TOM/2

- BAD ROAD TRAVELING-TIME LSD MODE (NWRL<NWRR)

· TRL = TIL − LOP/2 + TCD/2 + TOM/2
· TRR = TIR − LOP/2 + TCD/2 − TOM/2

·SH MODE

·LSD MODE

FIG. 45 · BAD ROAD TRAVELING-TIME LSD MODE (LEFT TURNING: NWRL<NWRR)

POWER PLANT

FIELD OF THE INVENTION

The present invention relates to a power plant that drives left and right wheels of a vehicle.

BACKGROUND ART

Conventionally, as a power plant of this kind, there has been known one disclosed e.g. in PTL 1. This power plant includes an internal combustion engine as a drive source, a differential gear for transmitting the motive power of the engine to left and right wheels of a vehicle, a hydraulic motor for adjusting torques of the left and right wheels, and a hydraulic pump for supplying hydraulic pressure to the hydraulic motor. The hydraulic motor includes a cylinder block and a cam ring which are rotatable relative to each other. The cylinder block is connected to the left wheel and the cam ring is connected to the right wheel, respectively.

Further, the hydraulic motor includes a first supply/discharge oil passage and a second supply/discharge oil passage. The first and second supply/discharge oil passages are connected to a first port and a second port of an electromagnetic switching valve of a spool type via first and second communication oil passages, respectively. Further, a valve element of the electromagnetic switching valve is movable between a neutral position, a first operating position, and a second operating position, and a third port and a fourth port of the electromagnetic switching valve are connected to the hydraulic pump and a reservoir, respectively. Each of the first to fourth ports is formed by a single port, and an operation of the electromagnetic switching valve is controlled by a controller.

In the power plant constructed as above, the driving force of the engine is transmitted to the left and right wheels via the differential gear. Further, the valve element of the electromagnetic switching valve is controlled to the neutral position, the first operating position or the second operating position, according to operating conditions of the vehicle, detected by sensors. When the valve element of the electromagnetic switching valve is controlled to the neutral position, the supply and discharge of hydraulic pressure between the hydraulic pump and the hydraulic motor is stopped by the electromagnetic switching valve, whereby the rotational output of the hydraulic motor is disabled. Further, when the valve element of the electromagnetic switching valve is controlled to the first or second position, rotating forces in opposite directions to each other are applied to the cylinder block and the cam ring, whereby the driving force distributed to the left and right wheels is changed.

CITATION LIST

Patent Literature 1

[PTL 1] Japanese Laid-Open Patent Publication (Kokai) No. 2005-282597

SUMMARY OF INVENTION

Technical Problem

As described above, in the conventional power plant, each of the first to fourth ports is formed by a single port. Therefore, the flow rate (flow velocity) of oil flowing through the ports becomes relatively large, causing an increase in loss. Further, when the ports are blocked or narrowed by foreign matter mixed in oil, hydraulic pressure supplied to the hydraulic motor becomes insufficient, which prevents the power plant from operating properly, and hence it is impossible to obtain high robustness.

The present invention has been made to provide a solution to the above-described problems, and an object thereof is to provide a power plant which is capable of reducing loss caused in a fluid passage switching mechanism, and enhancing robustness of the power plant.

Solution to Problem

To attain the above object, the invention according to claim 1 is a power plant 1, 51 that drives left and right wheels (left and right rear wheels WRL, WRR in embodiments (the same applies hereinafter in this section)) of a vehicle V, comprising a drive source (rotating electric machine 11), a differential gear (transmission system 12, transmission system 52) that includes a first rotary element (speed reduction sun gear SD, ring gear RD') mechanically connected to the drive source, a second rotary element (left sun gear SL, sun gear SD') mechanically connected to one (left rear wheel WRL) of the left and right wheels, and a third rotary element (right sun gear SR, carrier CD') mechanically connected to the other (right rear wheel WRR) of the left and right wheels, a fluid pressure motor (hydraulic motor 13) that includes a first pressure chamber 13$b$ and a second pressure chamber 13$c$ which communicate with a fluid pressure supply source (hydraulic pump 14) for pumping fluid, respectively, and is configured such that fluid pressure is supplied to the first pressure chamber 13$b$, and the supplied fluid pressure is discharged into the second pressure chamber 13$c$ to thereby apply a positive torque to the third rotary element, and that fluid pressure is supplied to the second pressure chamber 13$c$, and the supplied fluid pressure is discharged into the first pressure chamber 13$b$ to thereby apply a negative torque to the third rotary element, and a fluid passage switching mechanism (switching valve 33$a$) that is arranged on a fluid passage communicating between the fluid pressure supply source and the first pressure chamber 13$b$ and on a fluid passage communicating between the fluid pressure supply source and the second pressure chamber 13$c$, to switch communication and shutoff of the fluid passages, wherein the fluid passage switching mechanism includes a first member (sleeve 33$d$) that is provided with a first communication port (inflow port pp) to which is connected a fluid supply passage (first oil passage OL1) communicating with the fluid pressure supply source, a second communication port (first motor port pm1) to which is connected a first fluid passage (second oil passage OL2) communicating with the first pressure chamber 13$b$, a third communication port (second motor port pm2) to which is connected a second fluid passage (third oil passage OL3) communicating with the second pressure chamber 13$c$, and a fourth communication port (return port pr) to which is connected a fluid discharge passage (fourth oil passage OL4) communicating with a reservoir (reservoir 31) which stores the fluid, and a second member (valve element 33$e$) that is provided in a manner movable to a first position, a second position, and a third position with respect to the first member, for switching communicating states and shut-off states between the first to fourth communication ports, wherein the fluid supply passage, the first fluid passage, the second fluid passage, and the fluid discharge passage form the fluid passages, wherein the fluid passage switching mechanism is configured such that when the second member is in the first position, the first communication port and the second communication port are placed in a state communicating with each other, the first communication port and the third communication port are placed in a state communicating with each other, the second communication port and the fourth communication port are placed in a state shut off from each other, and the third communication port and the fourth communication port are placed in a state shut off from each other, when the second member is in the second position, the first communication port and the second communication port are placed in the state communicating with each other, the first communication port and the third communication port are placed in a state shut off from each other, the second communication port and the fourth communication port are placed in the state shut off from each other, and the third communication port and the fourth communication port are placed in a state communicating with each other, and when the second member is in the third position, the first communication port and the second communication port are placed in a state shut off from each other, the first communication port and the third communication port are placed in the state communicating with each other, the second communication port and the fourth communication port are placed in a state communicating with each other, and the third communication port and the fourth communication port are placed in the state shut off from each other, and wherein the first member is provided with a plurality of communication port groups, each formed by the first to fourth communication ports.

With this arrangement, the driving force of the drive source is transmitted to the left and right wheels via the first to third rotary elements of the differential gear, whereby the left and right wheels are driven. Further, the fluid pressure from the fluid pressure supply source is supplied to the first pressure chamber of the fluid pressure motor, and the supplied fluid pressure is discharged into the second pressure chamber of the fluid pressure motor, whereby the positive torque is applied to the other of the left and right wheels via the third rotary element. Further, the fluid pressure from the fluid pressure supply source is supplied to the second pressure chamber, and the supplied fluid pressure is discharged into the first pressure chamber, whereby the negative torque is applied from the fluid pressure motor to the other of the left and right wheels via the third rotary element. From the above, since a torque difference is generated between the left and right wheels, it is possible to enhance the turnability and traveling stability of the vehicle.

The communication and shutoff between the fluid passages are switched by the fluid passage switching mechanism that is arranged on the fluid passage communicating between the fluid pressure supply source and the first pressure chamber, and on the fluid passage communicating between the fluid pressure supply source and the second pressure chamber. The fluid passage switching mechanism includes the first member and the second member. The first member is provided with the first communication port to which is connected the fluid supply passage communicating with the fluid pressure supply source, the second communication port to which is connected the first fluid passage communicating with the first pressure chamber of the fluid pressure motor, the third communication port to which is connected the second fluid passage communicating with the second pressure chamber of the fluid pressure motor, and the fourth communication port to which is connected the fluid discharge passage communicating with the reservoir which stores the fluid. Further, the second member is provided in a manner movable to the first position, the second position, and the third position, with respect to the first member. The communicating states and the shut-off states between the first to fourth communication ports are changed by the second member.

In the fluid passage switching mechanism, when the second member is in the first position, the first communication port and the second communication port are placed in the state communicating with each other, the first communication port and the third communication port are placed in the state communicating with each other, the second communication port and the fourth communication port are placed in the state shut off from each other, and the third communication port and the fourth communication port are placed in the state shut off from each other. Therefore, by bringing the second member to the first position, it is possible to properly supply the fluid supplied from the fluid pressure supply source to the first communication port via the fluid supply passage, to the first pressure chamber via the second communication port and the first fluid passage, and properly supply the fluid to the second pressure chamber via the third communication port and the second fluid passage. Thus, the fluid pressure can be properly supplied to both the first and second pressure chambers, and hence it is possible to prevent a torque from being actively applied from the fluid pressure motor to the other of the left and right wheels, whereby it is possible to ensure excellent straight-advancing performance of the vehicle.

Further, in the fluid passage switching mechanism, when the second member is in the second position, the first communication port and the second communication port are placed in the state communicating with each other, the first communication port and the third communication port are placed in the state shut off from each other, the second communication port and the fourth communication port are placed in the state shut off from each other, and the third communication port and the fourth communication port are placed in the state communicating with each other. Therefore, by bringing the second member to the second position, it is possible to properly supply the fluid supplied from the fluid pressure supply source to the first communication port via the fluid supply passage, to the first pressure chamber via the second communication port and the first fluid passage, and properly discharge the fluid pressure supplied to the first pressure chamber to the reservoir via the second pressure chamber, the second fluid passage, the third communication port, the fourth communication port, and the fluid discharge passage, so that it is possible to properly apply the positive torque from the fluid pressure motor to the other of the left and right wheels.

Furthermore, in the fluid passage switching mechanism, when the second member is in the third position, the first communication port and the third communication port are placed in the state communicating with each other, the first communication port and the second communication port are placed in the state shut off from each other, the third communication port and the fourth communication port are placed in the state shut off from each other, and the second communication port and the fourth communication port are placed in the state communicating with each other. Therefore, by bringing the second member to the third position, it is possible to properly supply the fluid supplied from the fluid pressure supply source to the first communication port via the fluid supply passage, to the second pressure chamber via the third communication port and the second fluid passage, and properly discharge the fluid pressure supplied to the second pressure chamber to the reservoir via the first pressure chamber, the first fluid passage, the second communication port, the fourth communication port, and the fluid discharge passage, so that it is possible to properly apply the negative torque from the fluid pressure motor to the other of the left and right wheels.

Further, differently from the above-described conventional power plant, there are provided the plurality of communication port groups, each formed by the first to fourth communication ports, so that each port is provided in plurality, and hence it is possible to reduce the flow rate (flow velocity) of fluid flowing through the communication ports, which in turn makes it possible to reduce loss. Further, even in such a case where one of the plurality of communication port groups is blocked or narrowed by foreign matter mixed in the fluid, the fluid can be supplied to the fluid pressure motor via the ports of the other groups, and hence it is possible to properly operate the power plant, thereby making it possible to enhance robustness thereof.

The invention according to claim 2 is the power plant 1, 51 according to claim 1, wherein an accommodation hole having a cylindrical curved surface is formed in an inner periphery of the first member, wherein the second member is formed into a cylindrical shape, and is rotationally movably inserted into the accommodation hole, wherein the first to fourth communication ports communicate with the accommodation hole, wherein a degree of communication and a degree of shutoff between the first to fourth communication ports are adjusted according to a rotation movement position of the second member, and wherein the plurality of communication port groups are arranged in a dispersed manner with respect to a circumferential direction about a rotation movement axis of the second member.

With this arrangement, the accommodation hole having the cylindrical curved surface is formed in the inner periphery of the first member, and the second member is formed into a cylindrical shape, and is rotationally movably inserted into the accommodation hole. That is, the fluid passage switching mechanism is formed by a so-called rotary valve. Further, the first to fourth communication ports communicate with the accommodation hole, and the degree of communication and the degree of shutoff between the first to fourth communication ports are adjusted according to the rotation movement position of the second member. This makes it possible to switch the fluid passages and adjust the fluid pressure supplied to the first and second pressure chambers, using only the fluid passage switching mechanism. Therefore, it is not required to form e.g. a control valve for adjusting fluid pressure, separately from the fluid passage switching mechanism, whereby it is possible to achieve downsizing and manufacturing cost reduction of the power plant. Further, with the above-described arrangement, the plurality of communication port groups, each formed by the first to fourth communication ports, are arranged in the dispersed manner with respect to the circumferential direction about the rotation movement axis of the second member, and therefore it is possible to prevent fluid pressure from acting on the second member in an unbalanced manner, which makes it possible to reduce a frictional force between the second member and the first member during operation of the second member.

The invention according to claim 3 is the power plant 1, 51 according to claim 2, wherein the plurality of communication port groups are arranged at equally-spaced intervals with respect to the circumferential direction about the rotation movement axis of the second member.

With this arrangement, the plurality of communication port groups, each formed by the first to fourth communication ports, are arranged at equally-spaced intervals with respect to the circumferential direction about the rotation movement axis of the second member. This makes it possible to direct all the forces of a plurality of hydraulic pressures, which act on the second member via the first to fourth communication ports, respectively, toward the rotation movement axis of the second member, so that it is possible to properly reduce the frictional force between the second member and the first member during operation of the second member.

The invention according to claim 4 is the power plant 1, 51 according to any one of claims 1 to 3, wherein the fluid supply passage is shared by the fluid passage communicating between the fluid pressure supply source and the first pressure chamber 13b and the fluid passage communicating between the fluid pressure supply source and the second pressure chamber 13c.

With this arrangement, the fluid supply passage connected to the first communication port is shared by the fluid passage which communicates between the fluid pressure supply source and the first pressure chamber, and the fluid passage which communicates between the fluid pressure supply source and the second pressure chamber. As a consequence, it is not required to separately provide, as the first communication port, a communication port which communicates with the second communication port when the second member is in the second position, and a communication port which communicates with the third communication port when the second member is in the third position, and therefore, accordingly, it is possible to downsize the fluid passage switching mechanism. For the same reason, since it is only required to provide one fluid supply passage, it is possible to install the power plant with ease.

The invention according to claim 5 is the power plant 1, 51 according to anyone of claims 1 to 4, wherein a first communication port group and a second communication port group are included in the plurality of communication port groups, and the same communication port is shared as the fourth communication port of the first communication port group and the fourth communication port of the second communication port group.

With this arrangement, since the first communication port group and the second communication port group are included in the plurality of communication port groups, and the same communication port is shared as the fourth communication port of the first communication port group and the fourth communication port of the second communication port group, it is possible to downsize the fluid passage switching mechanism. For the same reason, since it is possible to reduce the number of fluid discharge passages, it is possible to install the power plant with ease.

The invention according to claim 6 is the power plant 1, 51 according to any one of claims 1 to 5, wherein the fluid passage switching mechanism is configured such that when the second member is in the first position, the second communication port and the third communication port are placed in a state communicating with each other.

As described above, the fluid pressure motor is configured to apply torque to the third rotary element connected to the other of the left and right wheels. Therefore, for example, when a differential rotation is occurring between the left and right wheels, the fluid pressure motor sometimes functions as a fluid pressure pump by being driven by motive power of at least one of the left and right wheels.

With the above-described arrangement, when the second member is in the first position, the second communication port to which is connected the first fluid passage that communicates with the first pressure chamber, and the third communication port to which is connected the second fluid passage that communicates with the second pressure chamber are placed in the state communicating with each other. As a consequence, when a differential rotation is occurring between the left and right wheels, it is possible to smoothly circulate fluid which is drawn into one of the first and second pressure chambers of the fluid pressure motor that functions as a fluid pressure pump, and is discharged from the other of the first and second pressure chambers, through the fluid passage switching mechanism and the first and second fluid passages. Therefore, it is possible to prevent a loss torque from being caused on the left and right wheels via the fluid pressure motor by the circulation of the fluid.

The invention according to claim 7 is the power plant 1, 51 according to any one of claims 1 to 6, wherein the fluid passage switching mechanism further includes a drive device (actuator 33b, ECU2) for driving the second member from the first position to the second position, and from the first position to the third position, and return means (torsion spring 33c) for returning the second member from the second position to the first position, and from the third position to the first position.

With this arrangement, the second member is driven by the drive device from the first position to the second position, and from the first position to the third position. Further, the second member is returned by the return means from the second position to the first position, and from the third position to the first position. With this, even in a case where the drive device becomes inoperable, the second member is returned to the first position, whereby a torque is prevented from being actively applied from the fluid pressure motor to the other of the left and right wheels, and hence it is possible to prevent occurrence of such a yaw moment of the vehicle as causes a driver to feel a sense of incompatibility.

The invention according to claim 8 is the power plant 1, 51 according to any one of claims 1 to 7, wherein the first to third positions are arranged in an order of the second position, the first position, and the third position in a direction of movement of the second member with respect to the first member.

As described above, when the second member is in the first position, the torque of the fluid pressure motor is not actively applied to the other of the left and right wheels. Further, by moving the second member to the second position, it is possible to apply a positive torque from the fluid pressure motor to the other of the left and right wheels, and by moving the second member to the third position, it is possible to apply a negative torque from the fluid pressure motor to the other of the left and right wheels. With the above-described arrangement, since the first to third positions are arranged in the order of the second position, the first position, and the third position in the direction of movement of the second member with respect to the first member, it is possible to quickly shift the state where the torque from the fluid pressure motor is not being actively applied to a state where it is actively applied.

The invention according to claim 9 is the power plant 1, 51 according to claim 8 dependent from claim 5, wherein the first member is provided with two fourth communication ports for one communication port group of the plurality of communication port groups, as the fourth communication ports, wherein one of the two fourth communication ports is placed in a state communicating with the third communication port when the second member is in the second position, and the other of the two fourth communication ports is placed in a state communicating with the second communication port when the second member is in the third position, and wherein the same fluid discharge passage is shared as a first fluid discharge passage connected to the fourth communication port of the first communication port group and a second fluid discharge passage connected to the fourth communication port of the second communication port group.

With this arrangement, as the fourth communication ports, two fourth communication ports are provided for one communication port of the plurality of communication port groups. When the second member is in the second position, one of the two fourth communication ports is placed in the state communicating with the third communication port, and when the second member is in the third position, the other of the two fourth communication ports is placed in the state communicating with the second communication port. Thus, the fourth communication port which communicates with the second communication port, and the fourth communication port which communicates with the third communication port are separately provided in one communication port group, it is possible to enhance the degree of freedom in the layout of the first to third communication ports. Further, the same fluid discharge passage is shared as the first fluid discharge passage connected to the fourth communication port of the first communication port group, which is one communication port group of the plurality of communication port groups, and the second fluid discharge passage connected to the fourth communication port of the second communication port group, which is another of the plurality of communication port groups, it is possible to achieve downsizing of the power plant and simplification of the arrangement thereof.

The invention according to claim 10 is the power plant 1, 51 according to any one of claims 1 to 9, wherein the first member is further provided with a fifth communication port (LUB port pl) to which are/is connected a motive power transmission member (transmission system 12) mechanically connected to the drive source and/or a cooling and lubricating fluid passage (fifth oil passage OL5) communicating with a cooled portion and/or a lubricated portion (cooling and lubricating system CL) of the drive source.

With this arrangement, the first member is further provided with the fifth communication port to which are/is connected the motive power transmission member mechanically connected to the drive source and/or the cooling and lubricating fluid passage communicating with the cooled portion and/or the lubricated portion of the drive source, so that it is possible to adjust supply of fluid to the cooled portion and/or the lubricated portion by the fluid passage switching mechanism.

The invention according to claim 11 is the power plant 1, 51 according to claim 10, wherein the fluid passage switching mechanism is configured such that when the second member is in the first to the third positions, the first communication port and the fifth communication port are placed in a state communicating with each other.

With this arrangement, when the second member is in any one of the first position, the second position, and the third position, the first communication port to which is connected the fluid supply passage communicating with the fluid pressure supply source, and the fifth communication port to which is connected the cooling and lubricating fluid passage communicating with the cooled portion and/or the lubricated portion, are placed in a state communicating with each other. Therefore, irrespective of states of the torque of the fluid pressure motor being applied to the other of the left and right wheels, it is possible to supply fluid to the cooled portion and/or the lubricated portion.

The invention according to claim 12 is the power plant 1, 51 according to claim 11, wherein the fluid passage switching mechanism is configured such that a degree of communication between the first communication port and the fifth communication port as to when the second member is in the second position and when the second member is in the third position becomes smaller than a degree of communication between the first communication port and the fifth communication port as to when the second member is in the first position.

With this arrangement, the degree of communication between the first communication port and the fifth communication port as to when the second member is in the second position and when the second member is in the third position becomes smaller than the degree of communication between the first communication port and the fifth communication port as to when the second member is in the first position. As a consequence, when the torque from the fluid pressure motor is being applied by shifting the second member to the second position or the third position, it is possible to prevent an excessive amount of fluid from being supplied from the fluid pressure supply source to the cooled portion and/or the lubricated portion.

The invention according to claim 13 is the power plant 1, 51 according to any one of claims 10 to 12, wherein the fluid passage switching mechanism is configured such that when the second member is in the first position, the second communication port and the fifth communication port are placed in a state communicating with each other, and the third communication port and the fifth communication port are placed in a state communicating with each other, when the second member is in the second position, the second communication port and the fifth communication port are placed in the state communicating with each other, and the third communication port and the fifth communication port are placed in a state shut off from each other, and when the second member is in the third position, the second communication port and the fifth communication port are placed in a state shut off from each other, and the third communication port and the fifth communication port are placed in the state communicating with each other.

With this arrangement, when the second member is in the second position, the second communication port connected to the first pressure chamber and the fifth communication port connected to the cooled portion and/or the lubricated portion are placed in the state communicating with each other, and the third communication port connected to the second pressure chamber and the fifth communication port are placed in the state shut off from each other. Further, when the second member is in the third position, the second communication port and the fifth communication port are placed in the state shut off from each other, and the third communication port and the fifth communication port are placed in the state communicating with each other. From the above, when the torque from the fluid pressure motor is being applied, it is possible to shut off the communication between the first or second pressure chamber and the cooled portion and/or the lubricated portion, so that it is possible to more properly apply the torque from the fluid pressure motor.

The invention according to claim 14 is the power plant 1, 51 according to any one of claims 10 to 13, wherein an outer periphery of the fifth communication port is formed into a curved shape, as viewed from the front of the fifth communication port.

With this arrangement, the outer periphery of the fifth communication port is formed into a curved shape, as viewed from the front of the fifth communication port. Therefore, for example, in a case where the fluid passage switching mechanism is configured such that when the degree of communication/shutoff between the first communication port and the fifth communication port is changed according to the movement position of the second member with respect to the first member, it is possible to suppress a sudden change in the degree of communication/shutoff between the first communication port and the fifth communication port.

The invention according to claim 15 is the power plant 1, 51 according to any one of claims 1 to 14, wherein the fluid pressure supply source is mechanically connected to the drive source.

With this arrangement, since the drive source is shared as the drive source of the vehicle and the drive source of the fluid pressure supply source, it is not required to provide the drive source of the fluid pressure supply source separately from the drive source of the vehicle.

BRIEF DESCRIPTION OF THE DRAWINGS

FIG. 14 A schematic view showing a positional relationship between each port of the sleeve and the first and second communication grooves, by developing the part of the sleeve of the switching device and the part of the valve element, in the circumferential direction, in a case where the valve element rotational angle position is a second rotational angle position.

MODE FOR CARRYING OUT INVENTION

Figure 1:
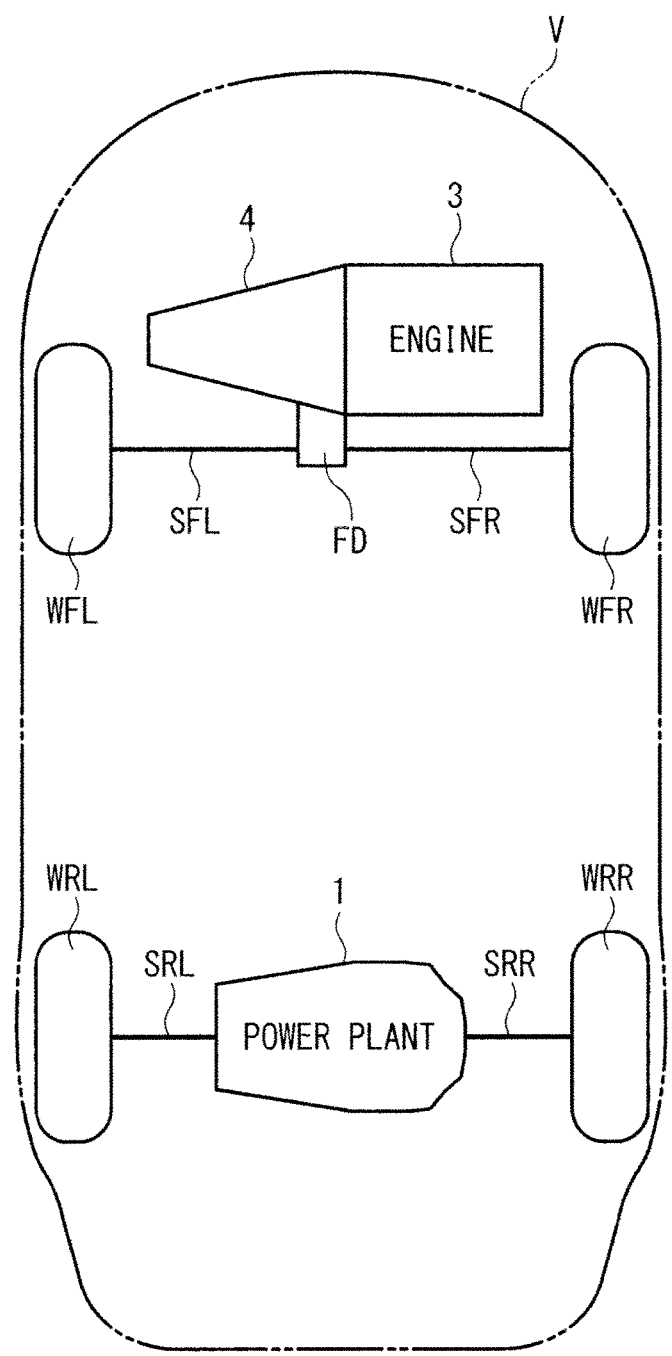
FIG. 1 A diagram schematically showing a power plant according to a first embodiment of the present invention together with a vehicle to which the power plant is applied.

The invention will now be described in detail with reference to drawings showing a preferred embodiment thereof. A vehicle V shown in FIG. 1 is a four-wheel vehicle of an all-wheel drive type. An internal combustion engine (hereafter referred to as the "engine") 3 as a drive source, and a transmission 4 for changing the speed of motive power from the engine 3 are provided in a front part of the vehicle. The engine 3 is a gasoline engine, and a crankshaft (not shown) thereof is connected to an input shaft (not shown) of the transmission 4. The transmission 4 is a stepped automatic transmission, and an output shaft (not shown) thereof is connected to left and right output shafts SFL and SFR in a front-side part of the vehicle V via a front differential FD. Further, the transmission 4 is provided with a rotating electric machine as a drive source of the vehicle. An output shaft of the rotating electric machine (neither of which are shown) is connected to the input shaft of the transmission 4. The left and right output shafts SFL and SFR are arranged coaxially with each other, and are connected to left and right front wheels WFL and WFR of the vehicle V, respectively.

The motive powers of the engine 3 and the rotating electric machine are transmitted to the input shaft of the transmission 4, and are output to the output shaft of the transmission 4 in a state changed in speed. Further, the motive powers are transmitted to the left and right front wheels WFL and WFR via the front differential FD and the left and right output shafts SFL and SFR. This drives the left and right front wheels WFL and WFR.

A power plant 1 according to the first embodiment of the present invention is for driving left and right rear wheels WRL and WRR of the vehicle V via left and right output shafts SRL and SRR in a rear-side part of the vehicle V. These left and right output shafts SRL and SRR are arranged coaxially with each other, and are connected to the left and right rear wheels WRL and WRR, respectively.

Figure 2:
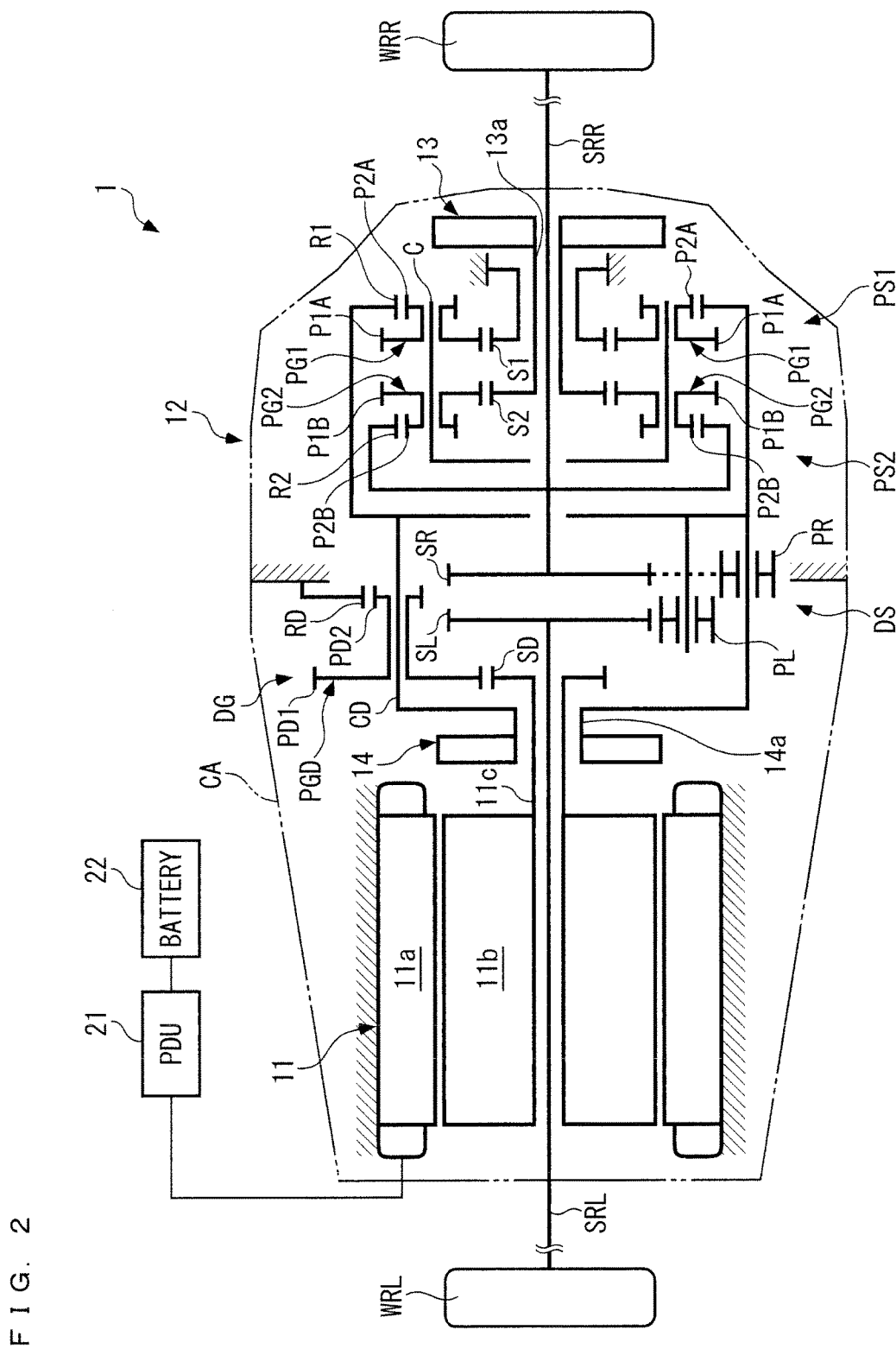
FIG. 2 A skeleton diagram of a transmission system of the power plant according to the first embodiment and left and right rear wheels of the vehicle.

As shown in FIG. 2, the power plant 1 includes the rotating electric machine 11 as the drive source, a transmission system 12 for transmitting the driving force of the rotating electric machine 11 to the left and right output shafts SRL and SRR, a hydraulic motor 13 for adjusting the torques of the left and right rear wheels WRL and WRR, and a hydraulic pump 14 for supplying hydraulic pressure to the hydraulic motor 13.

The rotating electric machine 11 is an AC motor, for example, and includes a stator 11a comprised of a plurality of iron cores and coils, and a rotor 11b comprised of a plurality of magnets. The rotating electric machine 11 is disposed coaxially with the left and right output shafts SRL and SRR, and is arranged between the left and right rear wheels WRL and WRR. The stator 11a is fixed to an immovable casing CA. The rotor 11b is disposed in a manner opposed to the stator 11a. Further, a hollow cylindrical rotating shaft 11c is coaxially mounted in the rotor 11b, and the two 11b and 11c are rotatable in unison with each other. The left output shaft SRL is relatively rotatably fitted inside the rotor 11b and the rotating shaft 11c.

In the rotating electric machine 11, when electric power is supplied to the stator 11a, the supplied electric power is converted to motive power, and is output to the rotor 11b. Further, when the motive power is input to the rotor 11b, this motive power is converted to electric power (power generation), and is output to the stator 11a. The stator 11a is electrically connected to a battery 22 capable of being charged and discharged, via a power drive unit (hereafter referred to as the "PDU") 21, and is capable of supplying and receiving electric energy to and from the battery 22. The PDU 21 is formed by an electric circuit comprised e.g. of an inverter, and is electrically connected to an ECU 2, described hereinafter, of the power plant 1 (see FIG. 9). The ECU 2 controls the PDU 21 to thereby control electric power supplied to the stator 11a, electric power generated by the stator 11a, and the rotational speed of the rotor 11b.

The transmission system 12, which is formed by combining a plurality of planetary gear units, includes a reduction gear box DG formed by a planetary gear unit of a single pinion type, and is arranged between the rotating electric machine 11 and the right rear wheel WRR. The reduction gear box DG is comprised of a speed reduction sun gear SD, a plurality of speed reduction double pinion gears PGD (only one of which is shown), a speed reduction ring gear RD, and a carrier CD which rotatably supports each speed reduction double pinion gear PGD and is rotatably provided. The speed reduction double pinion gear PGD is formed by a speed reduction first pinion gear PD1 in mesh with the speed reduction sun gear SD, and a speed reduction second pinion gear PD2 which is coaxially and integrally formed with the speed reduction first pinion gear PD1 and is in mesh with the speed reduction ring gear RD.

Further, the speed reduction sun gear SD is coaxially mounted on the rotating shaft 11c of the above-described rotating electric machine 11, and is rotatable in unison with the rotating shaft 11c and the rotor 11b. The speed reduction ring gear RD is fixed to the casing CA, and is not rotatable. The number of gear teeth of the speed reduction first pinion gear PD1 is set to a value smaller than the number of gear teeth of the speed reduction second pinion gear PD2. With the above arrangement, the motive power of the rotating electric machine 11 is transmitted to the speed reduction sun gear SD, and is further transmitted to the carrier CD via the speed reduction first and second pinion gears PD1 and PD2 in a state reduced in speed at a predetermined transmission gear ratio. The carrier CD is coaxially mounted on an input shaft 14a of the above-mentioned hydraulic pump 14, and is rotatable in unison with the input shaft 14a. The input shaft 14a is formed into a hollow shape, and the rotating shaft 11c of the rotating electric machine 11 is relatively rotatably fitted inside the input shaft 14a.

Further, the transmission system 12 further includes a differential gear DS. The differential gear DS is comprised of a left sun gear SL and a right sun gear SR which are coaxially mounted on the left and right output shafts SRL and SRR, respectively, and a plurality of left pinion gears PL (only one of which is shown) and a plurality of right pinion gears PR (only one of which is shown) which are rotatably supported by the above-described carrier CD. Thus, the carrier CD is shared by the above-described speed reduction double pinion gears PGD and the left and right pinion gears PL and PR. The left pinion gears PL are in mesh with the left sun gear SL. The right pinion gears PR are in mesh with the left pinion gears PL and are in mesh with the right sun gear SR. The left and right sun gears SL and SR are not in mesh with each other. In FIG. 2, the right pinion gears PR are shown in a position away from the right sun gear SR, for convenience, and a broken line indicates that the two PR and SR are in mesh with each other. Further, the numbers of gear teeth of the left and right sun gears SL and SR are set to the same value.

Furthermore, the transmission system 12 further includes a first planetary gear unit PS1 and a second planetary gear unit PS2 both of the single pinion type. The first and second planetary gear units PS1 and PS2 are disposed between the above-described reduction gear box DG and right rear wheel WRR, and are arranged from the right side in this order. The first planetary gear unit PS1 is formed by a first sun gear S1, a plurality of double pinion gears PG1 (only two of which are shown), a first ring gear R1, and a carrier C which rotatably supports each double pinion gear PG1 and is rotatably provided. The double pinion gear PG1 is formed by a first pinion gear P1A in mesh with the first sun gear S1, and a second pinion gear P2A which is coaxially and integrally formed with the first pinion gear P1A and is in mesh with the first ring gear R1.

The first sun gear S1 is fixed to the casing CA via a hollow cylindrical shaft and a flange, and is not rotatable. The first ring gear R1 is coaxially connected to the above-described reduction gear box DG and the carrier CD of the differential gear DS via a hollow cylindrical rotating shaft and a flange, and is rotatable in unison with the carrier CD. Further, the number ZS1 of gear teeth of the first sun gear S1, the number ZR1 of gear teeth of the first ring gear R1, and the numbers ZP1A and ZP2A of gear teeth of the first and second pinion gears P1A and P2A are set such that there holds the following equation (1):

$$ZS1 \cdot ZP2A = ZR1 \cdot ZP1A \tag{1}$$

The above-mentioned second planetary gear unit PS2 is constructed similar to the first planetary gear unit PS1, and is formed by a second sun gear S2, a plurality of double pinion gears PG2 (only two of which are shown), a second ring gear R2, and the rotatable carrier C which rotatably supports each double pinion gear PG2. Thus, the carrier C is shared by the first and second planetary gear units PS1 and PS2. The double pinion gear PG2 is formed by a first pinion gear P1B in mesh with the second sun gear S2, and a second pinion gear P2B which is coaxially and integrally formed with the first pinion gear P1B and is in mesh with the second ring gear R2.

The second sun gear S2 is coaxially mounted on an output shaft 13a of the above-mentioned hydraulic motor 13, and is rotatable in unison with the output shaft 13a. The output shaft 13a is formed into a hollow shape. The right output shaft SRR is relatively rotatably fitted inside the output shaft 13a, and the hollow cylindrical shaft integrally formed with the first sun gear S1 is relatively rotatably fitted outside the output shaft 13a. The second ring gear R2 is coaxially connected to the right output shaft SRR via a hollow cylindrical rotating shaft and a flange, and is rotatable in unison with the right output shaft SRR. Further, the number of gear teeth of the second sun gear S2 is set to the same value as the number ZS1 of gear teeth of the first sun gear S1, and the number of gear teeth of the second ring gear R2 is set to the same value as the number ZR1 of gear teeth of the first ring gear R1. The number of gear teeth of the first pinion gear P1B is set to the same value as the number ZP1A of gear teeth of the first pinion gear P1A, and the number of gear teeth of the second pinion gear P2B is set to the same value as the number ZP2A of gear teeth of the second pinion gear P2A.

The hydraulic motor 13 is a vane motor, for example, and includes not only the above-described output shaft 13a, but also a first pressure chamber 13b, a second pressure chamber 13c, and a rotatable rotor 13d. The output shaft 13a is coaxially mounted in the rotor 13d, and a plurality of vanes are radially mounted on the rotor 13d. The two 13a and 13d are rotatable in unison with each other. In the hydraulic motor 13, when oil is supplied to the first pressure chamber 13b, each vane is urged by the supplied oil, whereby the rotor 13d and the output shaft 13a are rotated clockwise, as viewed in FIG. 3, in unison with each other, and the supplied oil is discharged into the second pressure chamber 13c. Inversely to the above, when oil is supplied to the second pressure chamber 13c, each vane is urged by the supplied oil, whereby the rotor 13d and the output shaft 13a are rotated counterclockwise, as viewed in FIG. 3, in unison with each other, and the supplied oil is discharged into the first pressure chamber 13b.

Further, when the rotor 13d is being driven by an external force, it is possible to cause the hydraulic motor 13 to function as a pump. In this case, when the rotor 13d and the output shaft 13a are rotated clockwise, as viewed in FIG. 3, by the external force, oil is drawn into the first pressure chamber 13b, and the drawn oil is discharged from the second pressure chamber 13c. Inversely to the above, when the rotor 13d and the output shaft 13a are rotated counterclockwise, as viewed in FIG. 3, by the external force, oil is drawn into the second pressure chamber 13c, and the drawn oil is discharged from the first pressure chamber 13b. When the hydraulic motor 13 is functioning as a pump, a negative torque acts on the output shaft 13a along with drawing and discharging of the oil.

Figure 4:
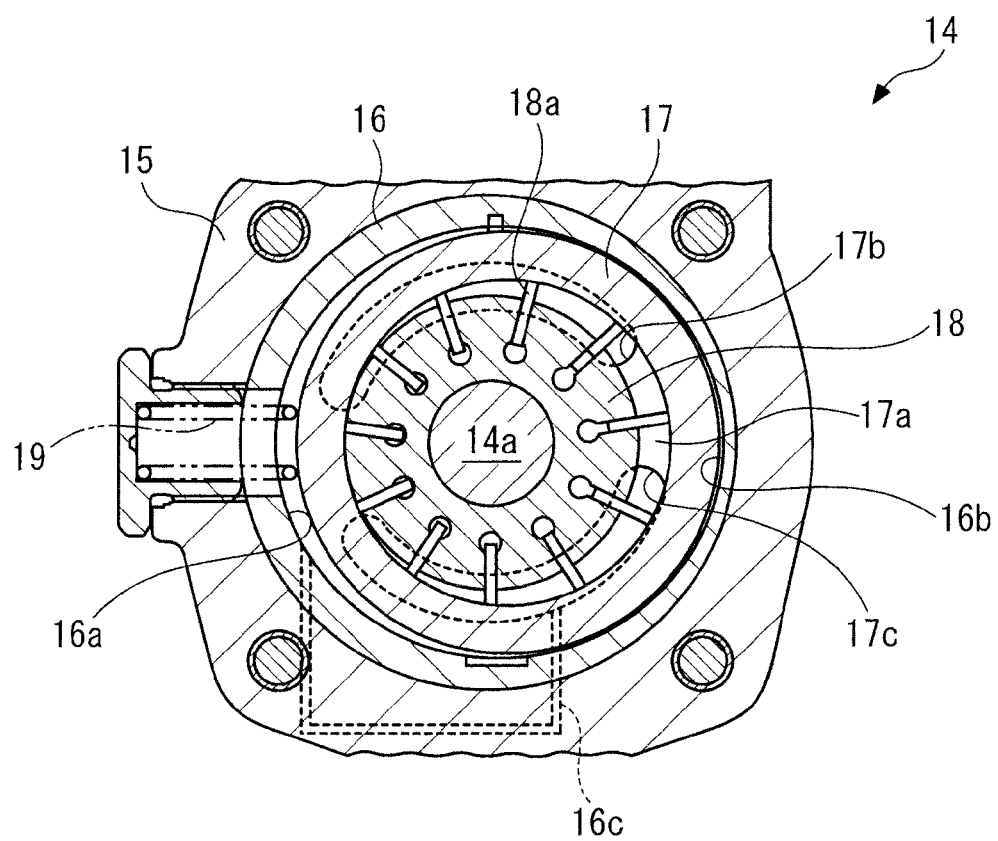
FIG. 4 A cross-sectional view of a hydraulic pump of the power plant.

As shown in FIG. 4, the hydraulic pump 14 is a variable displacement vane type, for example, and includes not only the above-mentioned input shaft 14a, but also a housing 15, an adaptor ring 16 fixed in the housing 15, a cam ring 17 radially movably provided in the adaptor ring 16, a rotor 18 rotatably provided in the cam ring 17, and a spring 19 fixed in the housing 15 and urging the cam ring 17 in the radial direction. Note that in FIG. 4, the input shaft 14a is illustrated in a solid form, for convenience.

The rotor 18 is coaxially fixed to the input shaft 14a, and is provided in a manner unmovable and rotatable with respect to the housing 15, and in an eccentric state within the cam ring 17. Further, the rotor 18a is provided with a plurality of radially outwardly extending vanes 18a. Each vane 18a is in contact with an inner peripheral surface of the cam ring 17, and is radially movable. Note that in FIG. 4, a reference numeral of only one vane 18a is denoted, for convenience.

A pump chamber 17a is defined between the cam ring 17 and the rotor 18. A drawing port 17b and a discharge port 17c communicate with the pump chamber 17a. The drawing port 17*b* is connected to a reservoir 31 appearing in FIG. 3, and the discharge port 17*c* is connected to a first oil passage OL1, referred to hereinafter. Oil is stored in the reservoir 31. Further, a first oil chamber 16*a* and a second oil chamber 16*b* are provided between the adaptor ring 16 and the cam ring 17. The former 16*a* is arranged in a portion on a side closer to the spring 19, and the latter 16*b* is arranged in a portion on a side remote from the spring 19. Furthermore, the first oil chamber 16*a* communicates with the discharge port 17*c* via an oil passage 16*c*, and the second oil chamber 16*b* is connected to a first branch oil passage BL1, referred to hereinafter.

In the hydraulic pump 14 constructed as above, when an external force is input to the input shaft 14*a* to thereby cause the input shaft 14*a* to rotate together with the rotor 18, the vanes 18*a* rotate together with the rotor 18 in a state in contact with the inner peripheral surface of the cam ring 17. Along therewith, the volume of a space defined by vanes 18*a* and the cam ring 17 is increased in part of the pump chamber 17*a*, which communicates with the drawing port 17*b*, whereby oil in the reservoir 31 is drawn from the drawing port 17*b* into the pump chamber 17*a*. Further, along with the rotations of the rotor 18 and the vanes 18*a*, the volume of the space defined by the vanes 18*a* and the cam ring 17 is reduced in part of the pump chamber 17*a*, which communicates with the discharge port 17*c*, whereby the oil drawn from the drawing port 17*b* into the pump chamber 17*a* is discharged into the discharge port 17*c*. In this case, the amount of oil discharged from the hydraulic pump 14 (hereafter referred to as the "pump discharge amount" (lit/sec)) is changed by changing the amount of eccentricity of the cam ring 17 with respect to the rotor (hereafter referred to as the "cam ring eccentricity amount"), and becomes larger as the cam ring eccentricity amount is larger.

Here, as is apparent from the above-described construction of the hydraulic pump 14, a force increasing the cam ring eccentricity amount includes the urging force of the spring 19 and the force of hydraulic pressure supplied to the first oil chamber 16*a*, and a force reducing the cam ring eccentricity amount includes the force of the hydraulic pressure of oil in the pump chamber 17*a* on a side closer to the discharge port 17*c* and the force of hydraulic pressure supplied to the second oil chamber 16*b*. As described hereinabove, the first oil chamber 16*a* communicates with the discharge port 17*c*, and hence out of the above-mentioned forces, the force of the hydraulic pressure supplied to the first oil chamber 16*a* and the force of the hydraulic pressure of oil in the pump chamber 17*a* on the side closer to the discharge port 17*c* are equal to each other, and are offset by each other. Therefore, the cam ring eccentricity amount is determined by the balance of the urging force of the spring 19 and the force of the hydraulic pressure supplied to the second oil chamber 16*b*, and becomes smaller as the hydraulic pressure supplied to the second oil chamber 16*b* is higher.

Figure 5:
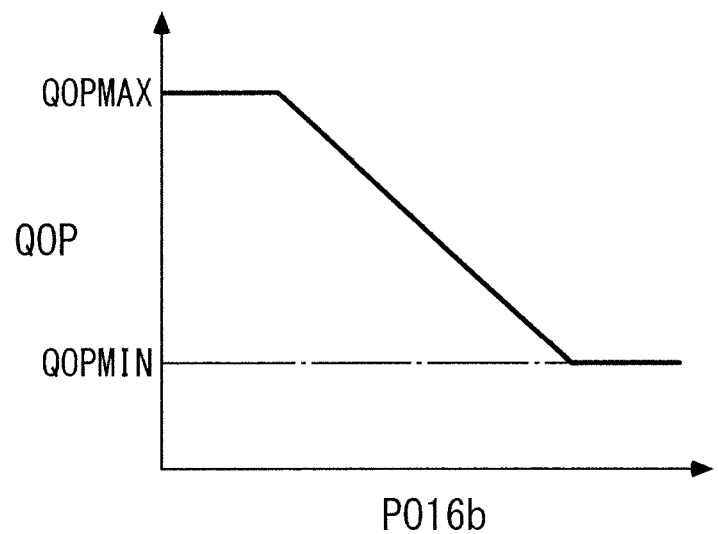
FIG. 5 A diagram showing an example of a relationship between second oil chamber supply hydraulic pressure of the hydraulic pump and a pump discharge amount.
Figure 6:
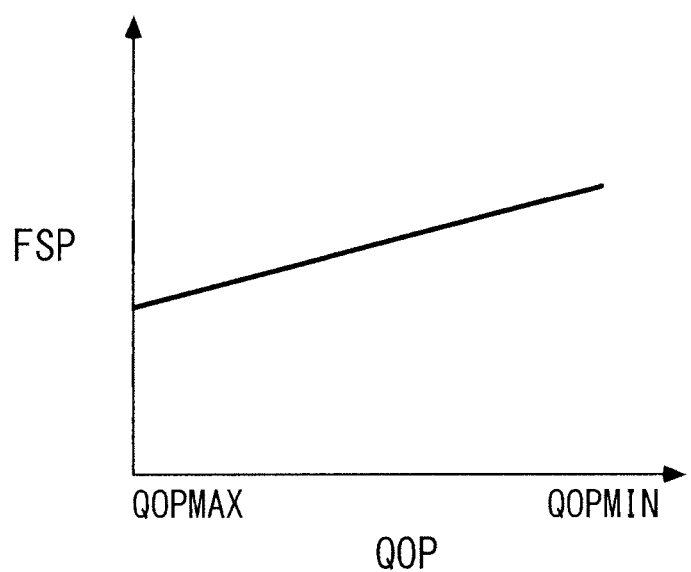
FIG. 6 A diagram showing an example of a relationship between the discharge amount of the hydraulic pump and load acting on a spring.

FIG. 5 shows the relationship between the force of the hydraulic pressure supplied to the second oil chamber 16*b* (hereafter referred to as the "second oil chamber supply hydraulic pressure PO16*b*") and the pump discharge amount QOP. As shown in the figure, the cam ring eccentricity amount becomes smaller as the second oil chamber supply hydraulic pressure PO16*b* is higher, whereby the pump discharge amount QOP becomes smaller. In this case, the pump discharge amount QOP is changed between a maximum value QOPMAX thereof and a minimum value QOPMIN thereof. Further, FIG. 6 shows the relationship between load FSP acting on the spring 19 and the pump discharge amount QOP. As shown in the figure, as the load FSP acting on the spring 19 is larger, i.e. as the second oil chamber supply hydraulic pressure PO16*b* is higher, the pump discharge amount QOP becomes smaller, and a slope thereof is set to a relatively small value. The reason for this will be described hereinafter.

Further, the hydraulic pump 14 is used not only for supplying hydraulic pressure to the hydraulic motor 13, as described above, but also for supplying cooling and lubricating oil to a cooling and lubricating system CL. The cooling and lubricating system CL is for cooling and lubricating the rotating electric machine 11 and the transmission system 12. Further, part of hydraulic pressure supplied from the hydraulic pump 14 to the cooling and lubricating system CL is supplied to the second oil chamber 16*b* via the first branch oil passage BL1 connected to the second oil chamber 16*b*. This causes the pump discharge amount QOP to be automatically changed such that the hydraulic pressure supplied from the hydraulic pump 14 to the cooling and lubricating system CL (hereafter referred to as the "LUB hydraulic pressure") becomes equal to a predetermined value PREF (see FIG. 38). Detailed description thereof will be given hereinafter.

Figure 3:
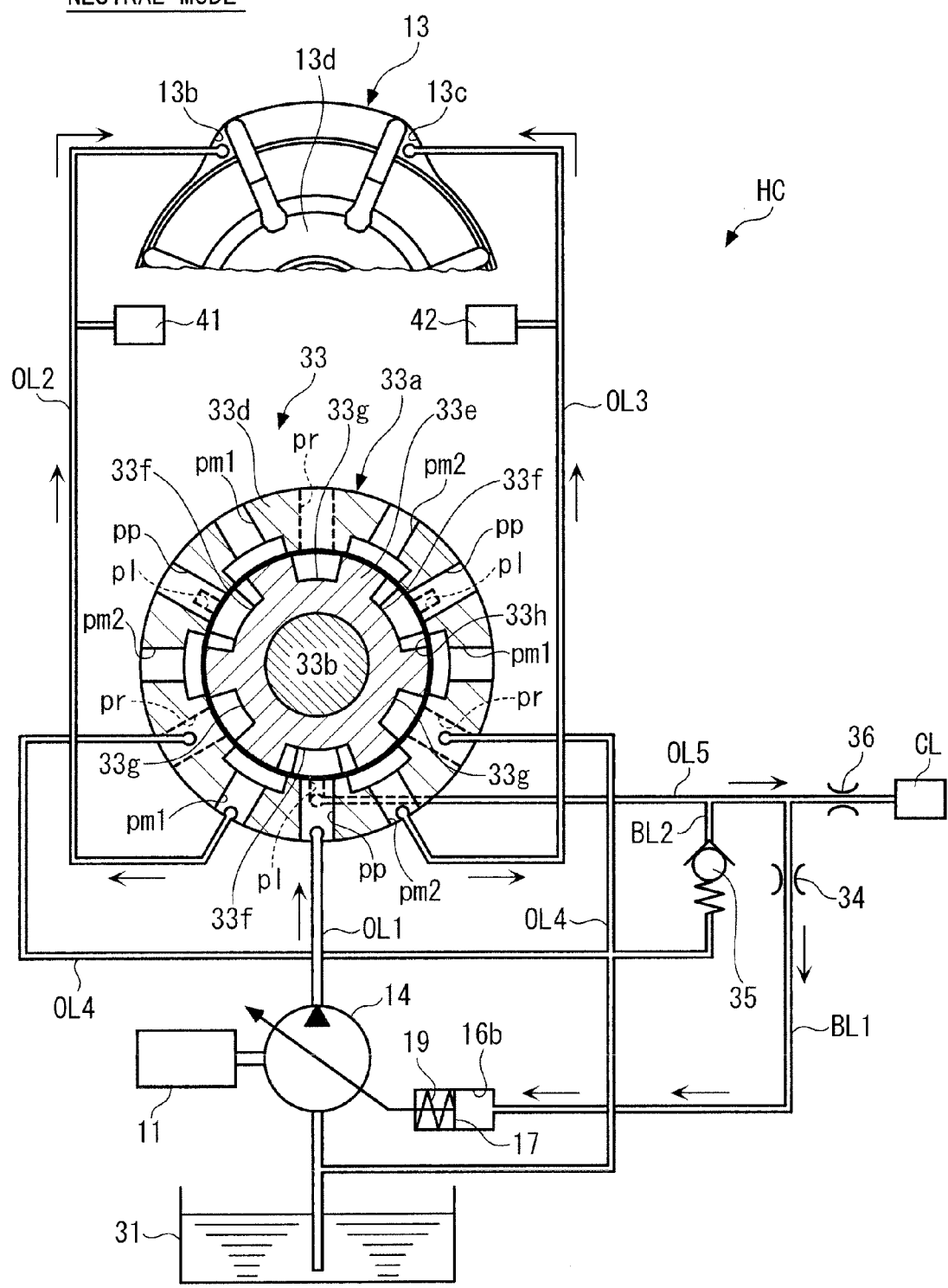
FIG. 3 A schematic view, partly broken away, of a hydraulic circuit and a hydraulic motor of the power plant during a neutral mode.
Figure 7:
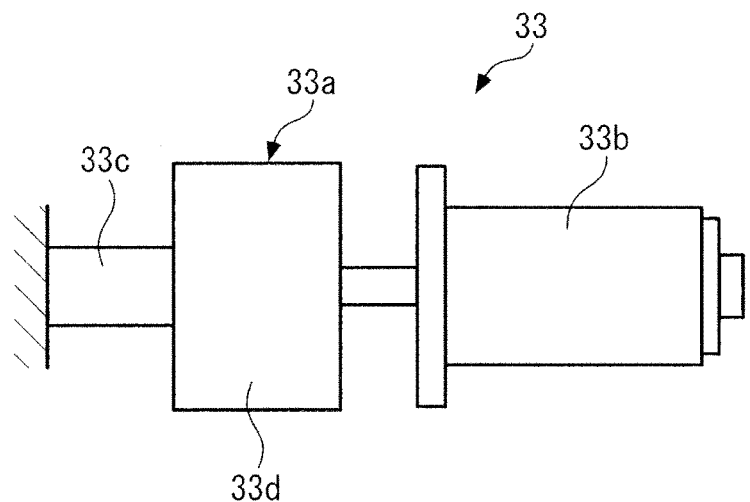
FIG. 7 A schematic view of a switching device of the hydraulic circuit.

Further, the power plant 1 further includes a hydraulic circuit HC which connects the hydraulic motor 13 and the cooling and lubricating system. CL to the hydraulic pump 14. As shown in FIGS. 3 and 7, the hydraulic circuit HC is comprised of the first oil passage OL1, a second oil passage OL2, a third oil passage OL3, fourth oil passages OL4, and a fifth oil passage OL5, as well as a switching device 33 for switching between paths of the first to fifth oil passages OL1 to OL5 through the whole of which oil flows. The switching device 33 includes a switching valve 33*a*, an actuator 33*b* for actuating the switching valve 33*a*, and a torsion spring 33*c*. Note that in FIG. 3, the second oil chamber 16*b*, the cam ring 17, and the spring 19 of the hydraulic pump 14 are illustrated outside the hydraulic pump 14 in a simplified manner, for convenience. The same applies to other figures, referred to hereinafter.

The switching valve 33*a* is comprised of a sleeve 33*d* having a hollow cylindrical shape and a valve element 33*e* accommodated in the sleeve 33*d*. Note that the outer shape of the sleeve 33*d* is not required to be circular. The peripheral wall of the sleeve 33*d* is formed with three inflow ports pp, three return ports pr, three first motor ports pm1, three second motor ports pm2, and three LUB ports pl (three sets in total). The inside of the sleeve 33*d* is used as an accommodation hole 33*h* for accommodating the valve element 33*e*. Each of the ports pp, pr, pm1, pm2, and pl opens in the radial direction, and communicates with the accommodation hole 33*h*. The inflow port pp, the return port pr, the first and second motor ports pm1 and pm2 are arranged, as viewed in FIG. 3, at equally-spaced intervals (at the same angular intervals) in a circumferential direction, clockwise, in the order of pp, pm1, pr, and pm2. Further, FIG. 8 schematically shows the positional relationship between each of the ports pp, pr, pm1, pm2, and pl, and a first communication groove 33*f* and second communication grooves 33*g*, referred to hereinafter, of the valve element 33*e*, in a state where part of the sleeve 33*d* and part of the valve element 33*e* are developed in the circumferential direction.

Figure 8:
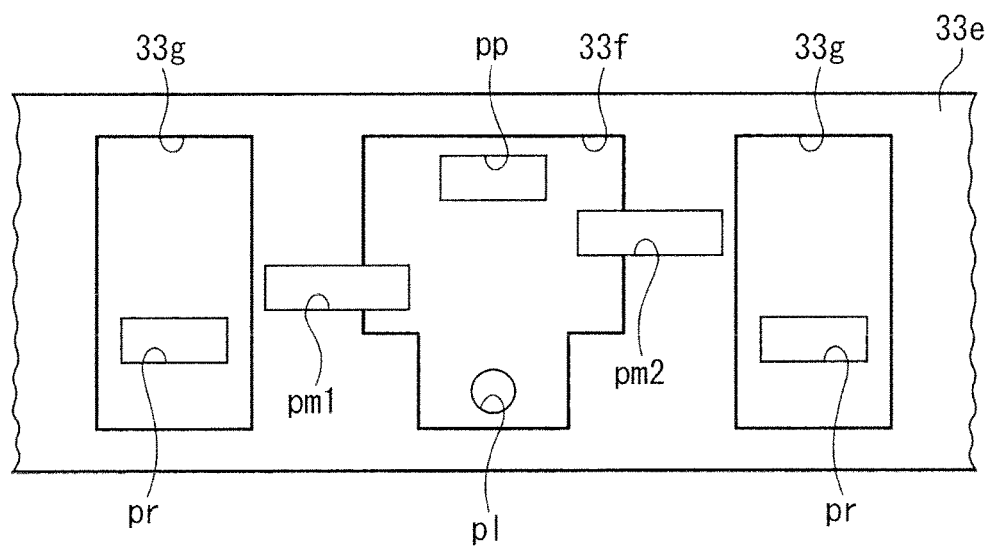
FIG. 8 A schematic view showing a positional relationship between each port of a sleeve and first and second communication grooves of the valve element, by developing part of the sleeve of the switching device and part of a valve element, in a circumferential direction, in a case where a valve element rotational angle position is a neutral position.

As shown in FIG. 8, the inflow port pp, the return port pr, and the first and second motor ports pm1 and pm2 are formed into circumferentially elongated rectangular shapes in cross section orthogonal to an axial direction thereof. The LUB port pl is formed into a shape of a perfect circle in cross section orthogonal to an axial direction thereof, and a cross-sectional area thereof is formed to be smaller than those of the inflow port pp, the return port pr, and the first and second motor ports pm1 and pm2. Further, as shown in FIGS. 3 and 8, the inflow port pp and the LUB port pl are disposed in one end and the other end of the sleeve 33d in the axial direction, respectively, such that they overlap in the axial direction. Further, the inflow port pp, the return port pr, the first motor port pm1, the second motor port pm2, and the LUB port pl are arranged from the one end side toward the other end side in the axial direction in the order of pp, pm2, pm1, pr, and pl. Note that as is apparent from FIGS. 3 and 8, the cross-section of the switching valve 33a illustrated in FIG. 3 is taken along the first motor port pm1, the inflow port pp, and the second motor port pm2.

Further, the three inflow ports pp themselves, the three first motor ports pm1 themselves, the three second motor ports pm2 themselves, the three return ports pr themselves, and the three LUB ports pl themselves communicate with each other, respectively, via communication holes (not shown) which are formed in the sleeve 33d, on a port-by-port basis, in a manner extending in the circumferential direction. Hereinafter, the inflow ports pp, the first and second motor ports pm1 and pm2, the return ports pr, and the LUB ports pl are collectively referred to as the "plurality of switching ports", as deemed appropriate.

Furthermore, the inflow ports pp are connected to the discharge port 17c of the hydraulic pump 14 via the first oil passage OL1, and the first motor ports pm1 are connected to the first pressure chamber 13b of the hydraulic motor 13 via the second oil passage OL2. The second motor ports pm2 are connected to the second pressure chamber 13c of the hydraulic motor 13 via the third oil passage OL3. Further, the return ports pr are connected to the reservoir 31 via the fourth oil passages OL4, and the LUB ports pl are connected to the cooling and lubricating system. CL via the fifth oil passage OL5.

The valve element 33e is formed into a solid cylindrical shape, and is inserted into the accommodation hole 33h of the sleeve 33d. The valve element 33e is rotatable about an axis thereof between a first rotational angle position shown in FIG. 11, referred to hereinafter, and a second rotational angle position shown in FIG. 13, referred to hereinafter. As is apparent from FIGS. 3, 11, and 13, the first rotational angle position, a neutral position, and the second rotational angle position are arranged in a circumferential direction of the sleeve 33d in the mentioned order. The valve element 33e has an outer peripheral surface thereof formed with three first communication grooves 33f and three second communication grooves 33g for selectively causing switching ports of one of a plurality of predetermined combinations of the plurality of switching ports (pp, pm1, pm2, pr, and pl) to communicate with each other. The first and second communication grooves 33f and 33g are arranged alternately at equally-spaced intervals in a circumferential direction of the valve element 33e, and each extend in the axial direction. As shown in FIG. 8, the width of a portion of the first communication groove 33f closer to the LUB port pl is set to be smaller than the widths of portions of the first communication groove 33f closer to the inflow port pp and the first and second motor ports pm1 and pm2.

Further, the above-mentioned actuator 33b and torsion spring 33c are coaxially mounted on the valve element 33e. When the valve element 33e is not being actuated by the actuator 33b, it is held at the neutral position shown in FIG. 3 by the urging force of the torsion spring 33c. The actuator 33b is formed by a DC motor, for example, and is electrically connected to the aforementioned ECU 2 (see FIG. 9).

In the switching device 33 constructed as above, by actuating the actuator 33b using a control signal COSI from the ECU 2, the valve element 33e is rotated against the urging force of the torsion spring 33c, whereby switching ports of one of the plurality of predetermined combinations of the plurality of switching ports selectively communicate with each other via the first and second communication grooves 33f and 33g of the valve element 33e, which in turn switches a path in the first to fifth oil passages OL1 to OL5 through which oil flows. In this case, by adjusting a rotational angle position of the valve element 33e, it is possible to adjust the degree of communication between the plurality of switching ports. Detailed description thereof will be given hereinafter.

Further, one end of the first branch oil passage BL1 is connected to the fifth oil passage OL5, and the other end of the first branch oil passage BL1 is connected to the second oil chamber 16b of the above-described hydraulic pump 14. With the above arrangement, part of the hydraulic pressure of oil flowing through the fifth oil passage OL5 is supplied to the second oil chamber 16b, which changes the above-described cam ring eccentricity amount of the hydraulic pump 14 to thereby change the pump discharge amount QOP. In this case, for example, when hydraulic pressure supplied from the hydraulic pump 14 to the hydraulic motor 13 is increased to thereby make the LUB hydraulic pressure, which is hydraulic pressure supplied from the hydraulic pump 14 to the cooling and lubricating system CL via the fifth oil passage OL5, lower than the aforementioned predetermined value PREF, the second oil chamber supply hydraulic pressure PO16b (hydraulic pressure supplied to the second oil chamber 16b) accordingly becomes lower, which makes the cam ring eccentricity amount larger, whereby the pump discharge amount QOP is increased. As a consequence, the LUB hydraulic pressure is increased toward the predetermined value PREF. On the other hand, for example, when the hydraulic pressure supplied from the hydraulic pump 14 to the hydraulic motor 13 is reduced to thereby make the LUB hydraulic pressure larger than the predetermined value PREF, the second oil chamber supply hydraulic pressure PO16b accordingly becomes higher, which makes the cam ring eccentricity amount smaller, whereby the pump discharge amount QOP is reduced. As a consequence, the LUB hydraulic pressure is reduced toward the above-mentioned predetermined value PREF.

As described above, according to a change in the hydraulic pressure supplied from the hydraulic pump 14 to the hydraulic motor 13 and the cooling and lubricating system CL, the pump discharge amount QOP is automatically changed such that the LUB hydraulic pressure becomes equal to the predetermined value PREF. Further, an orifice 34 for adjusting the second oil chamber supply hydraulic pressure PO16b is provided at an intermediate portion of the first branch oil passage BL1. Various component elements, such as the orifice 34, the first branch oil passage BL1, and the spring 19, are configured such that the above-described operations can be obtained. Further, the slope of the pump discharge amount QOP with respect to the load FSP acting on the spring 19 is set to a small value, as described above with reference to FIG. 6. The reason for this is as follows: The hydraulic pump 14 is driven by the torques of the left and right rear wheels WRL and WRR transmitted to the input shaft 14a of the hydraulic pump 14 (see FIG. 19), though detailed description thereof is given hereinafter. Therefore, the slope of the pump discharge amount QOP is set to a small value in order to prevent the cam ring eccentricity amount from being drastically changed by a change in the pump discharge amount QOP due to a change in the vehicle speed of the vehicle V, to thereby prevent occurrence of hunting of the pump discharge amount QOP.

Further, one end of a second branch oil passage BL2 is connected to a portion of the fifth oil passage OL5, which is closer to the LUB port pl than a portion of the same to which is connected the first branch oil passage BL1 is, and the other end of the second branch oil passage BL2 is connected to the fourth oil passage OL4. A check valve 35 is provided at an intermediate portion of the second branch oil passage BL2. The check valve 35 allows oil to flow from the fifth oil passage OL5 to the fourth oil passage OL4, but inhibits oil from flowing from the fourth oil passage OL4 to the fifth oil passage OL5. The second branch oil passage BL2 and the check valve 35 form a relief circuit. When the hydraulic pressure of oil flowing through the fifth oil passage OL5 has become relatively high, the oil is allowed to escape to the fourth oil passage OL4, whereby it is possible to prevent hydraulic pressure in the hydraulic circuit HC from becoming too high. Further, an orifice 36 for adjusting the hydraulic pressure of oil supplied to the cooling and lubricating system CL is provided at a portion of the fifth oil passage OL5, which is closer to the cooling and lubricating system CL than the portion of the same to which is connected the first branch oil passage BL1 is.

Further, a control mode for controlling the hydraulic motor 13 via the hydraulic circuit HC includes a neutral mode, a first motor mode, a second motor mode, a first pump mode, and a second pump mode. Hereinafter, operations of the hydraulic motor 13 and the hydraulic circuit HC in these control modes will be described with reference to FIGS. 3, 8, and 10 to 16.

[Neutral Mode (See FIGS. 3, 8, and 10)]

The neutral mode is a control mode for controlling the hydraulic motor 13 in a neutral state without causing the hydraulic motor 13 to be operated by hydraulic pressure from the hydraulic pump 14. During the neutral mode, the rotational angle position of the valve element 33e of the switching device 33 (hereafter referred to as the "valve element rotational angle position") $\theta VA$ is controlled to the neutral position shown in FIG. 3. As shown in FIGS. 3 and 8, during the neutral mode, the valve element 33e shuts off the inflow ports pp, the first and second motor ports pm1 and pm2, and the LUB ports pl, from the return ports pr communicating with the reservoir 31. Further, the inflow ports pp, the first and second motor ports pm1 and pm2, and the LUB ports pl communicate with each other via the first communication grooves 33f of the valve element 33e.

From the above, as shown in FIG. 3, part of oil from the hydraulic pump 14 is supplied to the cooling and lubricating system CL via the first oil passage OL1, the inflow ports pp, the LUB ports pl, and the fifth oil passage OL5. In FIG. 3 and other figures, referred to hereinafter, arrows depicted along the respective oil passages indicate flows of oil. Further, the remainder of the oil supplied from the hydraulic pump 14 to the inflow ports pp via the first oil passage OL1 is supplied to the first pressure chamber 13b of the hydraulic motor 13 via the first motor ports pm1 and the second oil passage OL2, and is supplied to the second pressure chamber 13c of the hydraulic motor 13 via the second motor ports pm2 and the third oil passage OL3.

As a consequence, during the neutral mode, the hydraulic pressure of the oil supplied to the first pressure chamber 13b and that of the oil supplied to the second pressure chamber 13c become equal to each other, whereby the rotor 13d and the output shaft 13a of the hydraulic motor 13 enter the neutral state in which they are not driven by the hydraulic pressure from the hydraulic pump 14, but are freely rotatable by an external force input thereto.

Figure 10:
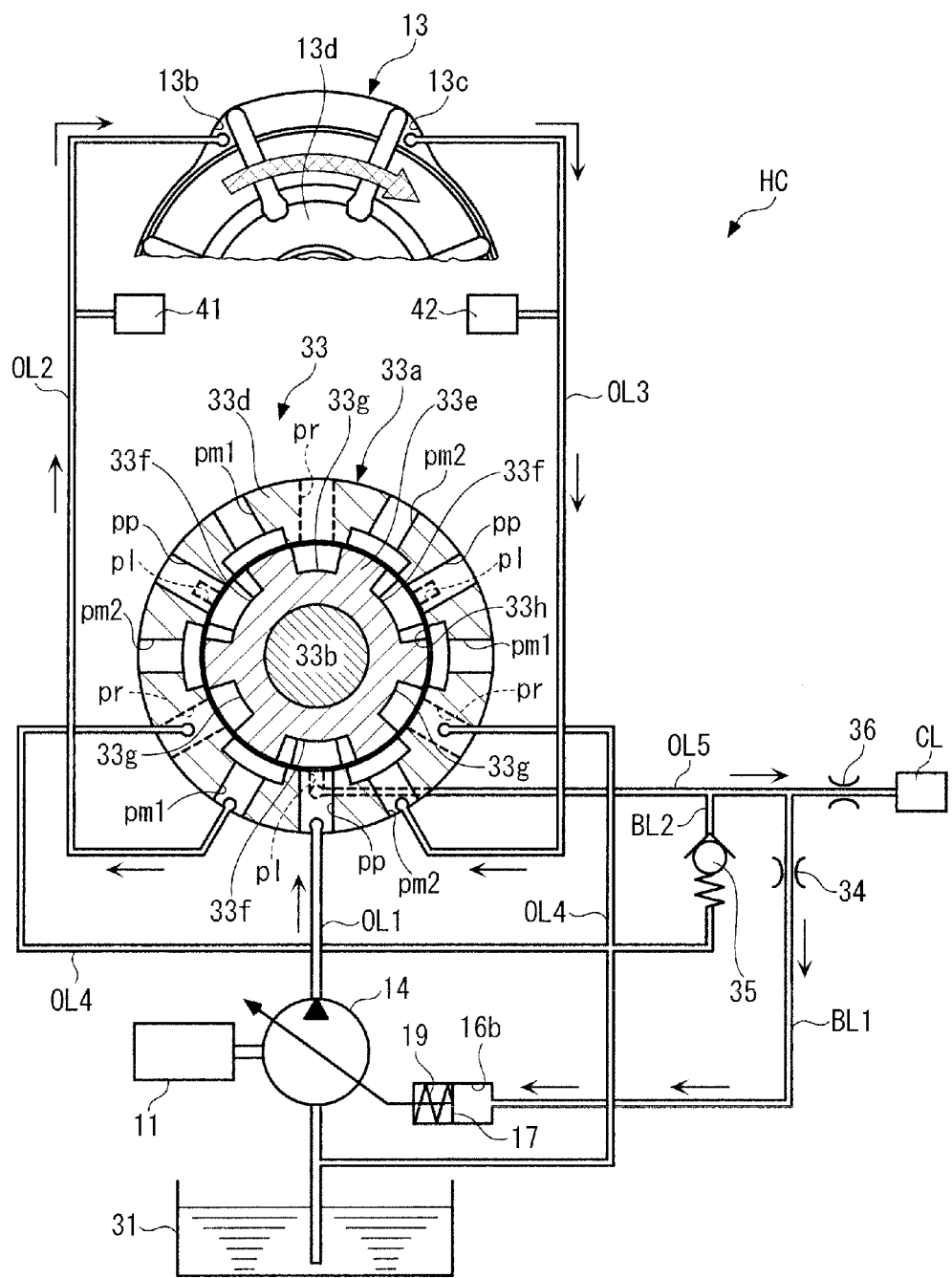
FIG. 10 A schematic view, partly broken away, of the hydraulic circuit and the hydraulic motor during the neutral mode and also in a case where an output shaft of the hydraulic motor is being rotated by an external force.

Further, FIG. 10 shows the hydraulic circuit HC, the hydraulic motor 13, and so forth in a case where during the neutral mode, the output shaft 13a of the hydraulic motor 13 is rotated counterclockwise, as viewed in the figure, by an external force. As shown in the figure, in this case as well, part of oil supplied from the hydraulic pump 14 to the inflow ports pp is supplied to the cooling and lubricating system CL. On the other hand, the remainder of the oil supplied from the hydraulic pump 14 to the inflow ports pp is supplied to the first pressure chamber 13b of the hydraulic motor 13 via the first motor ports pm1 and the second oil passage OL2. The oil supplied to the first pressure chamber 13b is discharged into the second pressure chamber 13c, and flows into the second oil passage OL2 via the third oil passage OL3, the second motor ports pm2, and the first motor ports pm1. Thus, during the neutral mode, in a case where the output shaft 13a of the hydraulic motor 13 is rotated clockwise, as viewed in FIG. 10, by an external force, the remainder of the oil supplied from the hydraulic pump 14 to the inflow ports pp is circulated through the second oil passage OL2, the hydraulic motor 13, the third oil passage OL3, and the switching valve 33a in the mentioned order.

On the other hand, during the neutral mode, when the output shaft 13a of the hydraulic motor 13 is rotated counterclockwise, as viewed in FIG. 10, by an external force, the remainder of the oil supplied from the hydraulic pump 14 to the inflow ports pp is circulated through the third oil passage OL3, the hydraulic motor 13, the second oil passage OL2, and the switching valve 33a, in the mentioned order (illustration thereof is omitted). Note that during the neutral mode, when the output shaft 13a of the hydraulic motor 13 is rotated by an external force, a differential pressure is generated between hydraulic pressure in the second oil passage OL2 and hydraulic pressure in the third oil passage OL3, whereby a negative torque acts on the output shaft 13a. Hereinafter, this negative torque is referred to as the "hydraulic motor friction torque". Note that the hydraulic motor friction torque is very small because it is generated by the circulation of oil through the second and third oil passages OL2 and OL3, the hydraulic motor 13, and the switching valve 33a.

As described hereinabove, during the neutral mode, the second and third oil passages OL2 and OL3, and the first and second pressure chambers 13b and 13c of the hydraulic motor 13 are held in a state where they are filled with the oil from the hydraulic pump 14.

[First Motor Mode (See FIGS. 11, 12, and 17)]

Figure 11:
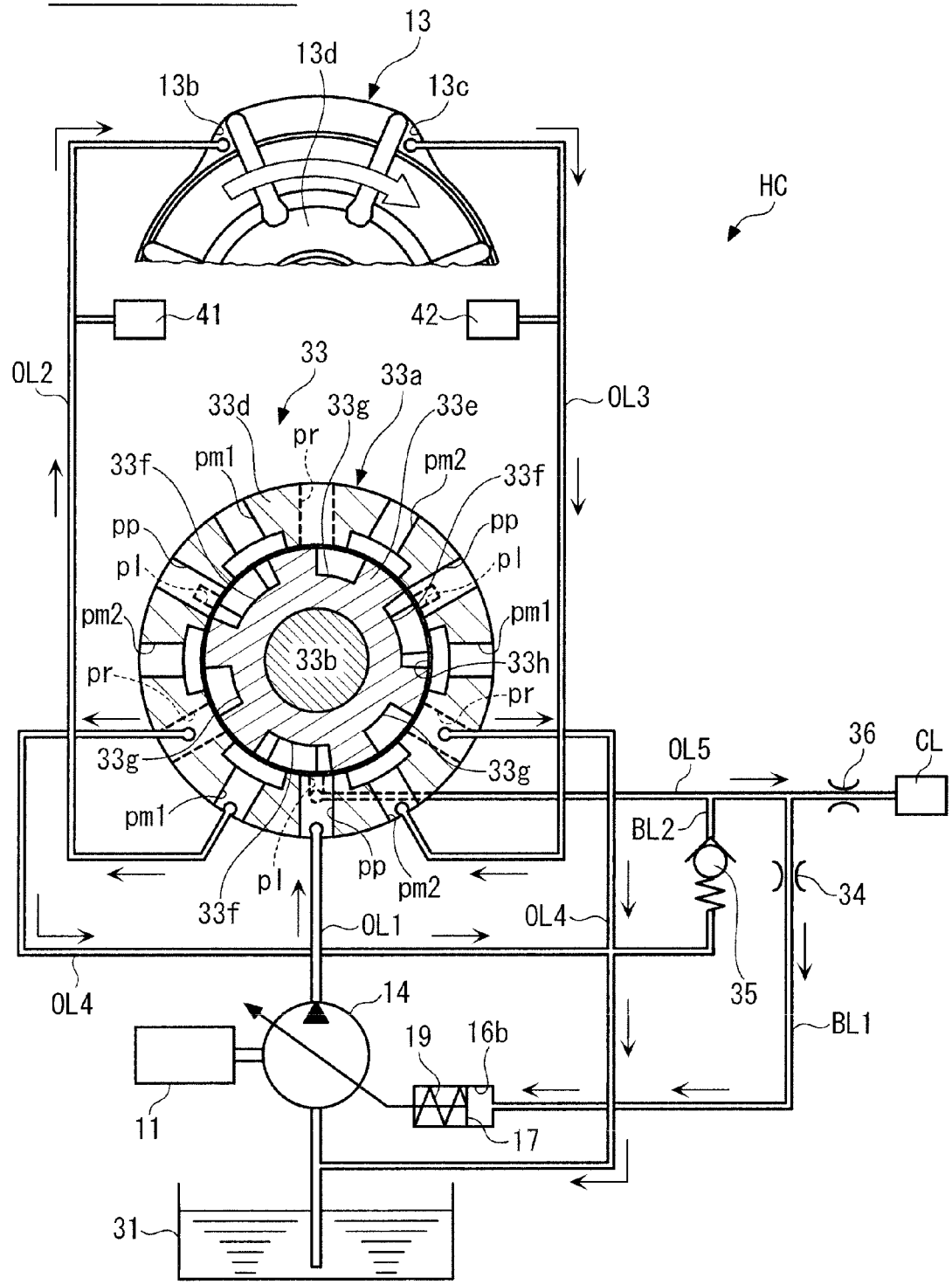
FIG. 11 A schematic view, partly broken away, of the hydraulic circuit and the hydraulic motor during a first motor mode.
Figure 12:
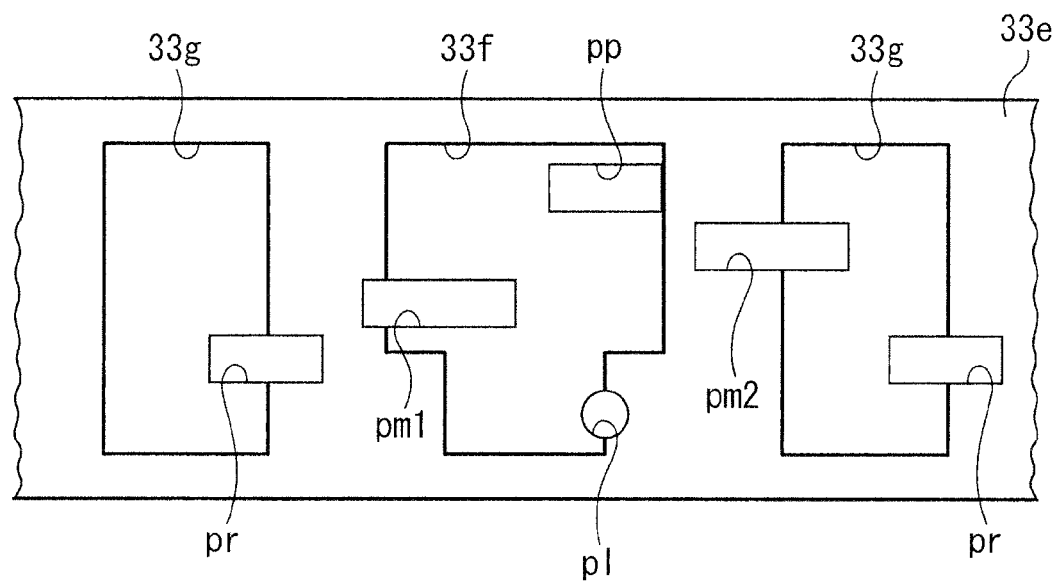
FIG. 12 A schematic view showing a positional relationship between each port of the sleeve and the first and second communication grooves, by developing the part of the sleeve of the switching device and the part of the valve element, in the circumferential direction, in a case where the valve element rotational angle position is a first rotational angle position.

The first motor mode is a control mode for causing the output shaft 13a of the hydraulic motor 13 to rotate clockwise, as viewed in FIG. 11, using hydraulic pressure from the hydraulic pump 14. During the first motor mode, the valve element rotational angle position $\theta VA$ is controlled to a position, shown in FIG. 11, which is closer to the first rotational angle position than the above-mentioned neutral position. As shown in FIGS. 11 and 12, during the first motor mode, when the valve element rotational angle position $\theta VA$ is controlled to the first rotational angle position, the valve element 33e shuts off the inflow ports pp, the first motor ports pm1, and the LUB ports pl, from the second motor ports pm2 and the return ports pr. The inflow ports pp, the first motor ports pm1, and the LUB ports pl communicate with each other via the first communication grooves 33f, and the second motor ports pm2 and the return ports pr communicate with each other via the second communication grooves 33g.

From the above, as shown in FIG. 11, similar to the case of the neutral mode, part of oil from the hydraulic pump 14 is supplied to the cooling and lubricating system CL via the first oil passage OL1, the inflow ports pp, the LUB ports pl, and the fifth oil passage OL5. Further, the remainder of the oil supplied from the hydraulic pump 14 to the inflow ports pp via the first oil passage OL1 is supplied to the first pressure chamber 13b of the hydraulic motor 13 via the first motor ports pm1 and the second oil passage OL2, whereby the rotor 13d and the output shaft 13a are rotated clockwise, as viewed in FIG. 11. The oil supplied to the first pressure chamber 13b is discharged into the second pressure chamber 13c, and is further discharged into the reservoir 31 via the third oil passage OL3, the second motor ports pm2, the return ports pr, and the fourth oil passages OL4.

Figure 17:
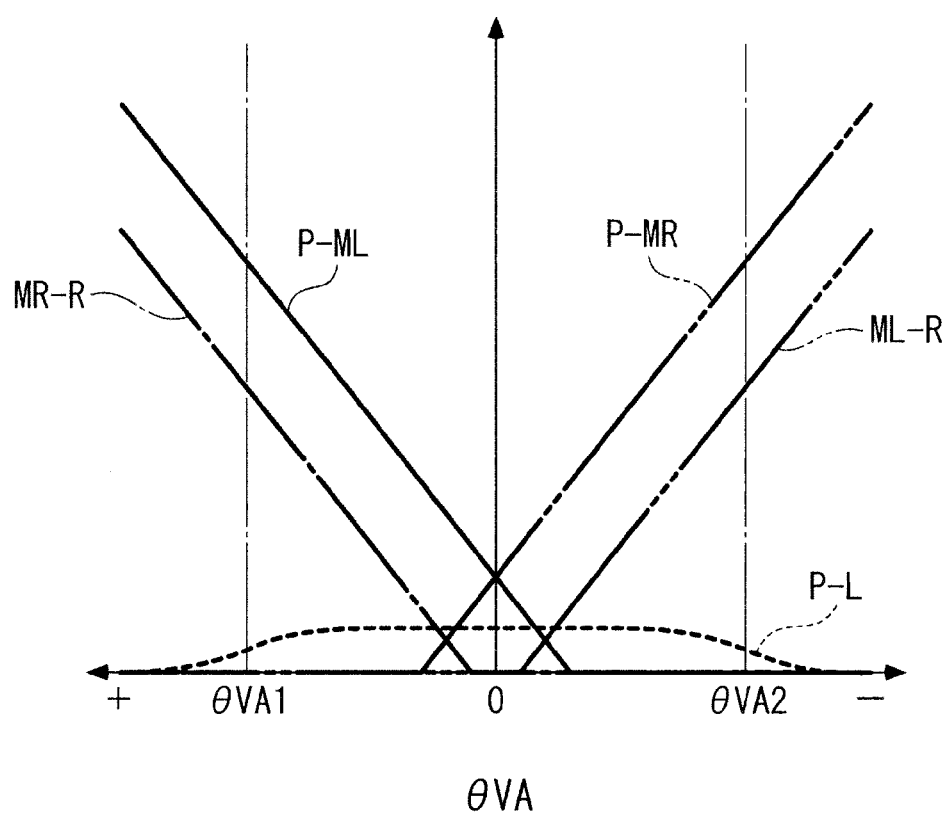
FIG. 17 A diagram showing a relationship between the valve element rotational angle position and communication areas of the respective ports with respect to the first and second communication grooves.

Further, FIG. 17 shows the relationship between the valve element rotational angle position θVA, and the degree of communication (communication area) of each of the ports pp, pm1, pm2, pr, and pl with the first and second communication grooves 33f and 33g. In FIG. 17, P-ML represents an area of communication of the first motor port pm1 with the first communication groove 33f (hereafter referred to as the "33f-pm1 communication area"), MR-R represents an area of communication of the second motor port pm2 with the second communication groove 33g (hereafter referred to as the "33g-pm2 communication area"). Further, P-MR represents an area of communication of the second motor port pm2 with the first communication groove 33f (hereafter referred to as the "33f-pm2 communication area"), and ML-R represents an area of communication of the first motor port pm1 with the second communication groove 33g (hereafter referred to as the "33g-pm1 communication area"). P-L represents an area of communication of the LUB port pl with the first communication groove 33f (hereafter referred to as the "33f-pl communication area"). Further, the valve element rotational angle position θVA=0 indicates that the valve element 33e is in the neutral position (see FIG. 3), and θVA1 and θVA2 represent the first and second rotational angle positions, respectively.

As is apparent from a comparison between FIGS. 12 and 8, further, as shown in FIG. 17, during the first motor mode, as the valve element rotational angle position θVA is closer to the first rotational angle position θVA1 than the neutral position, the 33f-pm1 communication area P-ML becomes larger, and the degree of communication between the inflow port pp and the first motor port pm1 via the first communication groove 33f becomes larger, whereby the amount of oil supplied to the first pressure chamber 13b becomes larger. Further, during the first motor mode, as the valve element rotational angle position θVA is closer to the first rotational angle position θVA1, the 33g-pm2 communication area MR-R becomes larger, and the degree of communication between the second motor port pm2 and the return port pr via the second communication groove 33g becomes larger than when the valve element rotational angle position θVA is in the neutral position, whereby the amount of oil discharged from the second pressure chamber 13c becomes larger. Further, as a differential pressure between the hydraulic pressure of the oil supplied to the first pressure chamber 13b, and the hydraulic pressure of the oil discharged from the second pressure chamber 13c is higher, an output torque output to the output shaft 13a of the hydraulic motor 13 becomes larger. From the above, during the first motor mode, as the valve element rotational angle position θVA is closer to the first rotational angle position θVA1, an output torque of the hydraulic motor 13 becomes larger.

On the other hand, during the first motor mode, as the valve element rotational angle position θVA is closer to the first rotational angle position θVA1, the 33f-pl communication area P-L becomes smaller, and the degree of communication between the inflow port pp and the LUB port pl via the first communication groove 33f becomes smaller, whereby the amount of oil supplied from the hydraulic pump 14 to the cooling and lubricating system CL becomes smaller. This also makes larger the amount of oil supplied from the hydraulic pump 14 to the first pressure chamber 13b of the hydraulic motor 13.

Further, during the first motor mode, the amount of oil supplied from the hydraulic pump 14 to the hydraulic motor 13 becomes larger than in the case of the neutral mode, and hence the LUB hydraulic pressure (hydraulic pressure supplied from the hydraulic pump 14 to the cooling and lubricating system CL) becomes smaller than the predetermined value PREF, and the second oil chamber supply hydraulic pressure PO16b of the hydraulic pump 14 becomes smaller. As a consequence, during the first motor mode, the cam ring eccentricity amount of the hydraulic pump 14 becomes automatically larger than in the case of the neutral mode, whereby the spring 19 is elongated, and the pump discharge amount QOP of the hydraulic pump 14 becomes larger.

[Second Motor Mode (See FIGS. 13, 14, and 17)]

Figure 13:
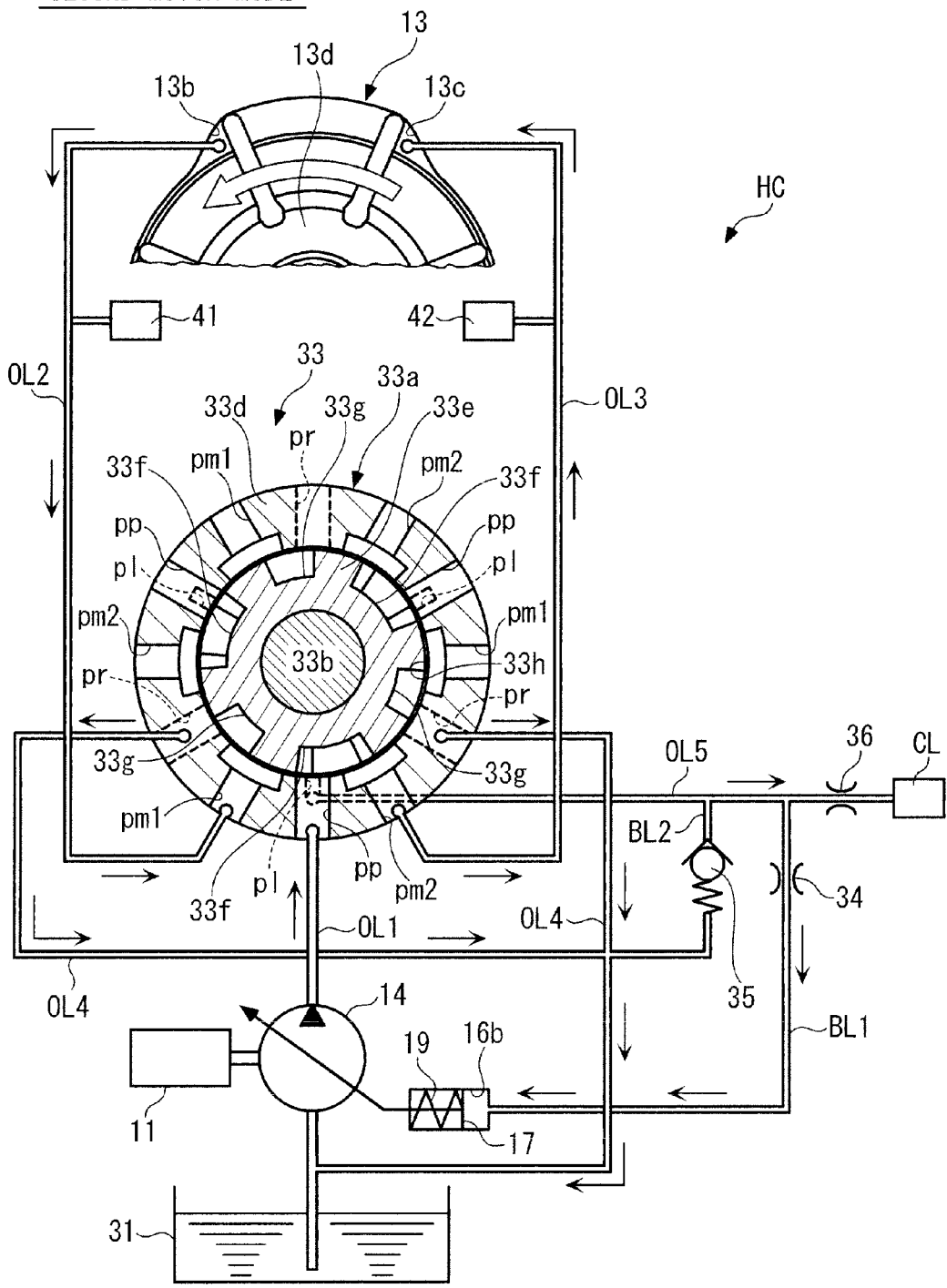
FIG. 13 A schematic view, partly broken away, of the hydraulic circuit and the hydraulic motor during a second motor mode.

The second motor mode is a control mode for causing the output shaft 13a of the hydraulic motor 13 to rotate counterclockwise, as viewed in FIG. 13, using hydraulic pressure from the hydraulic pump 14. During the second motor mode, the valve element rotational angle position θVA is controlled to a position closer to the second rotational angle position θVA2 shown in FIG. 13 than the above-mentioned neutral position. As shown in FIGS. 13 and 14, during the second motor mode, when the valve element rotational angle position θVA is controlled to the second rotational angle position θVA2, the valve element 33e shuts off the inflow ports pp, the second motor ports pm2 and the LUB ports pl, from the first motor ports pm1 and the return ports pr. The inflow ports pp, the second motor ports pm2, and the LUB ports pl communicate with each other via the first communication grooves 33f, and the first motor ports pm1 and the return ports pr communicate with each other via the second communication grooves 33g.

From the above, as shown in FIG. 13, similar to the case of the neutral mode, part of oil from the hydraulic pump 14 is supplied to the cooling and lubricating system CL via the first oil passage OL1, the inflow ports pp, the LUB ports pl, and the fifth oil passage OL5. Further, the remainder of the oil supplied from the hydraulic pump 14 to the inflow ports pp via the first oil passage OL1 is supplied to the second pressure chamber 13c of the hydraulic motor 13 via the second motor ports pm2 and the third oil passage OL3, whereby the rotor 13d and the output shaft 13a are rotated counterclockwise, as viewed in FIG. 13. The oil supplied to the second pressure chamber 13c is discharged into the first pressure chamber 13b, and is further discharged into the reservoir 31 via the second oil passage OL2, the first motor ports pm1, the return ports pr, and the fourth oil passages OL4.

As is apparent from a comparison between FIGS. 14 and 8, further, as shown in FIG. 17, during the second motor mode, as the valve element rotational angle position θVA is closer to the second rotational angle position θVA2 than the neutral position, the 33f-pm2 communication area P-MR becomes larger, and the degree of communication between the inflow port pp and the second motor port pm2 via the first communication groove 33f becomes larger, whereby the amount of oil supplied to the second pressure chamber 13c becomes larger. Further, during the second motor mode, as the valve element rotational angle position θVA is closer to the second rotational angle position θVA2, the 33g-pm1 communication area ML-R becomes larger, and the degree of communication between the first motor port pm1 and the return port pr via the second communication groove 33g becomes larger than when the valve element rotational angle position θVA is in the neutral position, whereby the amount of oil discharged from the first pressure chamber 13b becomes larger. Further, as a differential pressure between the hydraulic pressure of oil supplied to the second pressure chamber 13c and the hydraulic pressure of the oil discharged into the first pressure chamber 13b is higher, the output torque output to the output shaft 13a of the hydraulic motor 13 becomes larger. From the above, during the second motor mode, as the valve element rotational angle position θVA is closer to the second rotational angle position θVA2, the output torque of the hydraulic motor 13 becomes larger.

On the other hand, during the second motor mode, as the valve element rotational angle position θVA is closer to the second rotational angle position θVA2, similar to the case of the first motor mode, the 33f-pl communication area P-L becomes smaller, and the degree of communication between the inflow port pp and the LUB port pl via the first communication groove 33f becomes smaller, whereby the amount of oil supplied from the hydraulic pump 14 to the cooling and lubricating system CL becomes smaller. This also makes larger the amount of oil supplied from the hydraulic pump 14 to the second pressure chamber 13c of the hydraulic motor 13.

Further, during the second motor mode, similar to the case of the first motor mode, the amount of oil supplied from the hydraulic pump 14 to the hydraulic motor 13 becomes larger than in the case of the neutral mode, and hence the LUB hydraulic pressure becomes smaller than the predetermined value PREF, and the second oil chamber supply hydraulic pressure PO16b of the hydraulic pump 14 becomes smaller. As a consequence, during the second motor mode, the cam ring eccentricity amount of the hydraulic pump 14 becomes automatically larger than in the case of the neutral mode, whereby the spring 19 is extended, and the pump discharge amount QOP of the hydraulic pump 14 becomes larger.

[First Pump Mode (See FIGS. 15, 14, and 17)]

Figure 15:
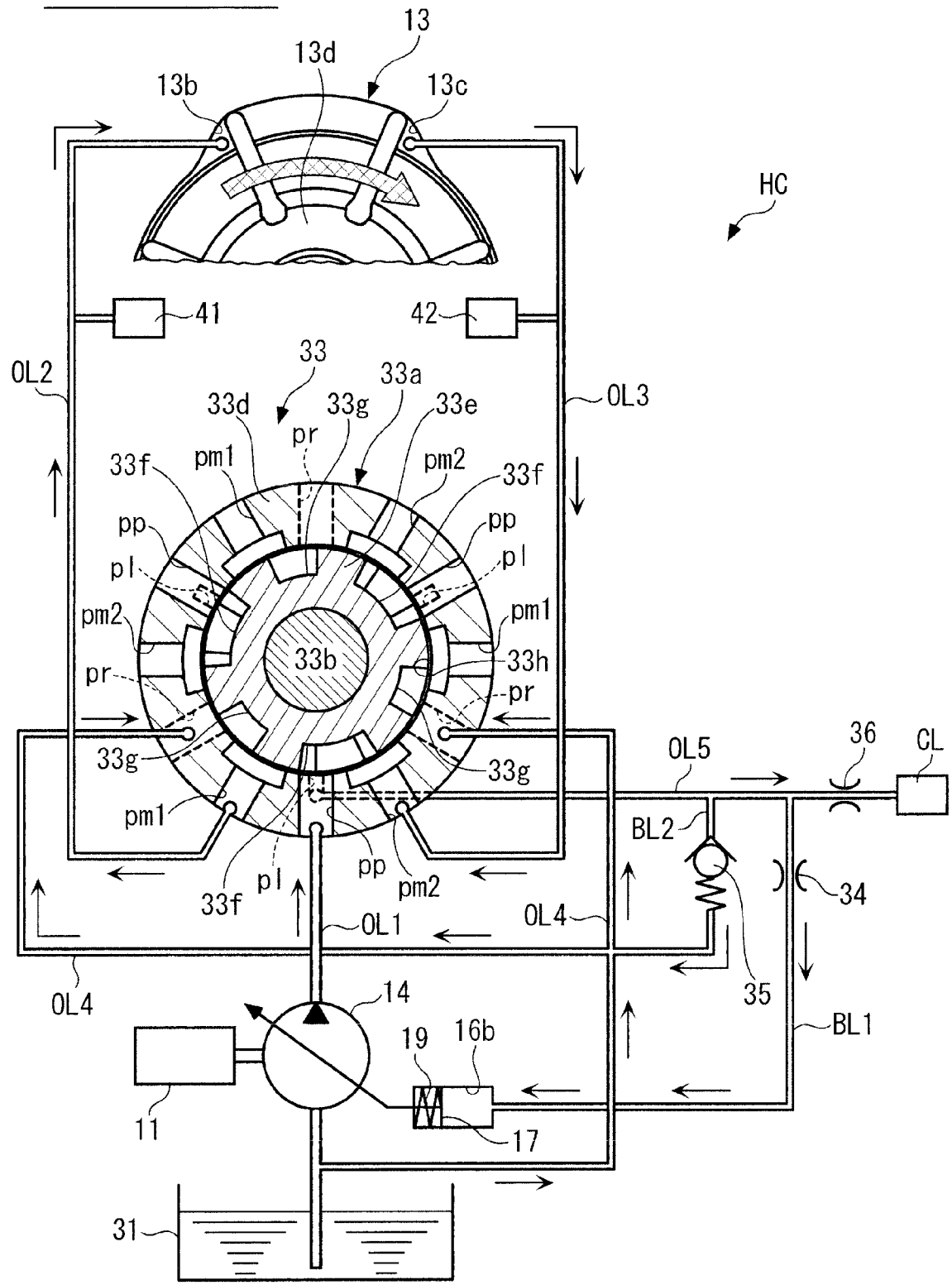
FIG. 15 A schematic view, partly broken away, of the hydraulic circuit and the hydraulic motor during a first pump mode.

The first pump mode is a control mode for causing the hydraulic motor 13 to operate as a pump when the output shaft 13a of the hydraulic motor 13 is being rotated clockwise, as viewed in FIG. 15, by an external force. During the first pump mode, the valve element rotational angle position θVA is controlled to a position closer to the second rotational angle position θVA2 than the neutral position. As shown in FIG. 15, during the first pump mode, when the valve element rotational angle position θVA is controlled to the second rotational angle position θVA2, similar to the case of the second motor mode, the valve element 33e shuts off the inflow ports pp, the second motor ports pm2, and the LUB ports pl, from the first motor ports pm1 and the return ports pr. The inflow ports pp, the second motor ports pm2, and the LUB ports pl communicate with each other via the first communication grooves 33f, and the first motor ports pm1 and the return ports pr communicate with each other via the second communication grooves 33g.

During the first pump mode, the ports communicate with each other, as described above, and the output shaft 13a and the rotor 13d are rotated clockwise, as viewed in FIG. 15, by the external force, whereby the hydraulic motor 13 functions as a pump, as mentioned above. This causes oil in the reservoir 31 to be drawn into the first pressure chamber 13b via the fourth oil passages OL4, the return ports pr, the first motor ports pm1, and the second oil passage OL2. The oil drawn into the first pressure chamber 13b is discharged into the second pressure chamber 13c, and is supplied to the cooling and lubricating system CL via the third oil passage OL3, the second motor ports pm2, the LUB ports pl, and the fifth oil passage OL5. Further, in this case, the oil from the hydraulic pump 14 is supplied to the cooling and lubricating system CL via the first oil passage OL1, the inflow ports pp, the LUB ports pl, and the fifth oil passage OL5.

As described hereinabove, during the first pump mode, not only the oil from the hydraulic pump 14, but also the oil from the hydraulic motor 13 that operates as a pump is supplied to the cooling and lubricating system CL. The hydraulic pressure of oil in the fifth oil passage OL5 sometimes becomes relatively high depending on the discharge amount of oil from the hydraulic motor 13. In this case, the above-described check valve 35 opens, whereby surplus oil in the fifth oil passage OL5 flows into the fourth oil passages OL4 via the second branch oil passage BL2, and is further supplied to the hydraulic motor 13 via the first oil passage OL1.

As is apparent from a comparison between FIGS. 14 and 8, further, as shown in FIG. 17, during the first pump mode, as the valve element rotational angle position θVA is closer to the second rotational angle position θVA2 than the neutral position, the 33g-pm1 communication area ML-R becomes larger, and the degree of communication between the return port pr and the first motor port pm1 via the second communication groove 33g becomes larger than when the valve element rotational angle position θVA is in the neutral position, whereby the amount of oil drawn into the first pressure chamber 13b becomes larger. Further, during the first pump mode, as the valve element rotational angle position θVA is closer to the second rotational angle position θVA2, the 33f-pm2 communication area P-MR becomes larger, and the degree of communication between the second motor port pm2 and the LUB port pl via the first communication groove 33f becomes larger, whereby the amount of oil discharged from the second pressure chamber 13c becomes larger. Further, during the first pump mode, since the hydraulic motor 13 operates as a pump, a negative torque (braking torque) is output to the output shaft 13a, and the absolute value of the negative torque output to the output shaft 13a becomes larger as a differential pressure between the hydraulic pressure of the oil drawn into the first pressure chamber 13b and the hydraulic pressure of the oil discharged from the second pressure chamber 13c is larger. From the above, during the first pump mode, as the valve element rotational angle position θVA is closer to the second rotational angle position θVA2, braking torque of the hydraulic motor 13 becomes larger.

Further, during the first pump mode, since both of the oil from the hydraulic pump 14 and the oil from the hydraulic motor 13 are supplied to the cooling and lubricating system CL, the LUB hydraulic pressure becomes larger than the predetermined value PREF, and the second oil chamber supply hydraulic pressure PO16b of the hydraulic pump 14 becomes larger than in the case of the neutral mode. As a consequence, during the first pump mode, the cam ring eccentricity amount of the hydraulic pump 14 becomes automatically smaller than in the case of the neutral mode, whereby the spring 19 is contracted, and the pump discharge amount QOP of the hydraulic pump 14 becomes smaller.

[Second Pump Mode (See FIGS. 16, 12, and 17)]

Figure 16:
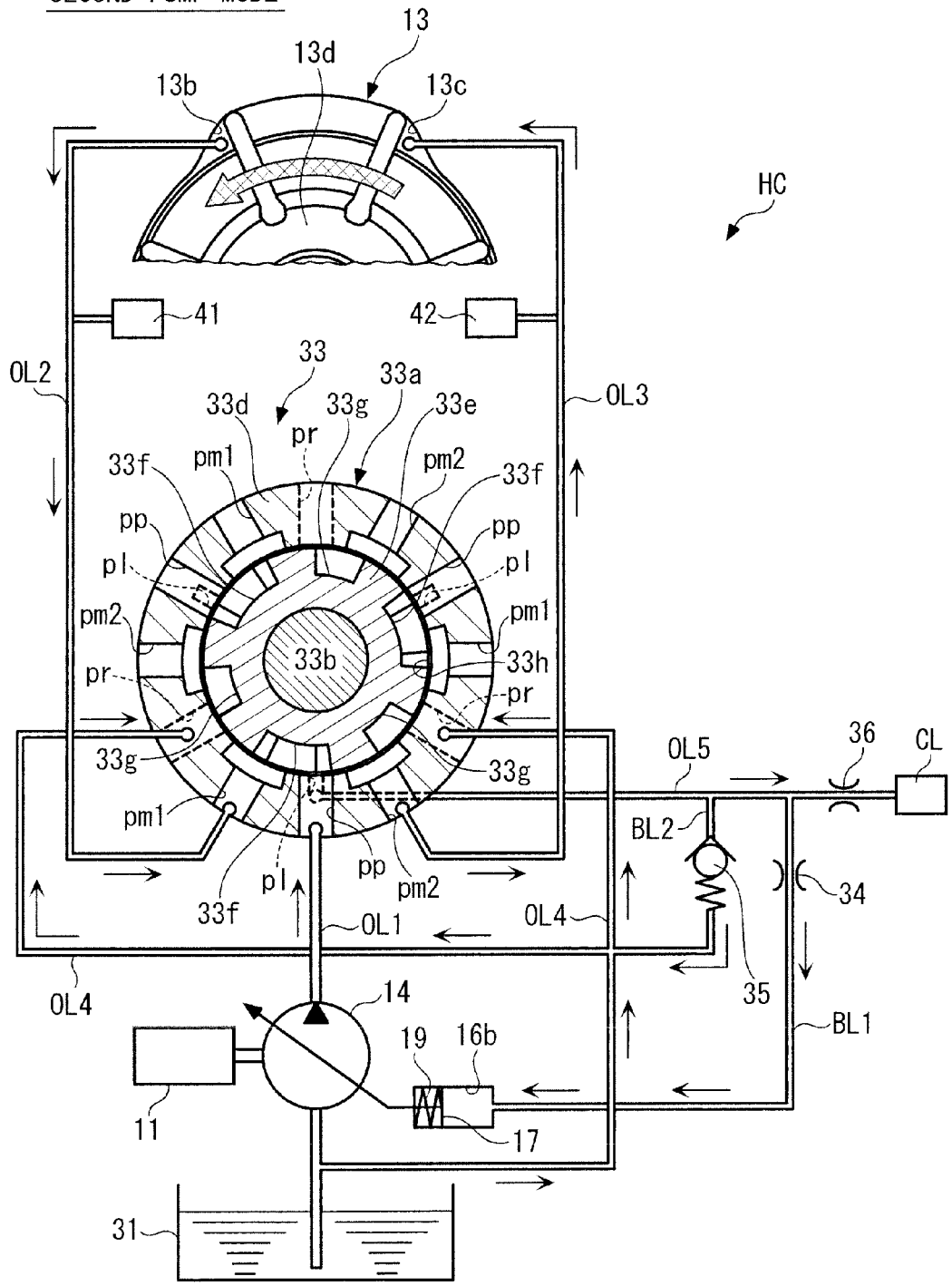
FIG. 16 A schematic view, partly broken away, of the hydraulic circuit and the hydraulic motor during a second pump mode.

The second pump mode is a control mode for causing the hydraulic motor 13 to operate as a pump when the output shaft 13a of the hydraulic motor 13 is being rotated counterclockwise, as viewed in FIG. 16, by an external force. During the second pump mode, the valve element rotational angle position θVA is controlled to a position closer to the first rotational angle position θVA than the neutral position. As shown in FIG. 16, during the second pump mode, when the valve element rotational angle position θVA is controlled to the first rotational angle position θVA1, similar to the case of the first motor mode, the valve element 33e shuts off the inflow ports pp, the first motor ports pm1, and the LUB ports pl, from the second motor ports pm2 and the return ports pr. The inflow ports pp, the first motor ports pm1, and the LUB ports pl communicate with each other via the first communication grooves 33f, and the second motor ports pm2 and the return ports pr communicate with each other via the second communication grooves 33g.

During the second pump mode, the ports communicate with each other, as described above, and the output shaft 13a and the rotor 13d are rotated counterclockwise, as viewed in FIG. 16, by an external force, whereby the hydraulic motor 13 functions as a pump, as mentioned above. This causes oil in the reservoir 31 to be drawn into the second pressure chamber 13c via the fourth oil passages OL4, the return ports pr, the second motor ports pm2, and the third oil passage OL3. The oil drawn into the second pressure chamber 13c is discharged into the first pressure chamber 13b, and is further supplied to the cooling and lubricating system CL via the second oil passage OL2, the first motor ports pm1, the LUB ports pl, and the fifth oil passage OL5. Further, in this case, the oil from the hydraulic pump 14 is supplied to the cooling and lubricating system CL via the first oil passage OL1, the inflow ports pp, the LUB ports pl, and the fifth oil passage OL5.

As described above, during the second pump mode, similar to the case of the first pump mode, not only the oil from the hydraulic pump 14, but also the oil from the hydraulic motor 13 that operates as a pump is supplied to the cooling and lubricating system CL. In this case as well, surplus oil in the fifth oil passage OL5 is supplied to the hydraulic motor 13 via the second branch oil passage BL2, the fourth oil passages OL4, and the first oil passage OL1.

As is apparent from a comparison between FIGS. 12 and 8, further, as shown in FIG. 17, during the second pump mode, as the valve element rotational angle position θVA is closer to the first rotational angle position θVA1 than the neutral position, the 33g-pm2 communication area MR-R becomes larger, and the degree of communication between the return port pr and the second motor port pm2 via the second communication groove 33g becomes larger than when the valve element rotational angle position θVA is in the neutral position, whereby the amount of oil drawn into the second pressure chamber 13c becomes larger. Further, during the second pump mode, as the valve element rotational angle position θVA is closer to the first rotational angle position θVA1, the 33f-pm1 communication area P-ML becomes larger, and the degree of communication between the first motor port pm1 and the LUB port pl via the first communication groove 33f becomes larger, whereby the amount of oil discharged from the first pressure chamber 13b becomes larger. Further, during the second pump mode, since the hydraulic motor 13 operates as a pump, a negative torque (braking torque) is output to the output shaft 13a, and the absolute value of the negative torque output to the output shaft 13a becomes larger as a differential pressure between the hydraulic pressure of the oil drawn into the second pressure chamber 13c and the hydraulic pressure of the oil discharged from the first pressure chamber 13b is larger. From the above, during the second pump mode, as the valve element rotational angle position θVA is closer to the first rotational angle position θVA1, the braking torque of the hydraulic motor 13 becomes larger.

Further, during the second pump mode, similar to the case of the first pump mode, since both of the oil from the hydraulic pump 14 and the oil from the hydraulic motor 13 are supplied to the cooling and lubricating system CL, the LUB hydraulic pressure becomes larger than the predetermined value PREF, and the second oil chamber supply hydraulic pressure PO16b of the hydraulic pump 14 becomes larger than in the case of the neutral mode. As a consequence, during the second pump mode, the cam ring eccentricity amount of the hydraulic pump 14 becomes automatically smaller than in the case of the neutral mode, whereby the spring 19 is contracted, and the pump discharge amount QOP of the hydraulic pump 14 becomes smaller.

Note that although in the present embodiment, the switching valve 33a is configured such that the valve element rotational angle position θVA is changed within a range of the first rotational angle position θVA1, and within a range of the second rotational angle position θVA2, it may be configured such that the valve element rotational angle position θVA becomes larger than the first and second rotational angle positions θVA1 and θVA2 as shown in FIG. 17.

Further, the second and third oil passages OL2 and OL3 are provided with a first hydraulic pressure sensor 41 and a second hydraulic pressure sensor 42, respectively. The first and second hydraulic pressure sensors 41 and 42 detect hydraulic pressures of oil flowing through the second and third oil passages OL2 and OL3 (hereafter referred to as the "second oil passage hydraulic pressure PO2" and the "third oil passage hydraulic pressure PO3", respectively), and delivers signals indicative of the detected second and third oil passage hydraulic pressures PO2 and PO3 to the ECU 2 (see FIG. 9). As is apparent from the fact that the second and third oil passages OL2 and OL3 are connected to the first and second pressure chambers 13b and 13c of the hydraulic motor 13, respectively, as described above, the second oil passage hydraulic pressure PO2 and the third oil passage hydraulic pressure PO3 represent hydraulic pressures in the first and second pressure chambers 13b and 13c, respectively.

Figure 9:
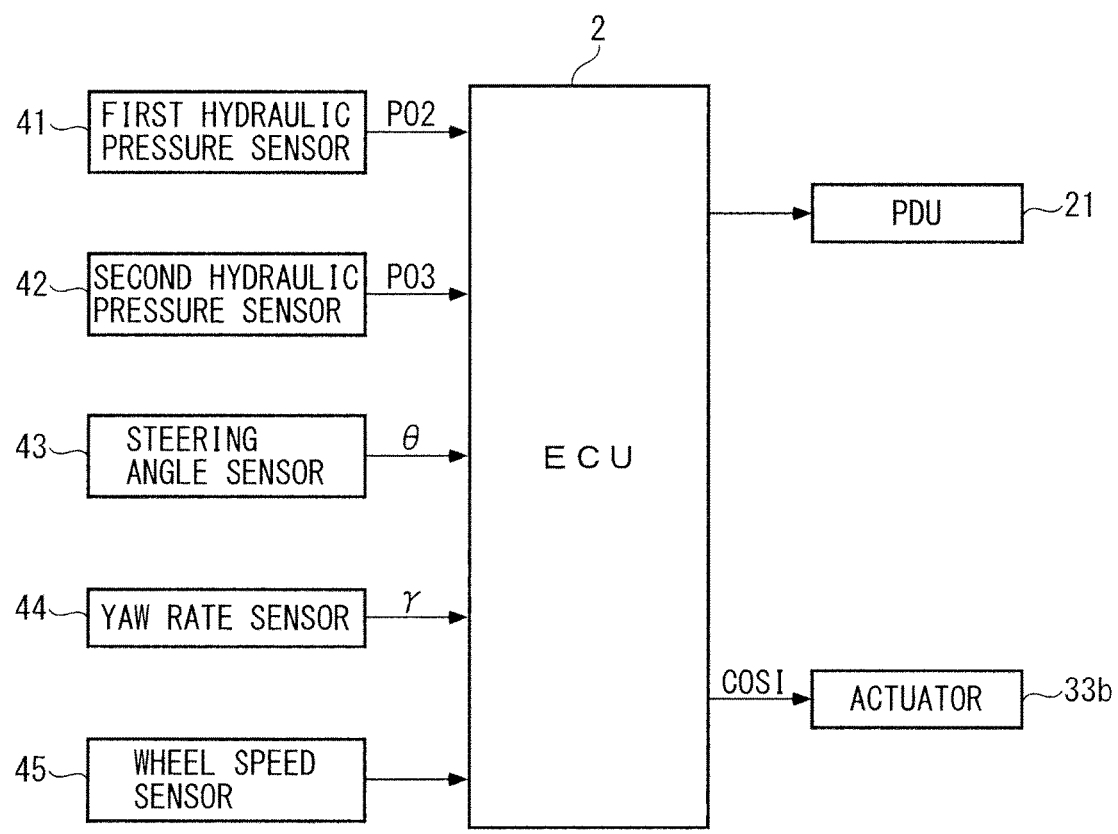
FIG. 9 A block diagram of an ECU and so forth of the power plant.

Further, as shown in FIG. 9, detection signals from various sensors for detecting parameters indicative of a traveling state of the vehicle V are input to the ECU 2. More specifically, to the ECU 2, a detection signal indicative of a steering angle θ of a steering wheel (not shown) of the vehicle V is input from a steering angle sensor 43, a detection signal indicative of a yaw rate γ of the vehicle V is input from a yaw rate sensor 44, and detection signals indicative of rotational speeds of the left and right front wheels WFL and WFR and the left and right rear wheels WRL and WRR are input from wheel speed sensors 45. In this case, the steering angle θ is detected as a positive value when the vehicle V is turning to the left, and is detected as a negative value when the vehicle V is turning to the right. The yaw rate γ is detected as a positive value during clockwise turning of the vehicle V, and is detected as a negative value during counterclockwise turning of the vehicle V. The ECU 2 calculates a vehicle speed VP of the vehicle V according to the rotational speeds of the respective wheels detected by the wheel speed sensors 45 (a step 11 in FIG. 34, referred to hereinafter). Hereinafter, the rotational speeds of the left and right rear wheels WRL and WRR are referred to as the "left rear wheel rotational speed NWRL" and the "right rear wheel rotational speed NWRR", respectively.

The ECU 2 is implemented by a microcomputer comprised of an I/O interface, a CPU, a RAM, and a ROM, and controls operations of the above-described rotating electric machine 11 and switching device 33, in response to the detection signals from the aforementioned sensors 41 to 45, according to control programs stored in the ROM. With this control, various operations of the power plant 1 are performed.

Figure 18:
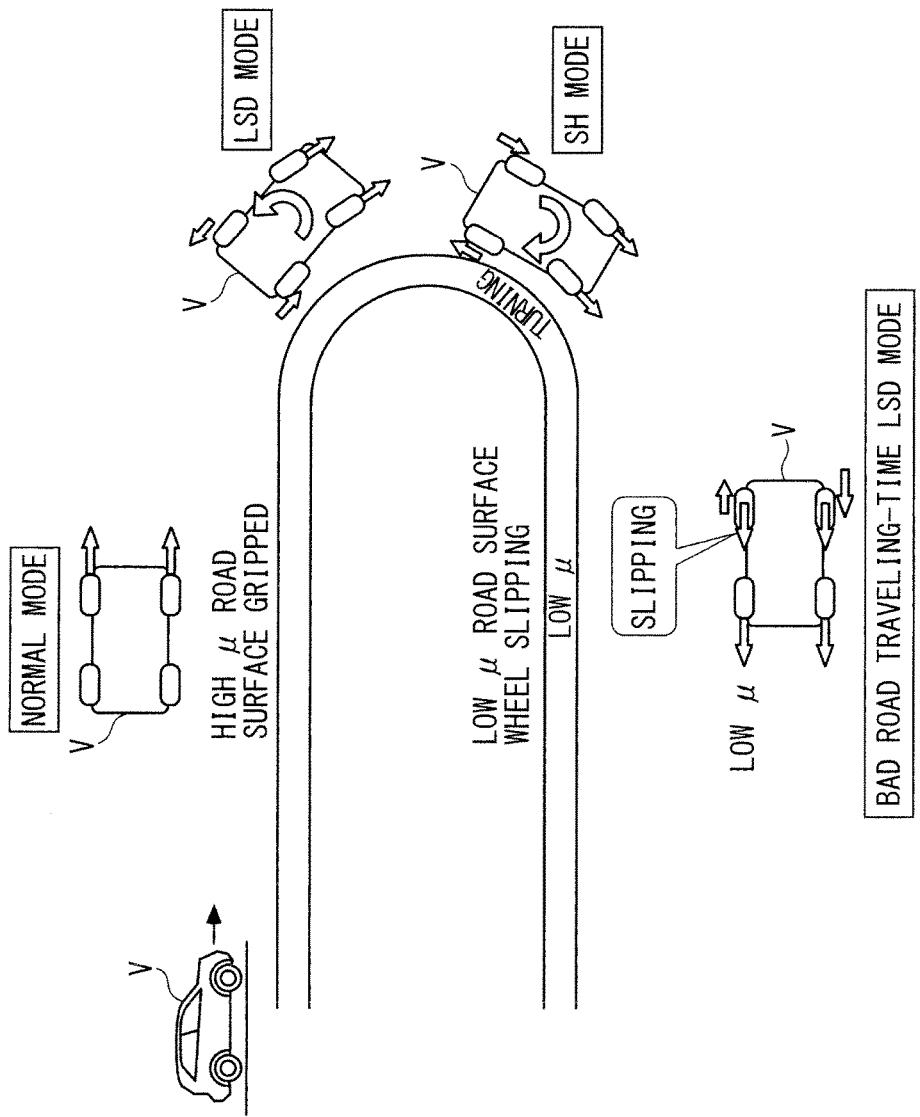
FIG. 18 A schematic diagram showing an example of a relationship between traveling states of the vehicle and operation modes of the power plant in FIG. 2.

Operation modes of the power plant 1 constructed as above include a normal mode, an AWD mode, an SH (Super Handling) mode, an LSD (Limited Slip Differential) mode, and a bad road traveling-time LSD mode (see FIG. 18). Hereinafter, a description will be sequentially given of these operation modes.

[Normal Mode (See FIGS. 19 to 23)]

Figure 19:
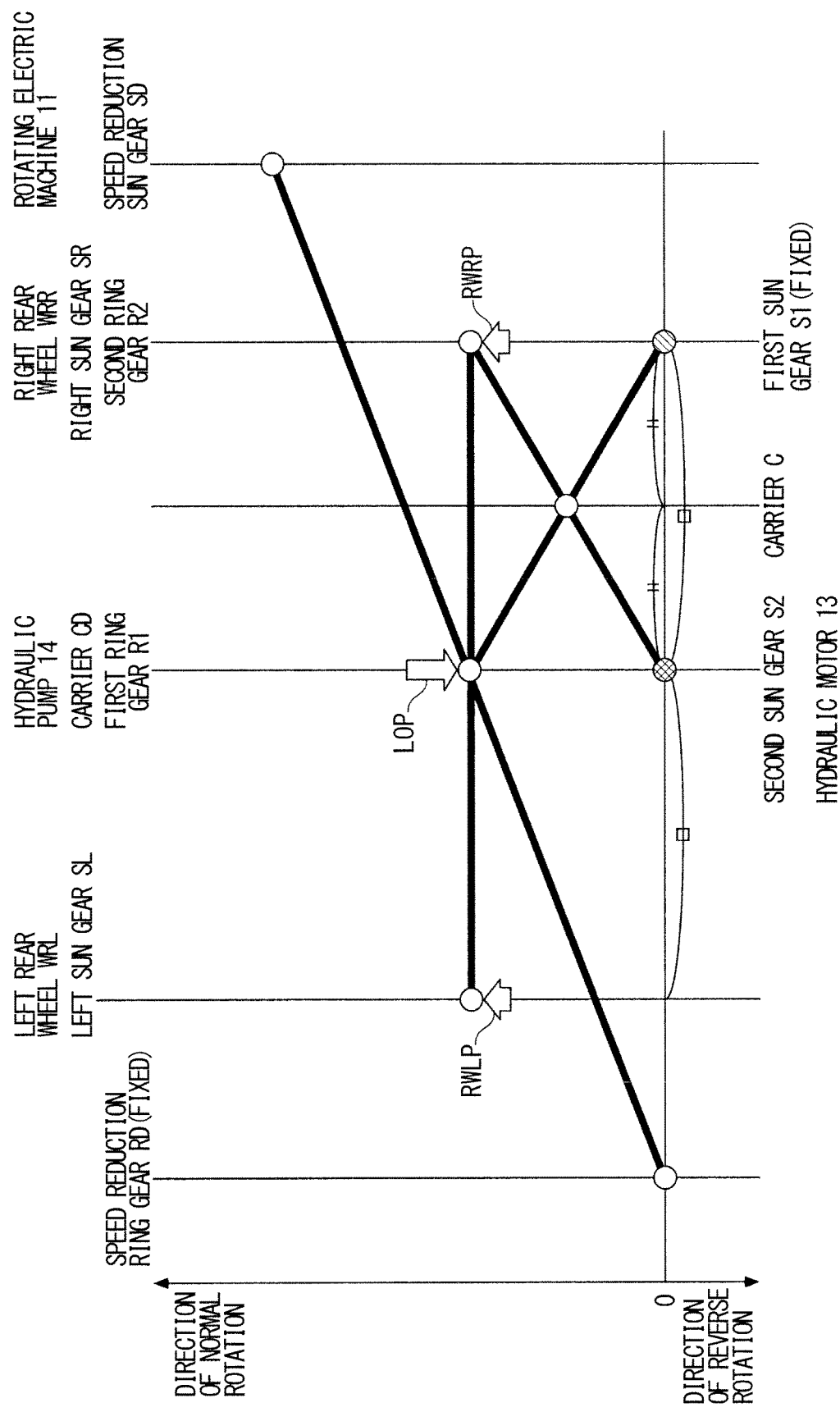
FIG. 19 A diagram of a speed collinear chart showing an example of a rotational speed relationship and a torque balance relationship between various types of rotary elements of the power plant in FIG. 2, as to during a normal mode and also during straight forward traveling of the vehicle.

The normal mode is an operation mode used e.g. when the vehicle V is traveling on a high μ road, and the left and right rear wheels WRL and WRR are not slipping. During the normal mode, the control mode of the hydraulic motor 13 is set to the neutral mode. FIG. 19 shows a speed collinear chart showing a rotational speed relationship and a torque balance relationship between various types of rotary elements, such as the rotating electric machine 11 and the speed reduction sun gear SD of the transmission system 12, as to during the normal mode and also during straight forward traveling of the vehicle V. For the manner of describing the rotational speeds of the various types of rotary elements in this speed collinear chart, please refer to e.g. Publication of Japanese Patent No. 5153587 of the present applicant, which discloses the same.

As is apparent from the above-described connection relationship and meshing relationship between the various types of rotary elements, the rotational speed of the speed reduction sun gear SD, the rotational speed of the carrier CD, and the rotational speed of the speed reduction ring gear RD satisfy a collinear relationship in which the rotational speeds are aligned in the same straight line in a collinear chart in the mentioned order. The rotational speed of the speed reduction sun gear SD is equal to the rotational speed of the rotating electric machine 11, and the rotational speed of the carrier CD is equal to the rotational speed of the input shaft 14a of the hydraulic pump 14 (hereafter referred to as the "rotational speed of the hydraulic pump 14"). Since the speed reduction ring gear RD is fixed to the casing CA, the rotational speed thereof is always equal to 0. Further, the rotational speed of the left sun gear SL, the rotational speed of the right sun gear SR, and the rotational speed of the carrier CD satisfy a collinear relationship in which the rotational speeds are aligned in the same straight line in a collinear chart in the mentioned order. The rotational speed of the left sun gear SL is equal to the left rear wheel rotational speed NWRL, and the rotational speed of the right sun gear SR is equal to the right rear wheel rotational speed NWRR.

Furthermore, the rotational speed of the first sun gear S1, the rotational speed of the carrier C, and the rotational speed of the first ring gear R1 satisfy a collinear relationship in which the rotational speeds are aligned in the same straight line in a collinear chart in the mentioned order. Similarly, the rotational speed of the second sun gear S2, the rotational speed of the carrier C, and the rotational speed of the second ring gear R2 satisfy a collinear relationship in which the rotational speeds are aligned in the same straight line in a collinear chart in the mentioned order. Since the first sun gear S1 is fixed to the casing CA, the rotational speed thereof is always equal to 0. The rotational speed of the first ring gear R1 is equal to the rotational speed of the carrier CD and the rotational speed of the hydraulic pump 14. Further, the rotational speed of the second sun gear S2 is equal to the rotational speed of the output shaft 13a of the hydraulic motor 13 (hereafter referred to as the "rotational speed of the hydraulic motor 13" in abbreviation), and the rotational speed of the second ring gear R2 is equal to the rotational speed of the right sun gear SR and the right rear wheel rotational speed NWRR.

Here, as is apparent from the settings of the numbers of gear teeth of the various types of gears of the first and second planetary gear units PS1 and PS2, described using the aforementioned equation (1), in the collinear chart, the distance between the first sun gear S1 and the carrier C and the distance between the carrier C and the first ring gear R1 are equal to each other, and the distance between the second sun gear S2 and the carrier C and the distance between the carrier C and the second ring gear R2 are equal to each other. Therefore, in FIG. 19, the rotational speed of the right sun gear SR, the right rear wheel rotational speed NWRR, and the rotational speed of the second ring gear R2 are illustrated in the same vertical line as the rotational speed of the first sun gear S1. In the figure, a white circle represents the rotational speed of the right sun gear SR, the right rear wheel rotational speed NWRR, and the rotational speed of the second ring gear R2, and a circle shaded by hatching represents the rotational speed of the first sun gear S1.

Similarly, the rotational speed of the carrier CD, the rotational speed of the hydraulic pump 14, and the rotational speed of the first ring gear R1 are illustrated in the same vertical line as the rotational speed of the second sun gear S2 and the rotational speed of the hydraulic motor 13. A white circle represents the rotational speed of the carrier CD, the rotational speed of the hydraulic pump 14, and the rotational speed of the first ring gear R1, and a circle gridded by hatching represents the rotational speed of the second sun gear S2 and the rotational speed of the hydraulic motor 13. In this case, when the rotational direction of the output shaft 13a of the hydraulic motor 13 is the direction of normal rotation, the output shaft 13a is rotating counterclockwise, as viewed in FIGS. 3 and 10, whereas when the rotational direction of the same is the direction of reverse rotation, the output shaft 13a is rotating clockwise, as viewed in FIGS. 3 and 10.

Further, in FIG. 19, LOP represents load torque of the hydraulic pump 14 (hereafter referred to as the "pump load torque"), and RWLP and RWRP represent reaction force torques acting on the left and right rear wheels WRL and WRR according to the pump load torque LOP, respectively. As shown in FIG. 19, during the normal mode and also during the straight forward traveling of the vehicle V, the left and right rear wheel rotational speeds NWRL and NWRR become equal to each other, and the rotational speed of the hydraulic motor 13 becomes equal to 0. Further, the control mode of the hydraulic motor 13 is set to the neutral mode, whereby the hydraulic motor 13 enters the neutral state without being operated by the hydraulic pressure from the hydraulic pump 14, so that the torques of the left and right rear wheels WRL and WRR are not adjusted by the hydraulic motor 13, and the pump load torque LOP is distributed to the left and right rear wheels WRL and WRR at 1:1 via the differential gear DS. In other words, a torque formed by combining the torques of the left and right rear wheels WRL and WRR, which rotate along with driving of the left and right front wheels WFL and WFR by the engine 3, is transmitted to the hydraulic pump 14, whereby the hydraulic pump 14 is driven.

Figure 20:
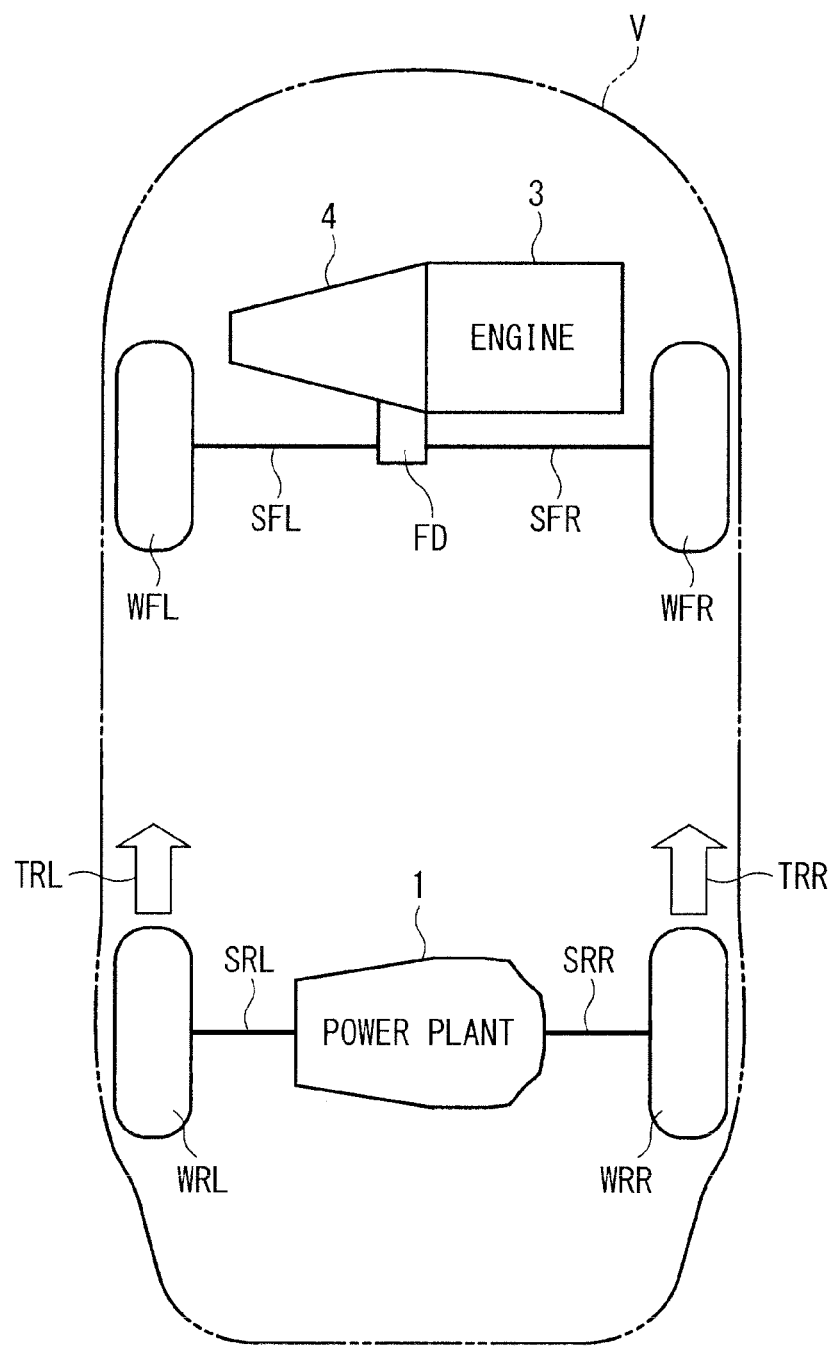
FIG. 20 A diagram useful in explaining a magnitude relationship between torques of the left and right rear wheels, as to during the normal mode and also during the straight forward traveling of the vehicle.

From the above, as shown in FIG. 20, during the normal mode and also during the straight forward traveling of the vehicle V, the torques of the left and right rear wheels WRL and WRR (hereafter referred to as the "left rear wheel torque", and the "right rear wheel torque", respectively) TRL and TRR become equal to each other. Here, assuming that the torques of the left and right rear wheels WRL and WRR, which are generated by driving of the left and right front wheels WFL and WFR by the engine 3, are represented by TIL and TIR, respectively, the left rear wheel torque TRL and the right rear wheel torque TRR satisfy TRL=TRR=TIL (or TIR)−LOP/2 (provided that TIL=TIR).

Figure 21:
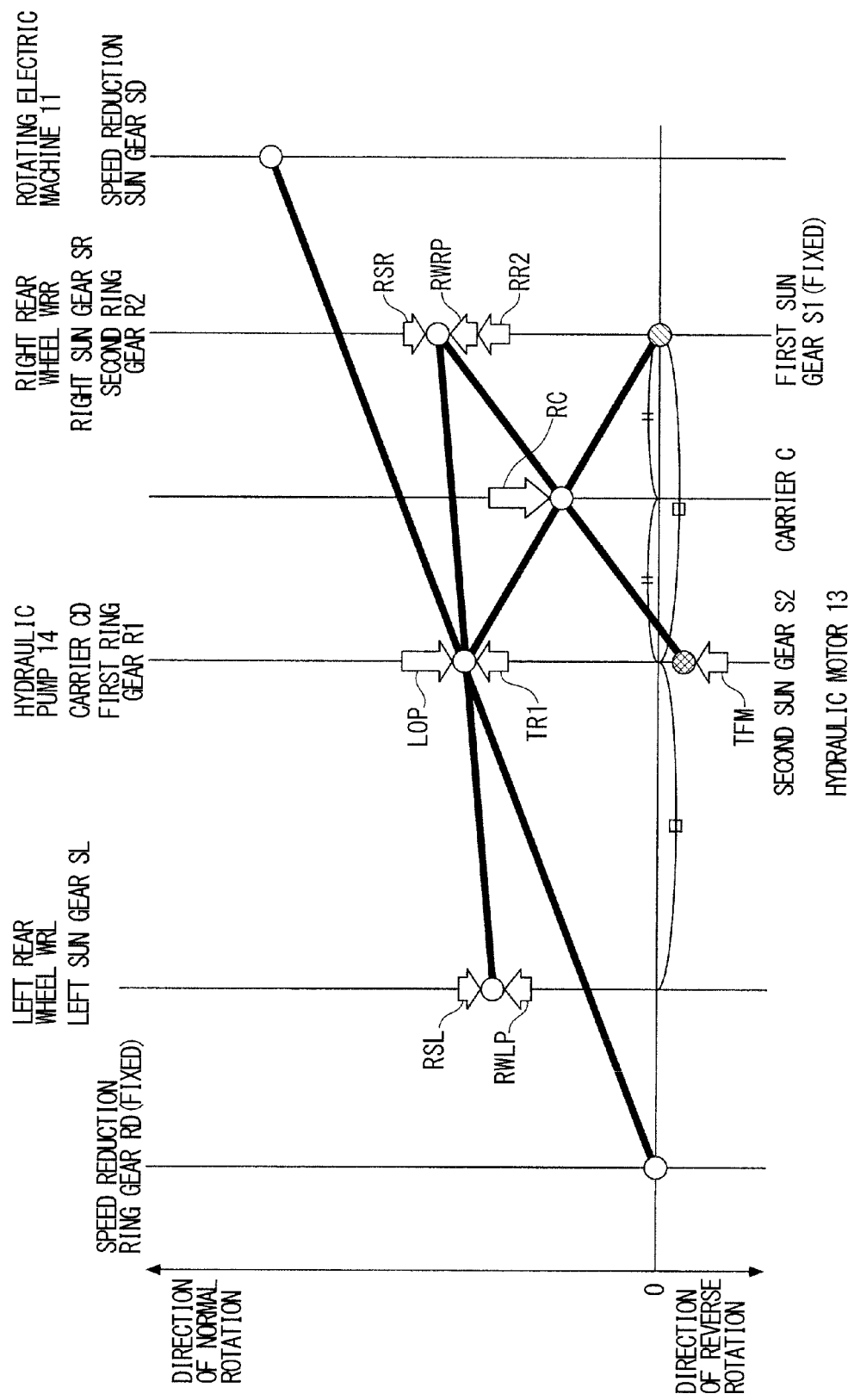
FIG. 21 A diagram of a speed collinear chart showing an example of a rotational speed relationship and a torque balance relationship between the various types of rotary elements of the power plant in FIG. 2, as to during the normal mode and also during left turning of the vehicle.

Further, FIG. 21 shows a rotational speed relationship and a torque balance relationship between the various types of rotary elements as to during the normal mode and also during left turning of the vehicle V. In the figure, TFM represents the above-mentioned hydraulic motor friction torque (negative torque generated by rotation of the output shaft 13a of the hydraulic motor 13 by an external force). Further, RC and RR2 represent reaction force torques acting on the carrier C and the second ring gear R2 along with transmission of the hydraulic motor friction torque TFM to the second sun gear S2, respectively. Further, TR1 represents a torque transmitted to the first ring gear R1 along with transmission of the hydraulic motor friction torque TFM to the second sun gear S2. RSL and RSR represent reaction force torques acting on the left and right sun gears SL and SR according to TR1, respectively. The other parameters are as described with reference to FIG. 19.

As shown in FIG. 21, during the normal mode, when the vehicle V is turning to the left, the right rear wheel rotational speed NWRR of the right rear wheel WRR which is an outer turning wheel becomes higher than the left rear wheel rotational speed NWRL of the left rear wheel WRL which is an inner turning wheel. Further, the output shaft 13a of the hydraulic motor 13 is driven by the driving force from the right rear wheel WRR to thereby perform reverse rotation (clockwise rotation, as viewed in FIG. 10).

By the above-described settings of the numbers of gear teeth of the first and second sun gears S1 and S2 of the first and second planetary gear units PS1 and PS2, a distribution ratio at which a torque input to the carrier C is distributed to the first sun gear S1 and the first ring gear R1 is 1:1, and a distribution ratio at which the torque input to the carrier C is distributed to the second sun gear S2 and the second ring gear R2 is also 1:1. Therefore, the relationship of |TFM|=|RR2|=|TR1| holds. Further, the torque transmitted to the first ring gear R1 is transmitted to the carrier CD, and is further distributed to the left and right sun gears SL and SR at 1:1, and hence the relationship of |TR1|/2=|RSL|=|RSR| holds.

Figure 22:
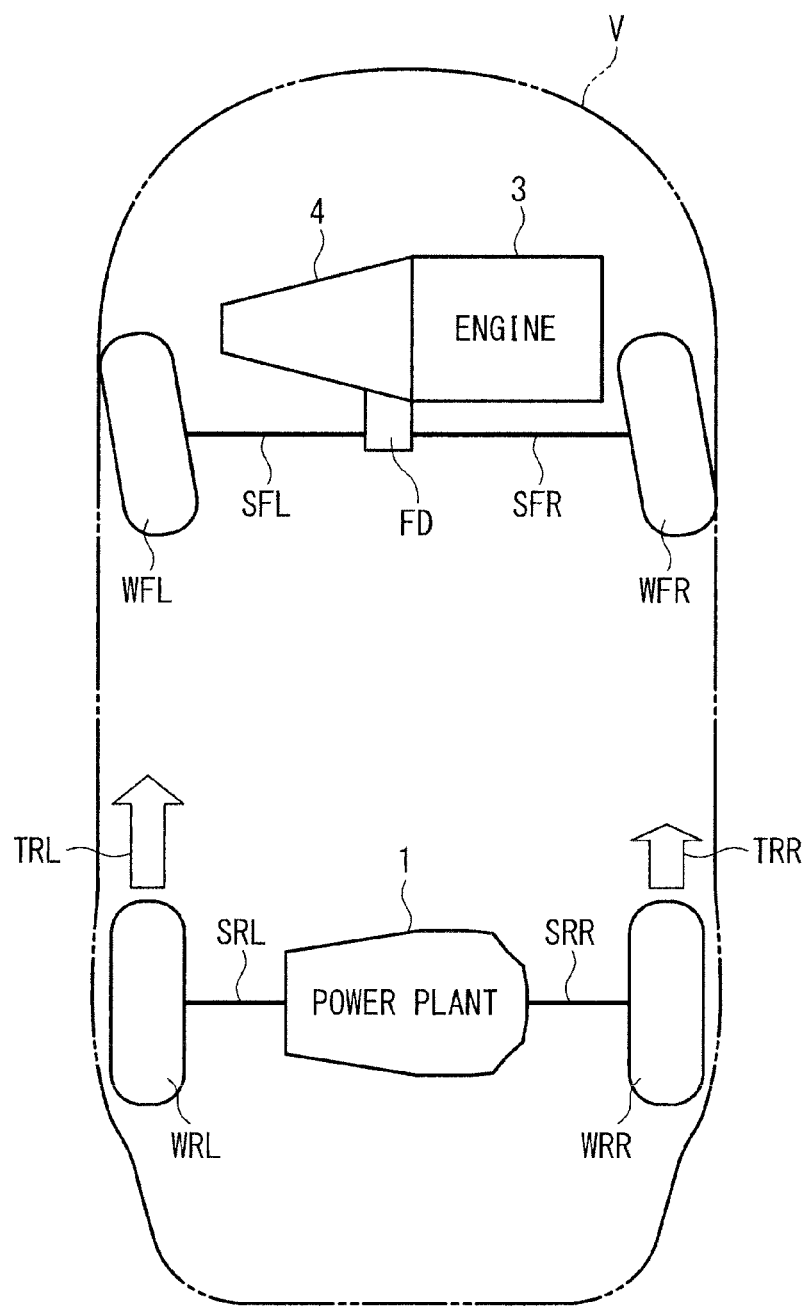
FIG. 22 A diagram useful in explaining a magnitude relationship between the torques of the left and right rear wheels, as to during the normal mode and also during the left turning of the vehicle.

As is apparent from the above, during the normal mode and also during the left turning of the vehicle V, along with transmission of the hydraulic motor friction torque TFM (negative torque), a positive torque of RSL=TR1/2=TFM/2 acts on the left rear wheel WRL which is the inner turning wheel. Further, a negative torque (braking torque) of RSR−RR2=TR1/2−TFM=TFM/2−TFM=−TFM/2 acts on the right rear wheel WRR which is the outer turning wheel. In this case as well, the pump load torque LOP is distributed to the left and right rear wheels WRL and WRR at 1:1. As a consequence, as shown in FIG. 22, during the normal mode and also during the left turning of the vehicle V, the right rear wheel torque TRR is expressed as TRR=TIR−LOP/2−TFM/2, and the left rear wheel torque TRL is expressed as TRL=TIL−LOP/2+TFM/2, so that the left rear wheel torque TRL becomes somewhat larger than the right rear wheel torque TRR (provided TIL=TIR).

Figure 23:
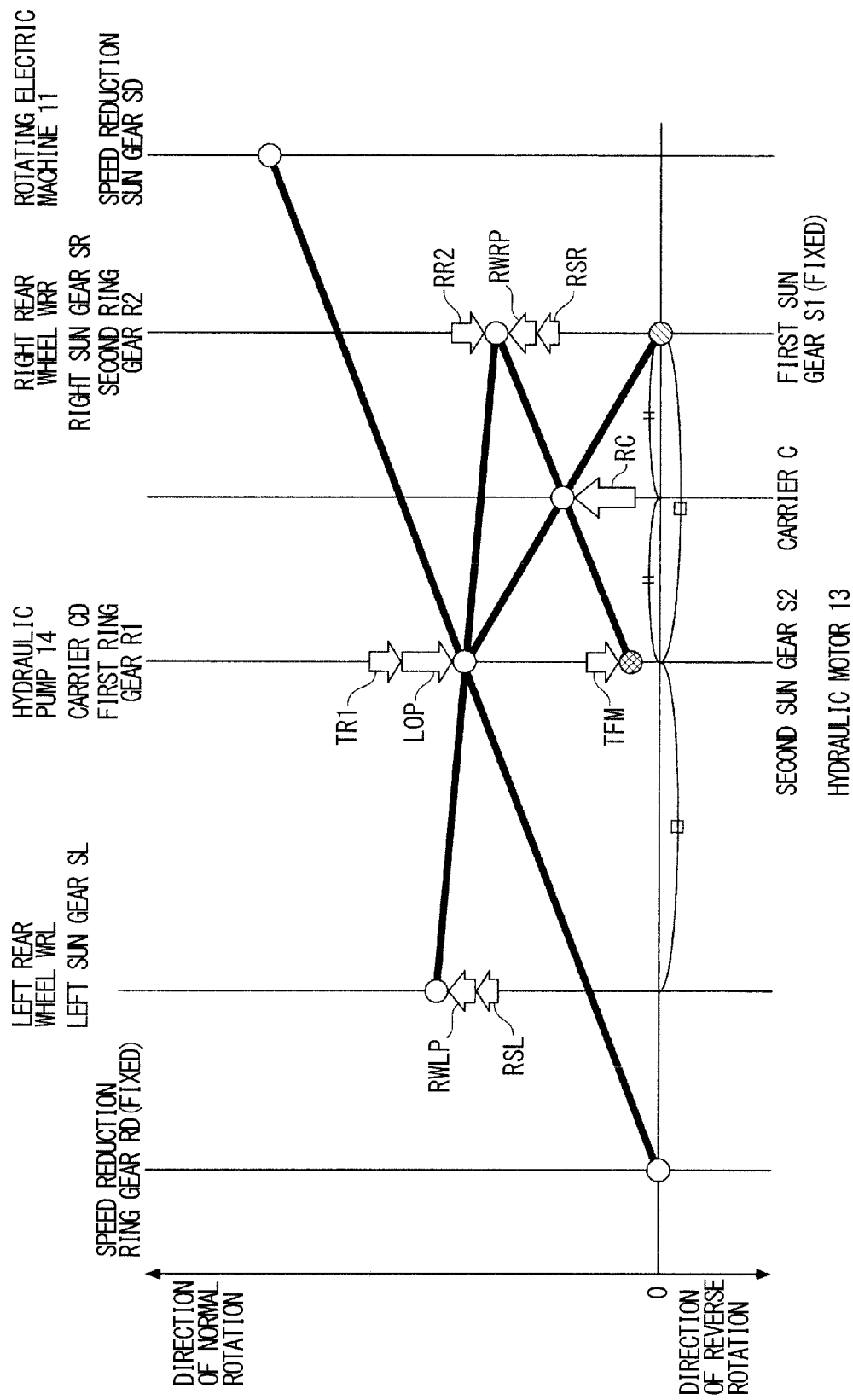
FIG. 23 A diagram of a speed collinear chart showing an example of a rotational speed relationship and a torque balance relationship between the various types of rotary elements of the power plant in FIG. 2, as to during the normal mode and also during right turning of the vehicle.

On the other hand, FIG. 23 shows a rotational speed relationship and a torque balance relationship between the various types of rotary elements as to during the normal mode, when the vehicle V is turning to the right. Various parameters appearing in FIG. 23 are as described with reference to FIG. 21. As shown in FIG. 23, during the normal mode and also during right turning of the vehicle V, the left rear wheel rotational speed NWRL of the left rear wheel WRL which is the outer turning wheel becomes higher than the right rear wheel rotational speed NWRR of the right rear wheel WRR which is the inner turning wheel. Further, the output shaft 13a of the hydraulic motor 13 is driven by driving forces from the left and right rear wheels WRL and WRR to thereby perform normal rotation (counterclockwise rotation, as viewed in FIG. 10).

In this case as well, the relationship of |TFM|=|RR2|=|TR1| holds, and the relationship of |TR1|/2=|RSL|=|RSR| holds. As is apparent from the above, during the normal mode and also during the right turning of the vehicle V, along with transmission of the hydraulic motor friction torque TFM, a negative torque (braking torque) of RSL=−TR1/2=−TFM/2 acts on the left rear wheel WRL which is the outer turning wheel. Further, a positive torque of RR2−RSR=TFM−TR1/2=TFM−TFM/2=TFM/2 acts on the right rear wheel WRR which is the inner turning wheel. In this case as well, the pump load torque LOP is distributed to the left and right rear wheels WRL and WRR at 1:1. As a consequence, during the normal mode and also during the right turning of the vehicle V, the left rear wheel torque TRL is expressed as TRL=TIL−LOP/2−TFM/2, and the right rear wheel torque TRR is expressed as TRR=TIR−LOP/2+TFM/2, so that the right rear wheel torque TRR becomes somewhat larger than the left rear wheel torque TRL (illustration thereof is omitted, provided TIL=TIR).

As described above, during the normal mode and also during turning of the vehicle V, torque of the inner turning wheel is increased, and torque of the outer turning wheel is reduced, whereby the former becomes somewhat larger than the latter. In this case, as described above, although the torque difference corresponding to the hydraulic motor friction torque TFM is generated between the left and right rear wheels WRL and WRR, the hydraulic motor friction torque TFM is very small, as mentioned above, and hence the driver is prevented from feeling a strong sense of incompatibility.

[AWD Mode (See FIGS. 24 and 25)]

Figure 24:
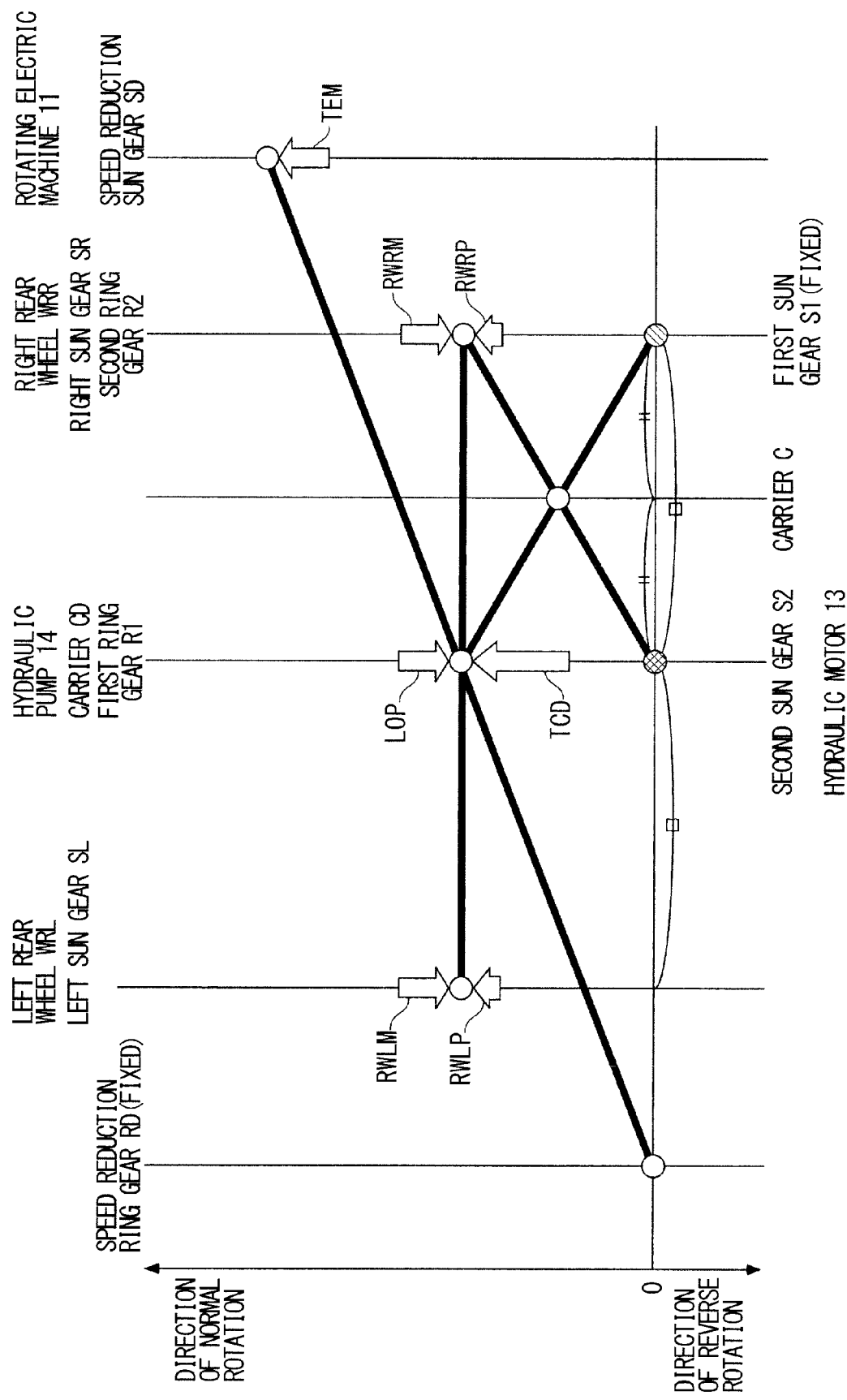
FIG. 24 A diagram of a speed collinear chart showing an example of a rotational speed relationship and a torque balance relationship between the various types of rotary elements of the power plant in FIG. 2, as to during an AWD mode and also during the straight forward traveling of the vehicle.

The AWD mode is an operation mode in which the left and right rear wheels WRL and WRR are driven by the rotating electric machine 11 during traveling of the vehicle V. During the AWD mode, electric power is supplied to the rotating electric machine 11, and the rotor 11b is caused to perform normal rotation. FIG. 24 shows a rotational speed relationship and a torque balance relationship between the various types of rotary elements as to during the AWD mode and also during the straight forward traveling of the vehicle V.

In FIG. 24, TEM represents an output torque of the rotating electric machine 11 (hereafter referred to as the "rotating electric machine output torque"). TCD represents torque transmitted to the carrier CD along with transmission of the rotating electric machine output torque TEM to the speed reduction sun gear SD, and is larger than the pump load torque LOP. Further, RWLM and RWRM represent reaction force torques acting on the left and right rear wheels WRL and WRR according to TCD, respectively. The other parameters are as described with reference to FIG. 19.

Figure 25:
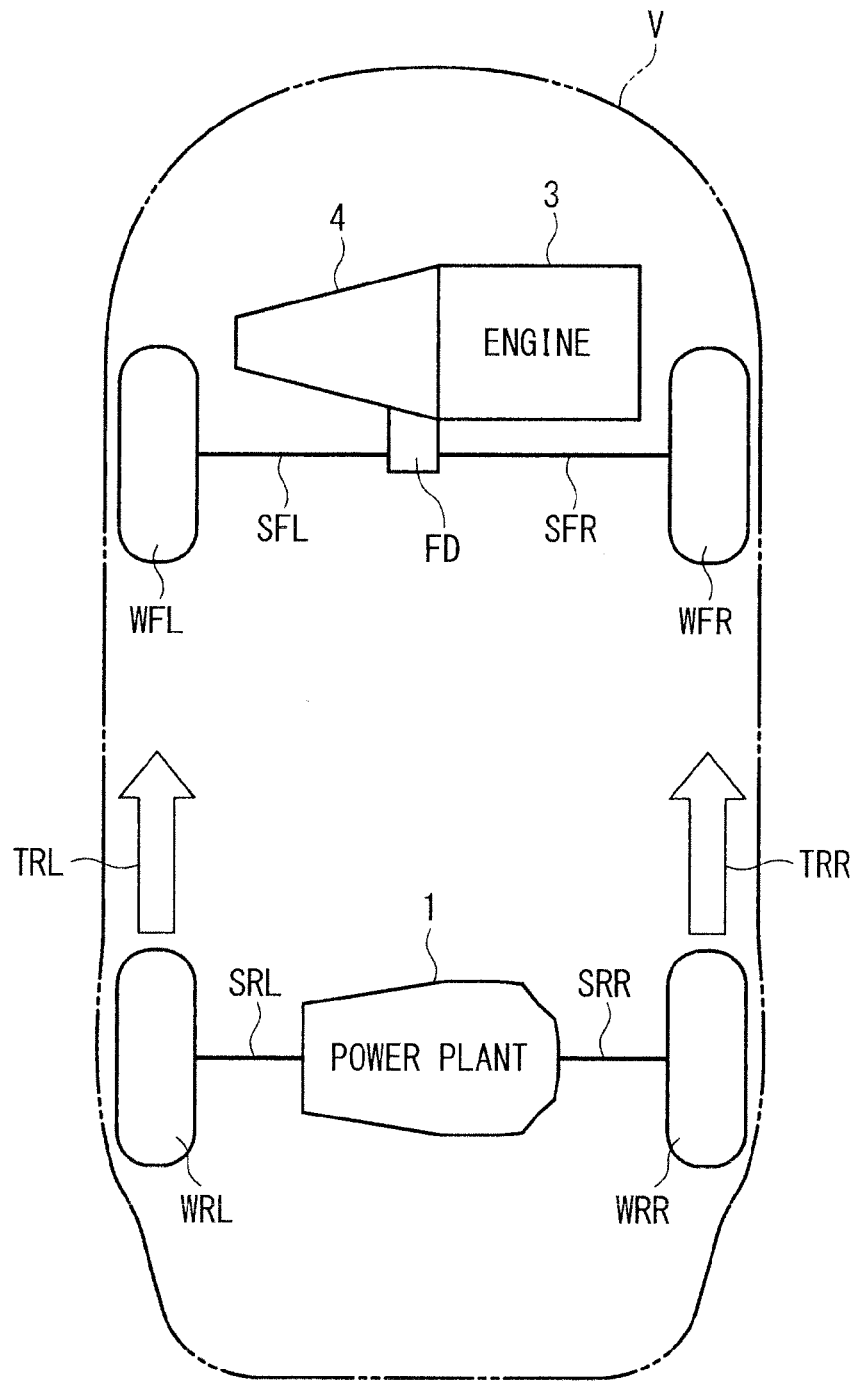
FIG. 25 A diagram useful in explaining a magnitude relationship between the torques of the left and right rear wheels, as to during the AWD mode and also during the straight forward traveling of the vehicle.

As is apparent from FIG. 24, the rotating electric machine output torque TEM is transmitted to the carrier CD in a state increased at a predetermined transmission gear ratio determined by a gear ratio between the gears of the reduction gear box DG. Further, a torque formed by combining the torque TCD transmitted from the rotating electric machine 11 to the carrier CD and the pump load torque LOP is distributed to the left and right rear wheels WRL and WRR at 1:1. As a consequence, the left and right rear wheels WRL and WRR are driven by the rotating electric machine 11. From the above, as shown in FIG. 25, during the AWD mode, the left rear wheel torque TRL and the right rear wheel torque TRR become equal to each other, and TRL=TRR=TIL (or TIR)+TCD/2−LOP/2 holds.

Note that although not shown, during the AWD mode and also during turning of the vehicle V, similar to the case of the normal mode, a negative torque (braking torque) of −TFM/2 acts on the outer turning wheel, and a positive torque of TFM/2 acts on the inner turning wheel, whereby the torque of the inner turning wheel becomes larger than the torque of the outer turning wheel. Further, the AWD mode can be used in combination with the SH mode, the LSD mode, and the bad road traveling-time LSD mode.

[SH Mode (See FIGS. 26 to 28)]

Figure 26:
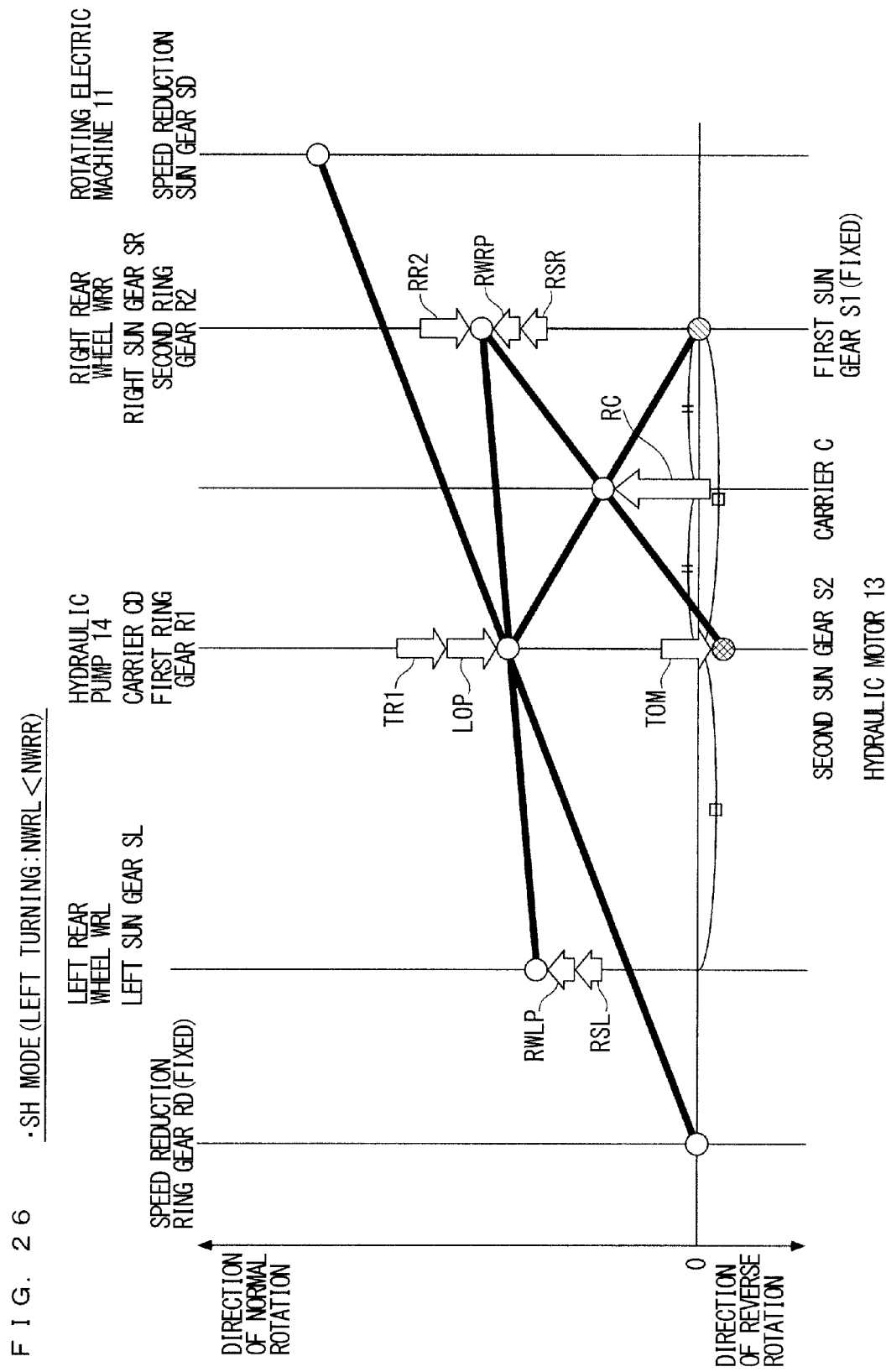
FIG. 26 A diagram of a speed collinear chart showing an example of a rotational speed relationship and a torque balance relationship between the various types of rotary elements of the power plant in FIG. 2, as to during a SH mode and also during the left turning of the vehicle.

The SH mode is an operation mode in which during turning of the vehicle V, the torque of the outer turning wheel of the left and right rear wheels WRL and WRR is increased, and the torque of the inner turning wheel of the same is reduced (the inner turning wheel is braked). During the SH mode, when the vehicle V is turning to the left, the control mode of the hydraulic motor 13 is set to the first motor mode, and the output shaft 13a of the hydraulic motor 13 is caused to perform reverse rotation (clockwise rotation, as viewed in FIG. 11). FIG. 26 shows a rotational speed relationship and a torque balance relationship between the various types of rotary elements in this case.

In FIG. 26, TOM represents the output torque of the hydraulic motor 13 (hereafter referred to as the "hydraulic motor output torque"), and RC and RR2 represent reaction force torques acting on the carrier C and the second ring gear R2 along with transmission of the hydraulic motor output torque TOM to the second sun gear S2, respectively. Further, TR1 represents a torque transmitted to the first ring gear R1 along with transmission of the hydraulic motor output torque TOM to the second sun gear S2. RSL and RSR represent reaction force torques acting on the left and right sun gears SL and SR according to TR1, respectively. The other parameters are as described with reference to FIG. 19.

As shown in FIG. 26, during the SH mode and also during the left turning of the vehicle V, the right rear wheel rotational speed NWRR of the right rear wheel WRR which is the outer turning wheel becomes higher than the left rear wheel rotational speed NWRL of the left rear wheel WRL which is the inner turning wheel. Further, the rotational direction of the second sun gear S2 and the rotational direction of the output shaft 13a of the hydraulic motor 13, determined by the left and right rear wheel rotational speeds NWRL and NWRR, become the direction of the reverse rotation.

Figure 27:
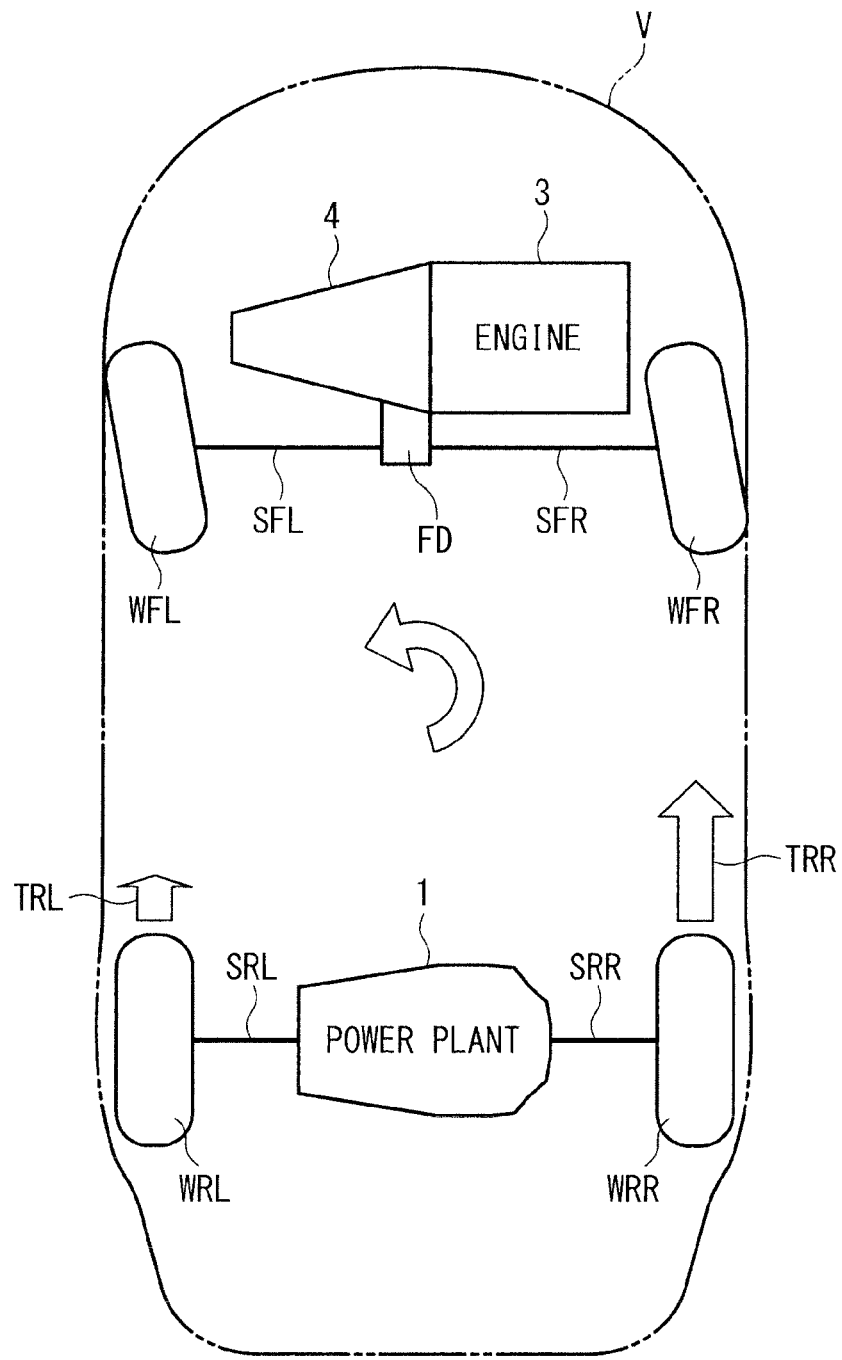
FIG. 27 A diagram useful in explaining a magnitude relationship between the torques of the left and right rear wheels, as to during the SH mode and also during the left turning of the vehicle.

As is apparent from a comparison between FIGS. 26 and 21, during the SH mode and also during the left turning of the vehicle V, along with transmission of the hydraulic motor output torque TOM, a negative torque (braking torque) of RSL=−TR1/2=−TOM/2 acts on the left rear wheel WRL which is the inner turning wheel. Further, a positive torque of RR2−RSR=TOM−TR1/2=TOM−TOM/2=TOM/2 acts on the right rear wheel WRR which is the outer turning wheel. In this case as well, the pump load torque LOP is distributed to the left and right rear wheels WRL and WRR at 1:1. As a consequence, as shown in FIG. 27, during the SH mode and also during the left turning of the vehicle V, the left rear wheel torque TRL is expressed as TRL=TIL−LOP/2−TOM/2, and the right rear wheel torque TRR is expressed as TRR=TIR−LOP/2+TOM/2, so that the right rear wheel torque TRR is expressed as larger than the left rear wheel torque TRL (provided TIL=TIR).

Figure 28:
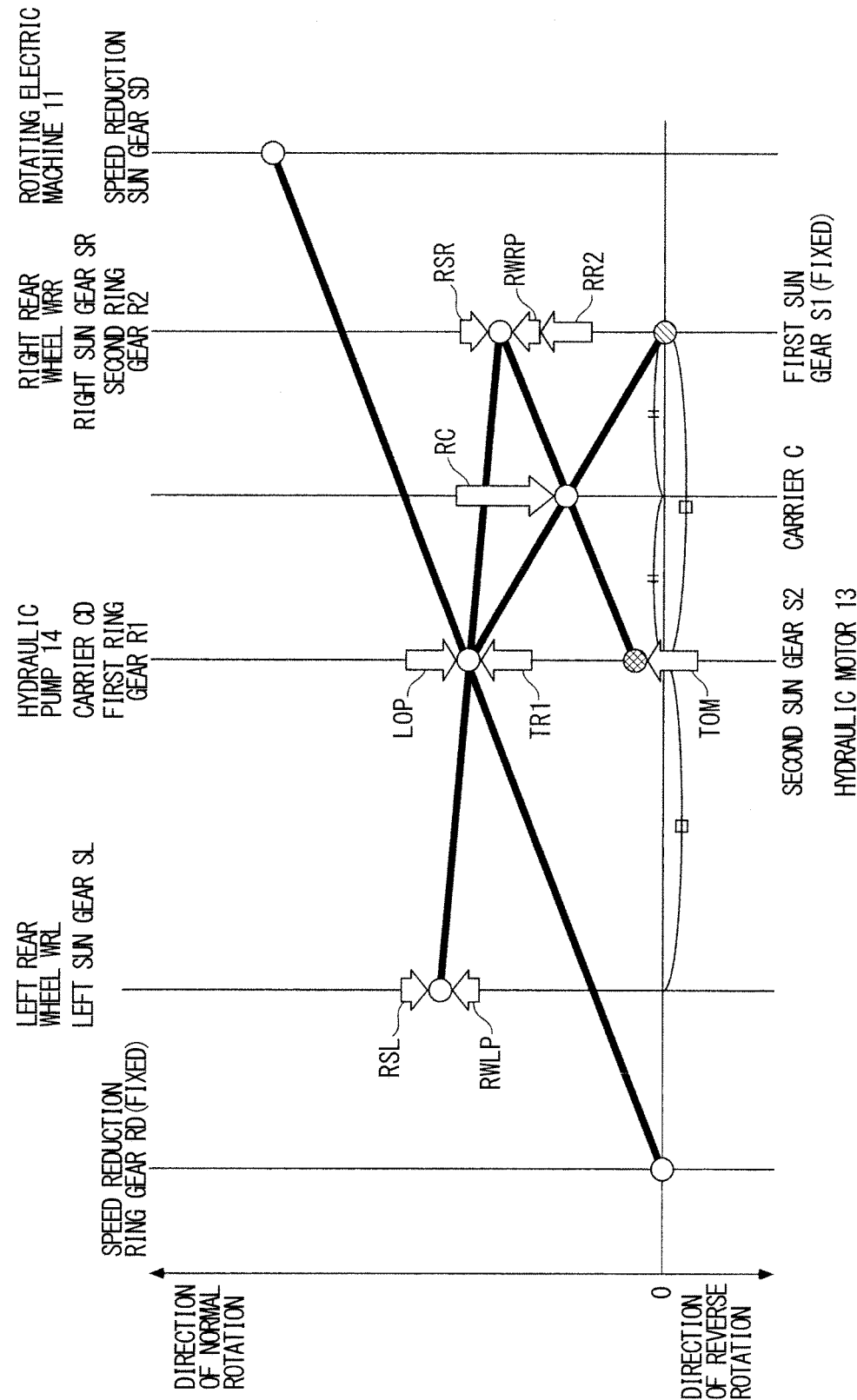
FIG. 28 A diagram of a speed collinear chart showing an example of a rotational speed relationship and a torque balance relationship between the various types of rotary elements of the power plant in FIG. 2, as to during the SH mode and also during right turning of the vehicle.

On the other hand, during the SH mode, when the vehicle V is turning to the right, the control mode of the hydraulic motor 13 is set to the second motor mode, and the output shaft 13a of the hydraulic motor 13 is caused to perform normal rotation (counterclockwise rotation, as viewed in FIG. 13). FIG. 28 shows a rotational speed relationship and a torque balance relationship between the various types of rotary elements in this case. Various parameters appearing in FIG. 28 are as described with reference to FIG. 26.

As shown in FIG. 28, during the SH mode and also during the right turning of the vehicle V, the left rear wheel rotational speed NWRL of the left rear wheel WRL which is the outer turning wheel becomes higher than the right rear wheel rotational speed NWRR of the right rear wheel WRR which is the inner turning wheel. Further, the rotational direction of the second sun gear S2 and the rotational direction of the output shaft 13a of the hydraulic motor 13, determined by the left and right rear wheel rotational speeds NWRL and NWRR, become the direction of the normal rotation.

As is apparent from a comparison between FIGS. 28 and 23, during the SH mode and also during the right turning of the vehicle V, along with transmission of the hydraulic motor output torque TOM, a positive torque of RSL=TR1/2=TOM/2 acts on the left rear wheel WRL which is the outer turning wheel. Further, a negative torque (braking torque) of RSR−RR2=TOM/2−TOM=−TOM/2 acts on the right rear wheel WRR which is the inner turning wheel. In this case as well, the pump load torque LOP is distributed to the left and right rear wheels WRL and WRR at 1:1. As a consequence, during the SH mode and also during the right turning of the vehicle V, the right rear wheel torque TRR is expressed as TRR=TIR−LOP/2−TOM/2, and the left rear wheel torque TRL is expressed as TRL=TIL−LOP/2+TOM/2, so that the left rear wheel torque TRL becomes larger than the right rear wheel torque TRR (illustration thereof is omitted, provided TIL=TIR).

[LSD Mode (See FIGS. 29 to 31)]

Figure 29:
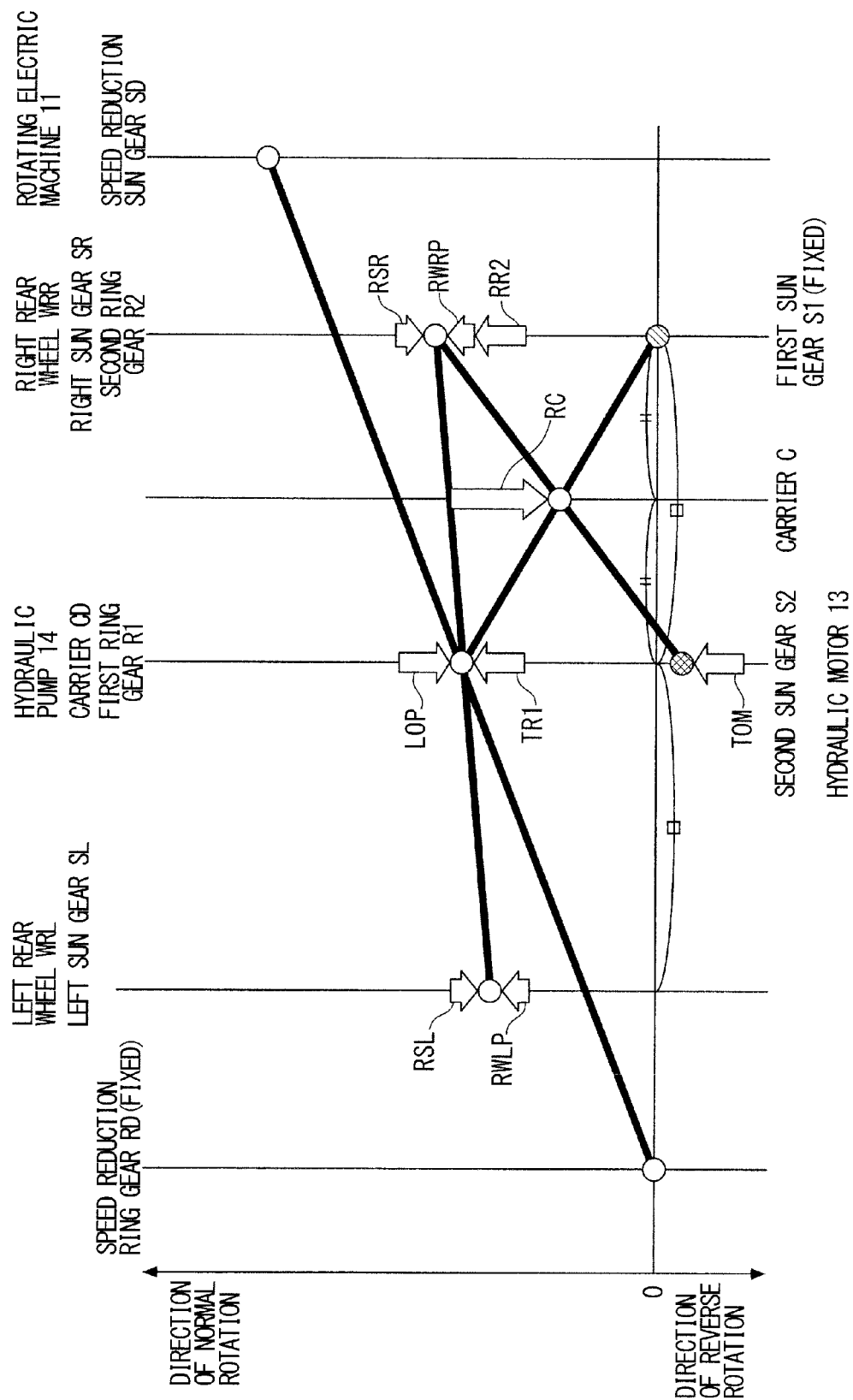
FIG. 29 A diagram of a speed collinear chart showing an example of a rotational speed relationship and a torque balance relationship between the various types of rotary elements of the power plant in FIG. 2, as to during an LSD mode and also during the left turning of the vehicle.

The LSD mode is an operation mode in which during turning of the vehicle V, inversely to the SH mode, the torque of the inner turning wheel of the left and right rear wheels WRL and WRR is increased, and the torque of the outer turning wheel of the same is reduced (the outer turning wheel is braked). During the LSD mode, when the vehicle V is turning to the left, the control mode of the hydraulic motor 13 is set to the first pump mode, and the hydraulic motor 13 is caused to function as a pump. FIG. 29 shows a rotational speed relationship and a torque balance relationship between the various types of rotary elements in this case. Various parameters appearing in FIG. 29 are as described with reference to FIG. 26. Note that since the hydraulic motor 13 functions as a pump, the hydraulic motor output torque TOM is a negative torque.

As shown in FIG. 29, during the LSD mode and also during the left turning of the vehicle V, similar to the case of FIG. 26, the right rear wheel rotational speed NWRR of the right rear wheel WRR which is the outer turning wheel becomes higher than the left rear wheel rotational speed NWRL of the left rear wheel WRL which is the inner turning wheel. Further, the output shaft 13a of the hydraulic motor 13 is driven by the driving force from the right rear wheel WRR to thereby perform reverse rotation (clockwise rotation, as viewed in FIG. 15).

Figure 30:
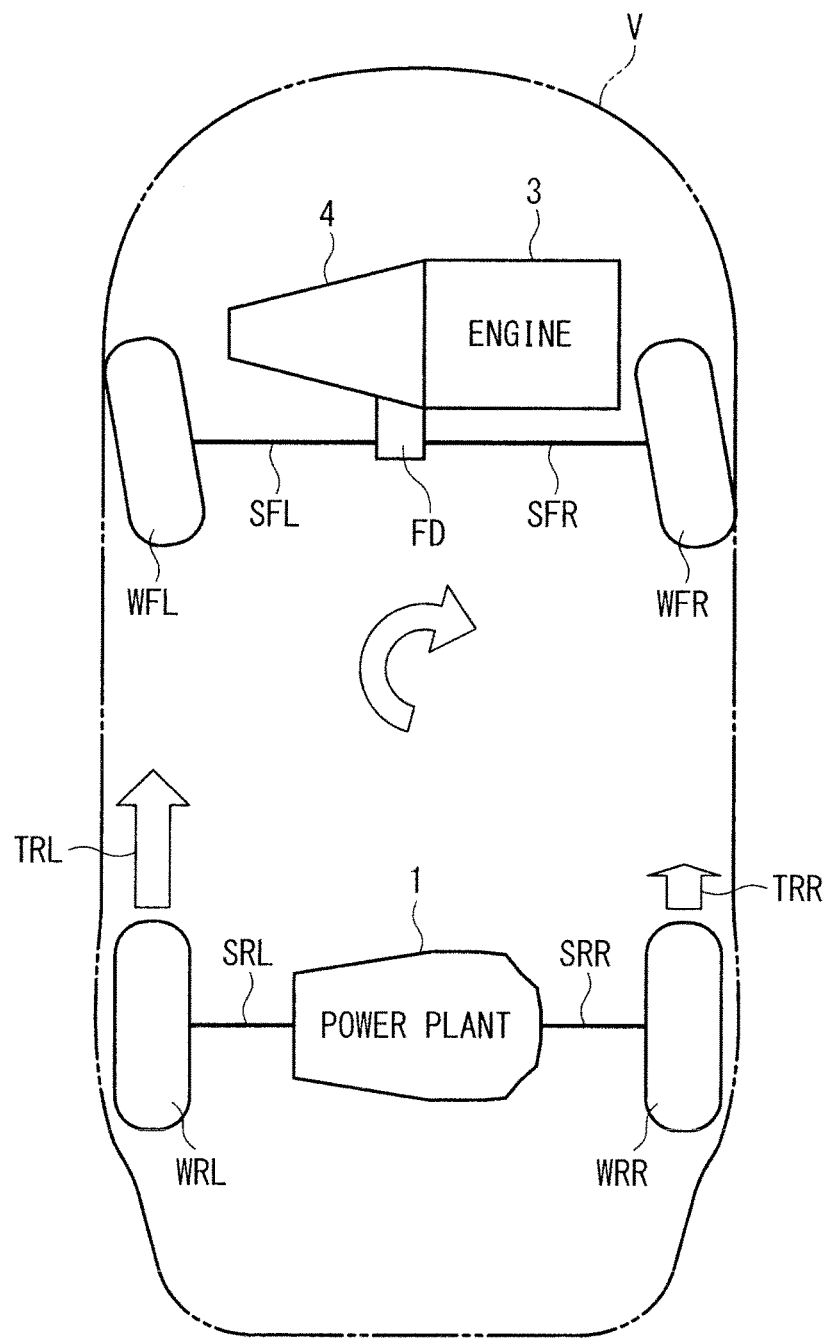
FIG. 30 A diagram useful in explaining a magnitude relationship between the torques of the left and right rear wheels, as to during the LSD mode and also during the left turning of the vehicle.

As is apparent from a comparison between FIGS. 29 and 26, during the LSD mode and also during the left turning of the vehicle V, along with transmission of the hydraulic motor output torque TOM, the positive torque of RSL=TR1/2=TOM/2 acts on the left rear wheel WRL which is the inner turning wheel. Further, a negative torque (braking torque) of RSR−RR2=TR1/2−TOM=TOM/2−TOM=−TOM/2 acts on the right rear wheel WRR which is the outer turning wheel. In this case as well, the pump load torque LOP is distributed to the left and right rear wheels WRL and WRR at 1:1. As a consequence, as shown in FIG. 30, during the LSD mode and also during the left turning of the vehicle V, the right rear wheel torque TRR is expressed as TRR=TIR−LOP/2−TOM/2, and the left rear wheel torque TRL is expressed as TRL=TIL−LOP/2+TOM/2, so that the left rear wheel torque TRL becomes larger than the right rear wheel torque TRR (provided TIL=TIR).

Figure 31:
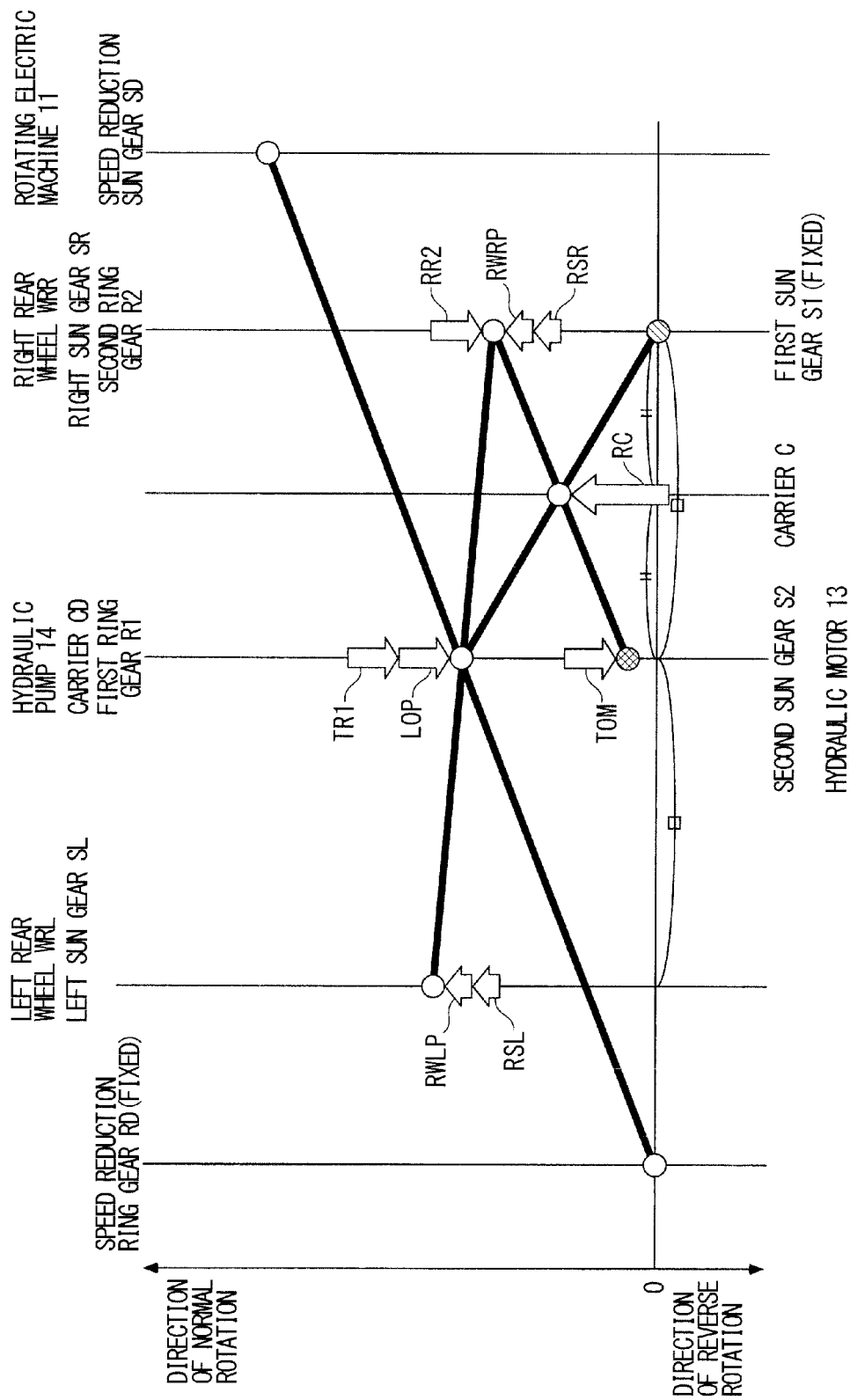
FIG. 31 A diagram of a speed collinear chart showing an example of a rotational speed relationship and a torque balance relationship between the various types of rotary elements of the power plant in FIG. 2, as to during the LSD mode and also during right turning of the vehicle.

On the other hand, during the LSD mode, when the vehicle V is turning to the right, the control mode of the hydraulic motor 13 is set to the second pump mode. FIG. 31 shows a rotational speed relationship and a torque balance relationship between the various types of rotary elements in this case. Various parameters appearing in FIG. 31 are as described with reference to FIG. 28.

As shown in FIG. 31, during the LSD mode and also during right turning of the vehicle V, similar to the case of FIG. 28, the left rear wheel rotational speed NWRL of the left rear wheel WRL which is the outer turning wheel becomes higher than the right rear wheel rotational speed NWRR of the right rear wheel WRR which is the inner turning wheel. Further, the output shaft 13a of the hydraulic motor 13 is driven by the driving forces from the left and right rear wheels WRL and WRR to thereby perform normal rotation (counterclockwise rotation, as viewed in FIG. 16).

As is apparent from a comparison between FIGS. 31 and 28, during the LSD mode and also during the right turning of the vehicle V, along with transmission of the hydraulic motor output torque TOM (negative torque), the negative torque (braking torque) of RSL=−TR1/2=−TOM/2 acts on the left rear wheel WRL which is the outer turning wheel. Further, the positive torque of RR2−RSR=TOM−TR1/2=TOM−TOM/2=TOM/2 acts on the right rear wheel WRR which is the inner turning wheel. In this case as well, the pump load torque LOP is distributed to the left and right rear wheels WRL and WRR at 1:1. As a consequence, during the LSD mode and also during the right turning of the vehicle V, the left rear wheel torque TRL is expressed as TRL=TIL−LOP/2−TOM/2, and the right rear wheel torque TRR is expressed as TRR=TIR−LOP/2+TOM/2, so that the right rear wheel torque TRR becomes larger than the left rear wheel torque TRL (illustration thereof is omitted, provided TIL=TIR).

[Bad Road Traveling-Time LSD Mode (See FIGS. 32 and 33)]

Figure 32:
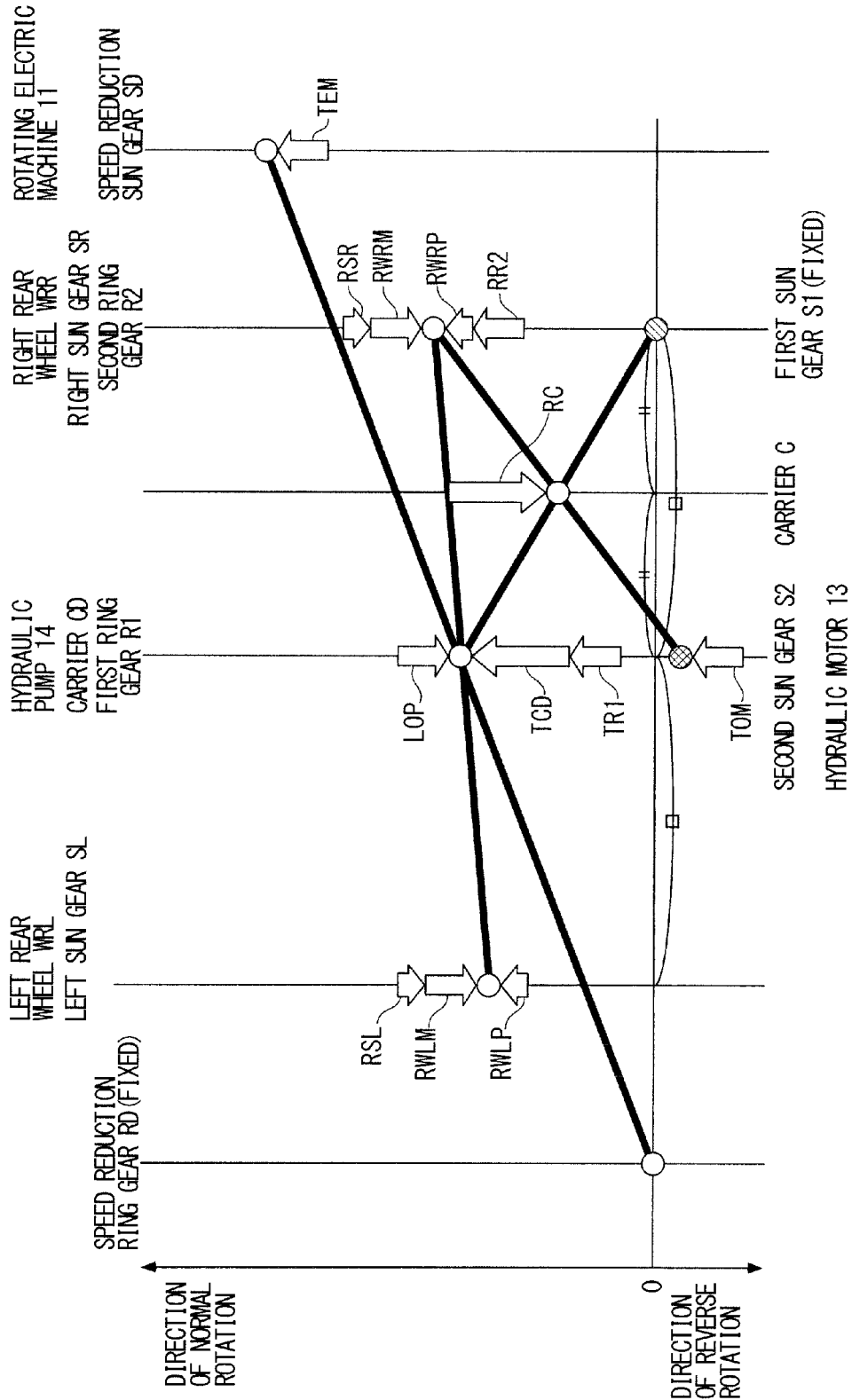
FIG. 32 A diagram of a speed collinear chart showing an example of a rotational speed relationship and a torque balance relationship between the various types of rotary elements of the power plant in FIG. 2, as to during a bad road traveling-time LSD mode and also when the right rear wheel of the vehicle is slipping.

The bad road traveling-time LSD mode is an operation mode used when at least one of the left and right rear wheels WRL and WRR is slipping at the standing start of the vehicle V or during the straight forward traveling of the vehicle V on a low μ road. During the bad road traveling-time LSD mode, for example, when the right rear wheel WRR is slipping more than the left rear wheel WRL, whereby the right rear wheel rotational speed NWRR is higher than the left rear wheel rotational speed NWRL, the control mode of the hydraulic motor 13 is set to the first pump mode. FIG. 32 shows a rotational speed relationship and a torque balance relationship between the various types of rotary elements in a case where during the bad road traveling-time LSD mode, the right rear wheel WRR is slipping more than the left rear wheel WRL, and also the AWD mode as well is used as an operation mode in combination. Hereinafter, the bad road traveling-time LSD mode used when the right rear wheel WRR is slipping more than the left rear wheel WRL is referred to as the "first BLSD mode".

As shown in FIG. 32, during the first BLSD mode, the right rear wheel rotational speed NWRR becomes higher than the left rear wheel rotational speed NWRL. Further, the output shaft 13a of the hydraulic motor 13 is driven by the driving force from the right rear wheel WRR to thereby perform reverse rotation (clockwise rotation, as viewed in FIG. 15).

Figure 33:
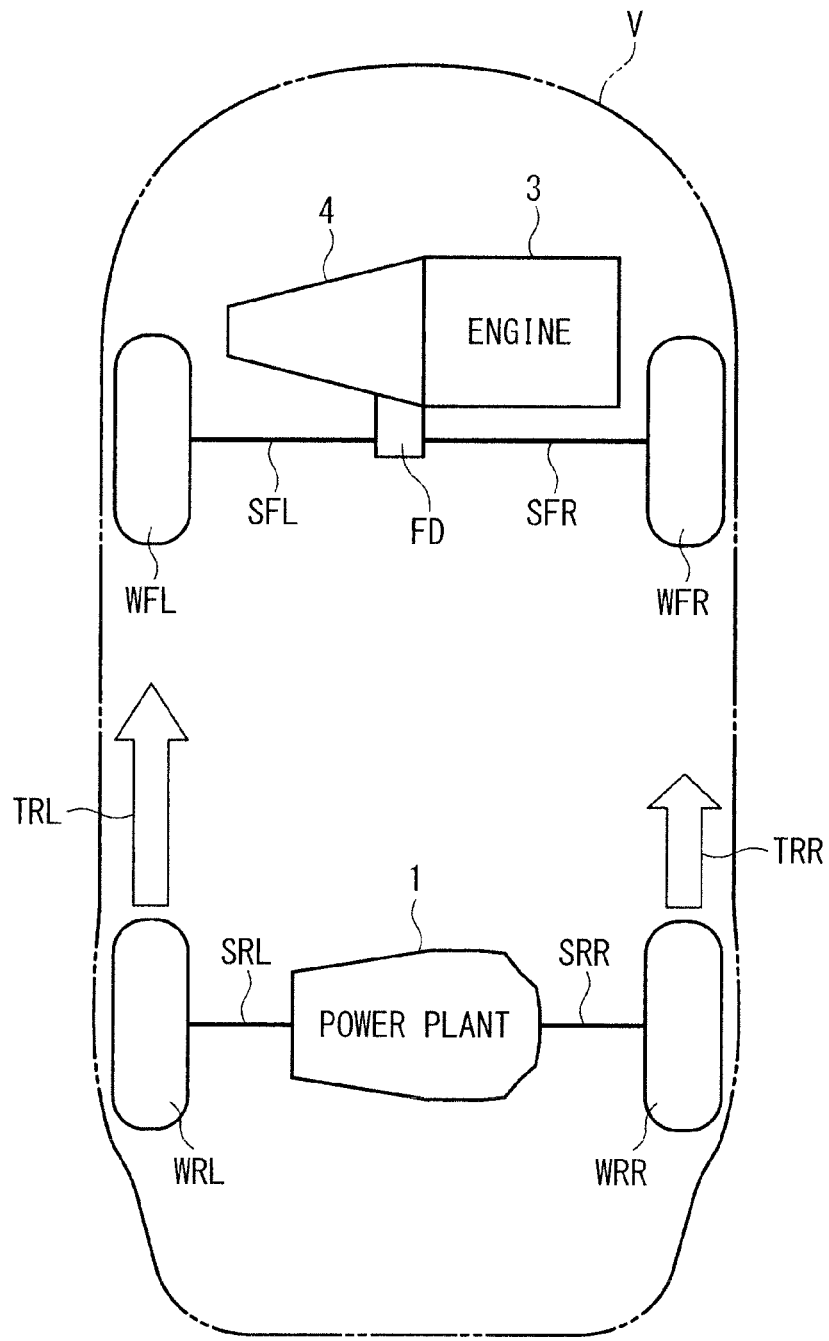
FIG. 33 A diagram useful in explaining a magnitude relationship between the torques of the left and right rear wheels, as to during the bad road traveling-time LSD mode and also when the right rear wheel of the vehicle is slipping.

As is apparent from a comparison between FIGS. 32 and 29, the rotational speed relationship and the torque balance relationship between the various types of rotary elements in this case is basically the same as the rotational speed relationship and the torque balance relationship between the various types of rotary elements as to during the LSD mode and also during the left turning of the vehicle V. Therefore, along with transmission of the hydraulic motor output torque TOM, the positive torque of RSL=TR1/2=TOM/2 acts on the left rear wheel WRL which is not slipping or the degree of slip of which is smaller. Further, the negative torque (braking torque) of RSR−RR2=TR1/2−TOM=TOM/2−TOM=−TOM/2 acts on the right rear wheel WRR which is slipping or the degree of slip of which is larger. In this case, a torque formed by combining the rotating electric machine output torque TEM and the pump load torque LOP is distributed to the left and right rear wheels WRL and WRR at 1:1. As a consequence, as shown in FIG. 33, during the first BLSD mode, the right rear wheel torque TRR is expressed as TRR=TIR−LOP/2+TCD/2−TOM/2, and the left rear wheel torque TRL of the left rear wheel WRL which is not slipping or the degree of slip of which is smaller is expressed as TRL=TIL−LOP/2+TCD/2+TOM/2, so that the left rear wheel torque TRL becomes larger than the right rear wheel torque TRR (provided TIL=TIR).

Note that although not shown, during the first BLSD mode and also when the AWD mode is not used in combination, the same basic operation is performed although TEM, TCD, RWLM, and RWRM are eliminated. More specifically, in this case as well, the positive torque of TOM/2 acts on the left rear wheel WRL which is not slipping or the degree of slip of which is smaller, and the negative torque (braking torque) of −TOM/2 acts on the right rear wheel WRR which is slipping or the degree of slip of which is larger.

On the other hand, during the bad road traveling-time LSD mode, when the left rear wheel WRL is slipping more than the right rear wheel WRR (NWRL>NWRR), the control mode of the hydraulic motor 13 is set to the second pump mode. Hereinafter, the bad road traveling-time LSD mode which is used when the left rear wheel WRL is slipping more than the right rear wheel WRR is referred to as the "second BLSD mode". Although not shown, a rotational speed relationship and a torque balance relationship between the various types of rotary elements as to during the second BLSD mode are basically the same as those during the LSD mode and also during the right turning of the vehicle (FIG. 31). Therefore, along with transmission of the hydraulic motor output torque TOM (negative torque), the negative torque (braking torque) of RSL=−TR1/2=−TOM/2 acts on the left rear wheel WRL which is slipping or the degree of slip of which is larger. Further, the positive torque of RR2−RSR=TOM−TR1/2=TOM−TOM/2=TOM/2 acts on the right rear wheel WRR which is not slipping or the degree of slip of which is smaller.

During the second BLSD mode, when the AWD mode is not used in combination, the pump load torque LOP is distributed to the left and right rear wheels WRL and WRR at 1:1, whereas when the AWD mode is used in combination, the torque formed by combining the rotating electric machine output torque TEM and the pump load torque LOP is distributed to the left and right rear wheels WRL and WRR at 1:1. As a consequence, during the second BLSD mode, the right rear wheel torque TRR of the right rear wheel WRR which is not slipping or the degree of slip of which is smaller becomes larger than the left rear wheel torque TRL of the left rear wheel WRL. During the second BLSD mode, when the AWD mode is used in combination, the left rear wheel torque TRL is expressed as TRL=TIL−LOP/2+TCD/2−TOM/2, and the right rear wheel torque TRR is expressed as TRR=TIR−LOP/2+TCD/2+TOM/2, whereas when the AWD mode is not used in combination, the left rear wheel torque TRL is expressed as TRL=TIL−LOP/2−TOM/2, and the right rear wheel torque TRR is expressed as TRR=TIR−LOP/2+TOM/2 (provided TIL=TIR).

Figure 34:
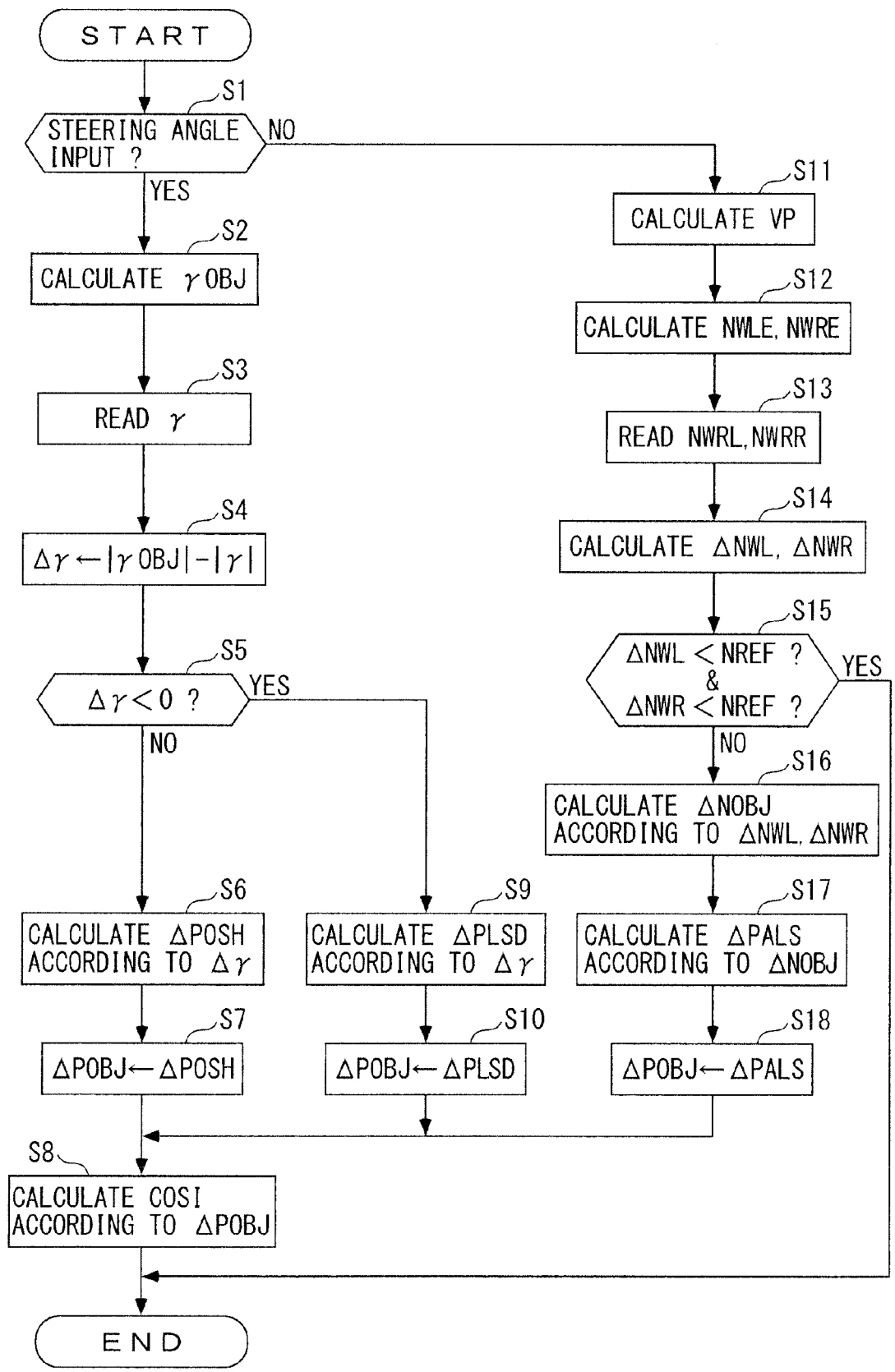
FIG. 34 A flowchart of a process performed by the ECU.

The above-described ECU 2 sets an operation mode of the power plant 1 according to operating conditions of the vehicle V, and performs a process shown in FIG. 34 in order to control the operation of the hydraulic motor 13 according to the set operation mode. The present process is repeatedly performed whenever a predetermined time period (e.g. 100 msec) elapses.

First, in a step 1 (shown as "S1"; the same applies hereafter) in FIG. 34, it is determined whether or not the vehicle V is turning, based on the detected steering angle θ. In this case, e.g. when the steering angle θ is not equal to 0, it is determined that the vehicle V is turning. If the answer to the question of the step 1 is affirmative (YES), i.e. if the vehicle V is turning, a target yaw rate γOBJ is calculated by searching a predetermined map (not shown) according to the steering angle θ and the vehicle speed VP (step 2).

In this map, similar to the above-mentioned yaw rate sensor 44, the target yaw rate γOBJ is set as a positive value for a clockwise yaw rate of the vehicle V, and is set as a negative value for a counterclockwise yaw rate of the vehicle V. Further, as the steering angle θ is larger, the absolute value of the target yaw rate γOBJ is set to a larger value, and when the vehicle speed VP is in a range not higher than a predetermined vehicle speed VREF, as the vehicle speed VP is higher, the absolute value of the target yaw rate γOBJ is set to a larger value. Further, when the vehicle speed VP is in a range higher than the predetermined vehicle speed VREF, the absolute value of the target yaw rate γOBJ is set to a smaller value as the vehicle speed VP is higher.

In a step 3 following the step 2, the yaw rate γ detected by the yaw rate sensor 44 is read. Then, a yaw rate difference Δγ is calculated by subtracting the absolute value of the detected yaw rate γ from the absolute value of the calculated target yaw rate γOBJ (step 4).

Next, it is determined whether or not the calculated yaw rate difference Δγ is smaller than 0 (step 5). If the answer to this question is negative (NO), i.e. if the absolute value of the target yaw rate γOBJ is not smaller than the absolute value of an actual yaw rate γ, it is regarded that the vehicle V is in an understeer state. Then, the following steps 6 to 8 are executed, whereby the operation mode of the power plant 1 is set to the SH mode, and to control the hydraulic motor output torque TOM, the second and third oil passage hydraulic pressures PO2 and PO3 are controlled.

More specifically, first, in the step 6, a target differential pressure ΔPOSH in the SH mode is calculated by searching a predetermined map (not shown) according to the yaw rate difference Δγ. The target differential pressure ΔPOSH is a target value of a differential pressure between the aforementioned second oil passage hydraulic pressure PO2 and third oil passage hydraulic pressure PO3 in the SH mode. In the map mentioned above, the absolute value of the target differential pressure ΔPOSH is set to a larger value as the absolute value of the yaw rate difference Δγ is larger. This is because as the absolute value of the yaw rate difference Δγ is larger, i.e. as the degree of separation of the actual yaw rate γ from the target yaw rate γOBJ is larger, a larger hydraulic motor output torque TOM is generated, whereby the degree of an increase in the torque of the outer turning wheel of the left and right rear wheels WRL and WRR, and the degree of a decrease in the torque of the inner turning wheel of the same are made larger, to thereby make the yaw rate γ closer to the target yaw rate γOBJ to eliminate understeer during the left and right turning of the vehicle V.

Further, as the map mentioned above, there are set a map for calculating a target differential pressure ΔPOSH for left turning, and a map for calculating a target differential pressure ΔPOSH for right turning, for selective use depending on the steering angle θ. During the left turning, to make the torque of the right rear wheel WRR which is the outer turning wheel larger than the torque of the left rear wheel WRL which is the inner turning wheel by the SH mode, it is required to control the hydraulic motor 13 by the first motor mode (PO2>PO3) as described hereinabove, so that in the map for calculating the target differential pressure ΔPOSH for left turning, the target differential pressure ΔPOSH is set to a positive value. Inversely to this, in the map for calculating the target differential pressure ΔPOSH for right turning, the target differential pressure ΔPOSH is set to a negative value.

In the step 7 following the step 6, the target differential pressure ΔPOSH for the SH mode calculated in the step 6 is set as the target differential pressure Δ POBJ. Then, the control signal COSI from the actuator 33b of the switching device 33 is calculated by searching a predetermined map (not shown) according to the set target differential pressure ΔPOBJ (step 8), followed by terminating the present process. With this, the rotational angle position of the valve element 33e of the switching device 33 is controlled to a rotational angle position based on the target differential pressure ΔPOBJ, whereby the hydraulic motor output torque TOM is controlled.

On the other hand, if the answer to the question of the above-described step 5 is affirmative (YES) (Δγ<0), i.e. if the absolute value of an actual yaw rate γ is larger than the absolute value of the target yaw rate γOBJ, it is regarded that the vehicle V is in an oversteer state. Then, by executing the following steps 9, 10, and 8, the operation mode of the power plant 1 is set to the LSD mode, and to control the hydraulic motor output torque TOM, the second and third oil passage hydraulic pressures PO2 and PO3 are controlled.

More specifically, first, in the step 9, a target differential pressure ΔPLSD in the LSD mode is calculated by searching a predetermined map (not shown) according to the yaw rate difference Δγ. This target differential pressure ΔPLSD is a target value of a differential pressure between the second oil passage hydraulic pressure PO2 and the third oil passage hydraulic pressure PO3 in the LSD mode. In the map mentioned above, the absolute value of the target differential pressure ΔPLSD is set to a larger value as the absolute value of the yaw rate difference Δγ is larger. This is because as the absolute value of the yaw rate difference Δγ is larger, i.e. as the degree of separation of the actual yaw rate γ from the target yaw rate γOBJ is larger, a larger hydraulic motor output torque TOM is generated, whereby the degree of a decrease in the torque of the outer turning wheel of the left and right rear wheels WRL and WRR and the degree of an increase in the torque of the inner turning wheel of the same are made larger, to thereby make the yaw rate γ closer to the target yaw rate γOBJ to eliminate oversteer during the left and right turning of the vehicle V.

Further, as the map mentioned above, there are set a map for calculating a target differential pressure ΔPLSD for left turning, and a map for calculating a target differential pressure ΔPLSD for right turning, for selective use depending on the steering angle θ. During the left turning, to make the torque of the left rear wheel WRL which is the inner turning wheel larger than the torque of the right rear wheel WRR which is the outer turning wheel by the LSD mode, it is required to control the hydraulic motor 13 by the first pump mode (PO2<PO3) as described above, so that in the map for calculating the target differential pressure ΔPLSD for left turning, the target differential pressure ΔPLSD is set to a negative value. Inversely to the above, in the map for calculating the target differential pressure ΔPLSD for right turning, the target differential pressure ΔPLSD is set to a positive value.

In the step 10 following the step 9, the target differential pressure ΔPLSD for the LSD mode calculated in the step 9 is set as the target differential pressure ΔPOBJ. Then, the above-described step 8 is executed, whereby the control signal COSI is calculated according to the set target differential pressure ΔPOBJ, followed by terminating the present process.

On the other hand, if the answer to the question of the above-described step 1 is negative (NO), i.e. if the vehicle V is traveling straight forward, the vehicle speed VP of the vehicle V is calculated by a known equation according to the rotational speeds of the respective wheels detected by the wheel speed sensor 45 (step 11). Then, estimated values of the left rear wheel rotational speed NWRL and the right rear wheel rotational speed NWRR (hereafter referred to as the "estimated left rear wheel rotational speed NWLE" and the "estimated right rear wheel rotational speed NWRE", respectively), are calculated according to the calculated vehicle speed VP (step 12). Next, the left rear wheel rotational speed NWRL and the right rear wheel rotational speed NWRR detected by the wheel speed sensors 45 are read (step 13).

Then, a difference between the estimated left rear wheel rotational speed NWLE calculated in the above-described step 12 and the left rear wheel rotational speed NWRL read in the step 13 is calculated as the amount of idling of the left rear wheel WRL (hereafter referred to as the "left rear wheel idling amount") ΔNWL, and a difference between the estimated right rear wheel rotational speed NWRE calculated in the step 12 and the right rear wheel rotational speed NWRR read in the step 13 is calculated as the amount of idling of the right rear wheel WRR (hereafter referred to as the "right rear wheel idling amount") ΔNWR (step 14). Next, it is determined whether or not each of the calculated left rear wheel idling amount ΔNWL and right rear wheel idling amount ΔNWR is smaller than a predetermined value NREF (step 15).

If the answer to the question of the step 15 is affirmative (YES) (ΔNWL<NREF, and also ΔNWR<NREF), it is determined that neither of the left and right rear wheels WRL and WRR is idling, and the present process is immediately terminated. In this case, although not shown, the operation mode of the power plant 1 is set to the normal mode, and the target differential pressure ΔPOBJ is set to 0. Further, the hydraulic motor 13 is controlled in the normal mode.

On the other hand, if the answer to the question of the step 15 is negative (NO) (ΔNWL≥NREF or ΔNWR≥NREF), it is determined that at least one of the left and right rear wheels WRL and WRR is idling, and it is regarded that the vehicle V is traveling on a low μ road (bad road), and is in a slipping state. Then, the following steps 16 to 18 and 8 are executed, whereby the operation mode of the power plant 1 is set to the bad road traveling-time LSD mode, and to control the hydraulic motor output torque TOM, the second and third oil passage hydraulic pressures PO2 and PO3 are controlled.

More specifically, first, in the step 16, a target differential rotation ΔNOBJ is calculated by searching a predetermined map (not shown) according to the left rear wheel idling amount ΔNWL and the right rear wheel idling amount ΔNWR. This target differential rotation ΔNOBJ is a target value of the differential rotation between the left and right rear wheels WRL and WRR, which is required to suppress the slip of the left and right rear wheels WRL and WRR.

In the step 17 following the step 16, a target differential pressure ΔPALS in the bad road traveling-time LSD mode is calculated by searching a predetermined map (not shown) according to the calculated target differential rotation ΔNOBJ. This target differential pressure ΔPALS is a target value of the differential pressure between the second oil passage hydraulic pressure PO2 and the third oil passage hydraulic pressure PO3 in the bad road traveling-time LSD mode.

In the step 18 following the step 17, the target differential pressure ΔPALS in the bad road traveling-time LSD mode, calculated in the step 17, is set as the target differential pressure ΔPOBJ. Then, the above-described step 18 is executed, whereby the control signal COSI is calculated according to the set target differential pressure ΔPOBJ, followed by terminating the present process.

Note that although in the process shown in FIG. 34, it is determined in the above-described step 5 whether or not the vehicle V is in the understeer state, on condition that the yaw rate difference Δγ is not smaller than 0, the determination may be performed on condition that the yaw rate difference Δγ is larger than 0, and further, when the yaw rate difference Δγ is equal to 0, it may be determined that the vehicle V is neither in the understeer state nor in the oversteer state. Alternatively, when the yaw rate difference Δγ is a relatively small positive value not larger than a predetermined value, it may be determined that the vehicle V is neither in the understeer state nor in the oversteer state. Further, when it is determined that the vehicle V is neither in the understeer state nor in the oversteer state, the operation mode of the power plant 1 may be set to the normal mode. Furthermore, it is to be understood that the AWD mode may be used in combination, depending on the traveling state of the vehicle V, as required.

Figure 35:
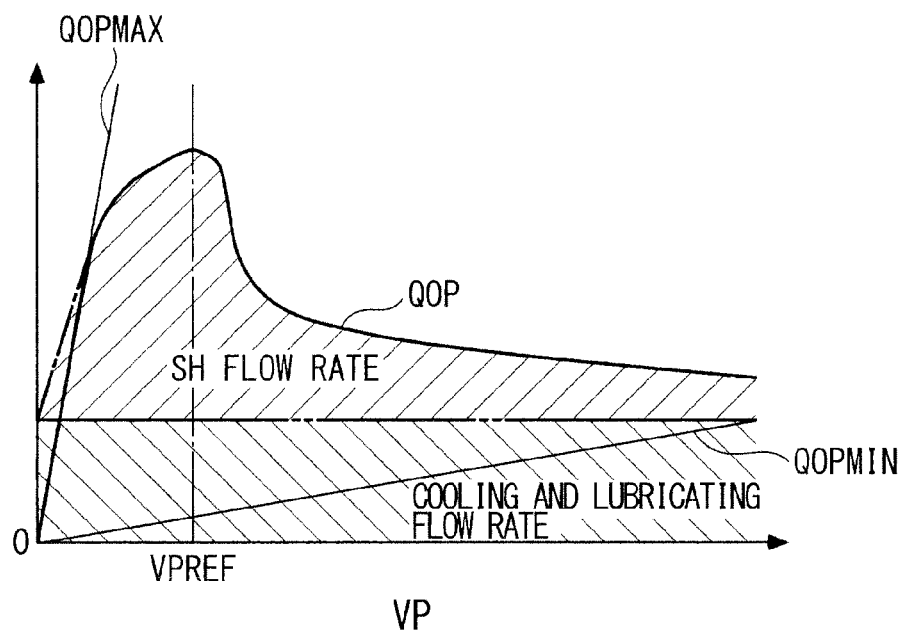
FIG. 35 A diagram showing an example of a relationship between a vehicle speed and the discharge amount of the hydraulic pump, as to during the SH mode.

Further, FIG. 35 shows an example of the relationship between the vehicle speed VP and the pump discharge amount QOP of the hydraulic pump 14, as to during the SH mode. In the figure, a portion with left-slanted hatching indicates the flow rate of oil to be supplied to the hydraulic motor 13 in the SH mode (hereafter referred to as the "SH flow rate), and a portion with right-slanted hatching indicates the flow rate of oil to be supplied to the cooling and lubricating system CL in the SH mode (hereafter referred to as the "cooling and lubricating flow rate").

During the SH mode, as described hereinabove, oil from the hydraulic pump 14 is supplied to the hydraulic motor 13 and the cooling and lubricating system CL, and hence as shown in FIG. 35, the pump discharge amount QOP is equal to the sum of the SH flow rate and the cooling and lubricating flow rate. Further, when the vehicle speed VP is in the range not higher than the predetermined vehicle speed VREF, the SH flow rate becomes larger as the vehicle speed VP is higher. According to the present embodiment, as described above, when the vehicle speed VP is in the range not higher than the predetermined vehicle speed VREF, the target yaw rate γOBJ is set to a larger value as the vehicle speed VP is higher, and accordingly, the amount of oil supplied to the hydraulic motor 13 becomes larger. Further, when the vehicle speed VP is in the range higher than the predetermined vehicle speed VREF, the SH flow rate becomes smaller as the vehicle speed VP is higher. According to the present embodiment, as described above, when the vehicle speed VP is in the range higher than the predetermined vehicle speed VREF, the target yaw rate γ OBJ is set to a smaller value as the vehicle speed VP is higher, and accordingly, the amount of oil supplied to the hydraulic motor 13 becomes smaller.

Figure 36:
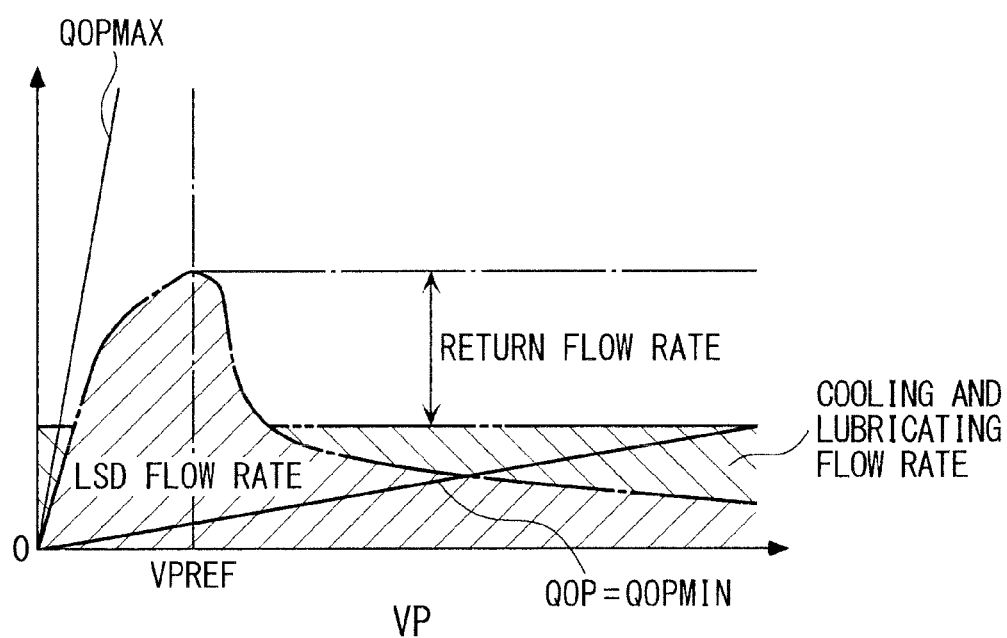
FIG. 36 A diagram showing an example of a relationship between the vehicle speed and the discharge amount of the hydraulic pump, as to during the LSD mode.

Further, FIG. 36 shows an example of the relationship between the vehicle speed VP and the pump discharge amount QOP of the hydraulic pump 14, as to during the LSD mode. In the figure, a portion with left-slanted hatching indicates the flow rate of oil discharged from the hydraulic motor 13 in the LSD mode (hereafter referred to as the "LSD flow rate"). The other parameters are as described with reference to FIG. 35. Note that in FIG. 36, the LSD flow rate and the cooling and lubricating flow rate are shown in an overlapping manner, for convenience.

As shown in FIG. 36, during the LSD mode, the pump discharge amount QOP takes its minimum value QOPMIN. This is because as described hereinabove, not only the oil from the hydraulic pump 14, but also the oil from the hydraulic motor 13 is supplied to the cooling and lubricating system CL, whereby the oil supplied to the second oil chamber 16b is increased. In this case, surplus oil is returned to the hydraulic motor 13. A return flow rate appearing in FIG. 36 indicates the flow rate of oil returned to the hydraulic motor 13 when the vehicle speed VP is equal to the predetermined vehicle speed VREF. Further, according to the above-described settings of the target yaw rate γOBJ with respect to the vehicle speed VP, when the vehicle speed VP is in the range not higher than the predetermined vehicle speed VREF, the amount of oil drawn into and discharged from the hydraulic motor 13 becomes larger as the vehicle speed VP is higher, so that the LSD flow rate becomes larger. Further, when the vehicle speed VP is in the range higher than the predetermined vehicle speed VREF, the amount of oil discharged from the hydraulic motor 13 becomes smaller as the vehicle speed VP is higher, so that the LSD flow rate becomes smaller.

Figure 37:
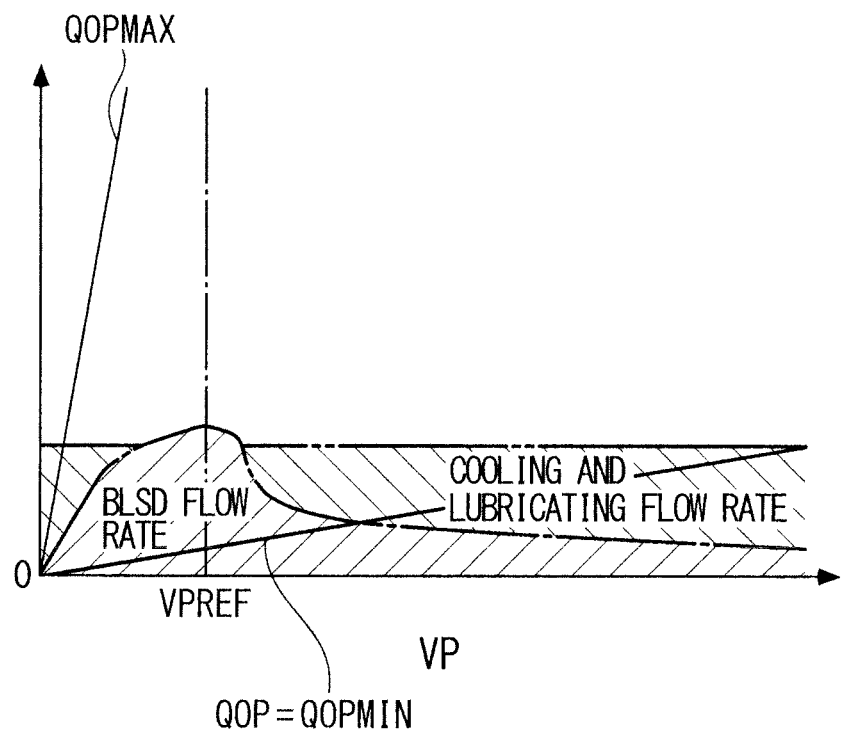
FIG. 37 A diagram showing an example of a relationship between the vehicle speed and the discharge amount of the hydraulic pump, as to during the bad road traveling-time LSD mode.

Further, FIG. 37 shows an example of the relationship between the vehicle speed VP and the pump discharge amount QOP of the hydraulic pump 14, as to during the bad road traveling-time LSD mode. In the figure, a portion with left-slanted hatching indicates the flow rate of oil discharged from the hydraulic motor 13 in the bad road traveling-time LSD mode (hereafter referred to as the "BLSD flow rate"). The other parameters are as described with reference to FIG. 36. Note that in FIG. 37, the BLSD flow rate and the cooling and lubricating flow rate are shown in an overlapping manner, for convenience.

As shown in FIG. 37, during the bad road traveling-time LSD mode, the pump discharge amount QOP is controlled to its minimum value QOPMIN for the same reason as given in the above-described case of the LSD mode (FIG. 36). Further, when the vehicle speed VP is in the range not higher than the predetermined vehicle speed VREF, the BLSD flow rate becomes larger as the vehicle speed VP is higher, and when the vehicle speed VP is in the range higher than the predetermined vehicle speed VREF, the BLSD flow rate becomes smaller as the vehicle speed VP is higher.

Note that although not shown, during the normal mode, the pump discharge amount QOP becomes substantially constant in the whole range of the vehicle speed VP. This is because, as described hereinabove, the pump discharge amount QOP is automatically adjusted such that the LUB hydraulic pressure becomes equal to the predetermined value PREF, and hence the pump discharge amount QOP is automatically maintained at a magnitude appropriate to the predetermined value PREF even when the driving forces input from the left and right rear wheels WRL and WRR to the hydraulic pump 14 are changed along with a change in the vehicle speed VP.

Figure 38:
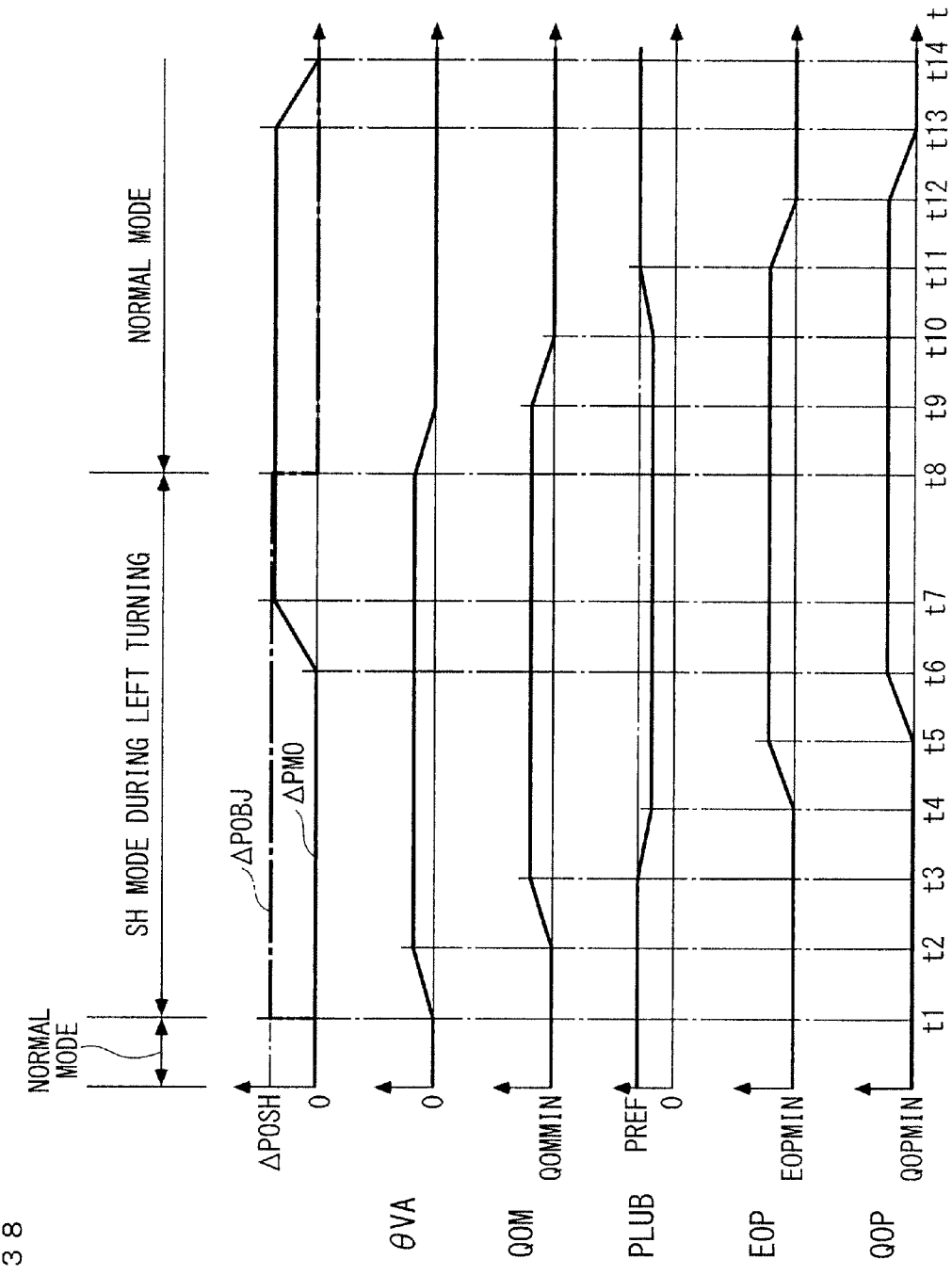
FIG. 38 A timing diagram showing an example of changes in various parameters in a case where the operation mode of the power plant in FIG. 2 shifts from the normal mode to the SH mode, and shifts to the normal mode again.

Further, FIG. 38 shows an example of changes in various parameters in a case where the operation mode of the power plant 1 shifts from the normal mode to the SH mode along with the left turning of the vehicle V, and then shifts to the normal mode again. In FIG. 38, ΔPMO represents a differential pressure between the second oil passage hydraulic pressure PO2 and the third oil passage hydraulic pressure PO3 (hereafter referred to as the "motor differential pressure"). Further, QOM represents the flow rate of oil supplied from the hydraulic pump 14 to the hydraulic motor 13 (hereafter referred to as the "motor supply oil amount"), and QOMMIN represents a minimum value of the motor supply oil amount. Furthermore, PLUB represents a LUB hydraulic pressure (hydraulic pressure supplied from the hydraulic pump 14 to the cooling and lubricating system CL). EOP represents the cam ring eccentricity amount of the hydraulic pump 14, and EOPMIN represents a minimum value of the cam ring eccentricity amount.

As shown in FIG. 38, during the normal mode (from time point t0 to immediately before time point t1), the target differential pressure ΔPOBJ is set to 0, and the valve element rotational angle position θVA is controlled to 0 (=the neutral position), whereby the motor differential pressure ΔPMO is controlled to 0, and the motor supply oil amount QOM is controlled to its minimum value QOPMIN. Further, in the illustrated example of operation, the cam ring eccentricity amount EOP and the pump discharge amount QOP are controlled to their minimum values EOPMIN and QOPMIN, respectively.

When an operation in the SH mode is started along with the left turning of the vehicle V (time point t1), the target differential pressure ΔPOBJ is set to the target differential pressure ΔPOSH for left turning in the SH mode, and the control signal COSI based on the target differential pressure ΔPOBJ is input to the actuator 33b (steps 7 and 8 in FIG. 34). With this, the valve element rotational angle position θVA is controlled from the neutral position to a position closer to the first rotational angle position θVA1 based on the target differential pressure ΔPOBJ (time point t2). Along with this, oil is supplied to the hydraulic motor 13 via the first oil passage OL1 and the second oil passage OL2, whereby the motor supply oil amount QOM is progressively increased, and becomes substantially constant at the following time point t3. Further, since oil from the hydraulic pump 14 is supplied to the hydraulic motor 13, the amount of oil discharged from the hydraulic pump 14 into the fifth oil passage OL5 is reduced, and hence the LUB hydraulic pressure PLUB starts to be reduced, and becomes substantially constant at a time point t4 and thereafter.

Furthermore, as described hereinabove, part of the hydraulic pressure of oil flowing through the fifth oil passage OL5 is supplied to the second oil chamber 16b of the hydraulic pump 14, and the cam ring eccentricity amount EOP and the pump discharge amount QOP become larger as the second oil chamber supply hydraulic pressure PO16b becomes smaller. Therefore, along with the reduction of the LUB hydraulic pressure PLUB, the cam ring eccentricity amount EOP is increased between the following time points t4 and t5, whereby at the time point t5, the pump discharge amount QOP is increased. As a consequence, the motor differential pressure ΔPMO is increased from the following time point t6, and reaches the target differential pressure ΔPOBJ at a time point t7.

Then, when the operation mode shifts to the normal mode again (at a time point t8 and thereafter), an operation reverse to the above-described operation is performed from the following time point t9 to a time point t14.

Further, correspondence between the various types of elements of the present embodiment and various types of elements of the present invention is as follows: The left rear wheel WRL and the right rear wheel WRR of the present embodiment correspond to one and the other of left and right wheels of the present invention, respectively, and the rotating electric machine 11 of the present embodiment corresponds to the drive source of the present invention. Further, the transmission system 12 of the present embodiment corresponds to a differential gear and a motive power transmission member of the present invention, and the speed reduction sun gear SD, the left sun gear SL, and the right sun gear SR of the present embodiment correspond to first to third rotary elements of the present invention, respectively. The hydraulic motor 13 of the present embodiment corresponds to a fluid pressure motor of the present invention. Further, the hydraulic pump 14 of the present embodiment corresponds to a fluid pressure supply source of the present invention, and the reservoir 31 of the present embodiment corresponds to a reservoir of the present invention.

Further, the switching valve 33a of the present embodiment corresponds to a fluid passage switching mechanism of the present invention, and the actuator 33b and the ECU 2 of the present embodiment correspond to a drive device of the present invention. The torsion spring 33c of the present embodiment corresponds to return means of the present invention. Furthermore, the sleeve 33d of the present embodiment corresponds to a first member of the present invention, and the valve element 33e of the present embodiment corresponds to a second member of the present invention. The inflow ports pp, the first motor ports pm1, the second motor ports pm2, the return ports pr, and the LUB ports pl of the present embodiment correspond to first to fifth communication ports of the present invention, respectively.

Further, the first oil passage OL1, the second oil passage OL2, the third oil passage OL3, the fourth oil passages OL4, and the fifth oil passage OL5 of the present embodiment correspond to a fluid supply passage, a first fluid passage, a second fluid passage, a fluid discharge passage, and a cooling and lubricating fluid passage, respectively. The cooling and lubricating system CL of the present embodiment corresponds to a cooled portion and/or a lubricated portion of the present invention.

As described heretofore, according to the first embodiment, the driving force of the rotating electric machine 11 is transmitted to the left and right rear wheels WRL and WRR via the transmission system 12, whereby the left and right rear wheels WRL and WRR are driven (the AWD mode, FIGS. 24 and 25). Further, hydraulic pressure from the hydraulic pump 14 is supplied to the first pressure chamber 13b of the hydraulic motor 13, and the supplied hydraulic pressure is discharged into the second pressure chamber 13c of the hydraulic motor 13, whereby a positive torque is applied to the right rear wheel WRR from the hydraulic motor 13 via the transmission system 12 (the SH mode during the left turning, FIGS. 26 and 27). Furthermore, hydraulic pressure from the hydraulic pump 14 is supplied to the second pressure chamber 13c, and the supplied hydraulic pressure is discharged into the first pressure chamber 13b, whereby a negative torque is applied to the right rear wheel WRR from the hydraulic motor 13 via the transmission system 12 (the SH mode during the right turning, FIG. 28). From the above, since a torque difference is generated between the left and right rear wheels WRL and WRR, it is possible to enhance the turnability and traveling stability of the vehicle V.

Further, shutoff and communication between the oil passages are switched by the switching valve 33a which is arranged on the oil passages communicating between the hydraulic pump 14 and the first pressure chamber 13b, and on the oil passages communicating between the hydraulic pump 14 and the second pressure chamber 13c. This switching valve 33a includes the sleeve 33d and the valve element 33e. The sleeve 33d is formed with the inflow ports pp to which the first oil passage OL1 communicating with the hydraulic pump 14 is connected, the first motor ports pm1 to which the second oil passage OL2 communicating with the first pressure chamber 13b of the hydraulic motor 13 is connected, the second motor ports pm2 to which the third oil passage OL3 communicating with the second pressure chamber 13c of the hydraulic motor 13 is connected, and the return ports pr to which the fourth oil passages OL4 communicating with the reservoir 31 are connected. Further, the valve element 33e is arranged such that it is rotatable with respect to the sleeve 33d between the neutral position, the first rotational angle position θVA1, and the second rotational angle position θVA2.

In the switching valve 33a, when the valve element 33e is in the neutral position, the inflow ports pp and the first motor ports pm1 are placed in a state communicating with each other, the inflow ports pp and the second motor ports pm2 are placed in a state communicating with each other, the first motor ports pm1 and the return ports pr are placed in a state shut off from each other, and the second motor ports pm2 and the return ports pr are placed in a state shut off from each other. Therefore, by bringing the valve element 33e to the neutral position, hydraulic pressure supplied from the hydraulic pump 14 to the inflow ports pp can be properly supplied to the first pressure chamber 13b via the first motor ports pm1 and the second oil passage OL2, as well as to the second pressure chamber 13c via the second motor ports pm2 and the third oil passage OL3 (FIG. 3). As described above, since hydraulic pressure can be properly supplied to both of the first and second pressure chamber 13b and 13c, it is possible to prevent a torque from being actively applied from the hydraulic motor 13 to the right rear wheel WRR, to thereby ensure excellent straight-advancing performance of the vehicle V.

Further, in the switching valve 33a, when the valve element 33e is in the first rotational angle position θVA1, the inflow ports pp and the first motor ports pm1 are placed in the state communicating with each other, the inflow ports pp and the second motors port pm2 are placed in a state shut off from each other, the first motor ports pm1 and the return ports pr are placed in the state shut off from each other, and the second motor ports pm2 and the return ports pr are placed in a state communicating with each other. Therefore, by bringing the valve element 33e to the first rotational angle position θVA1, hydraulic pressure supplied from the hydraulic pump 14 to the inflow ports pp can be properly supplied to the first pressure chamber 13b via the first motor ports pm1 and the second oil passage OL2, and the hydraulic pressure supplied to the first pressure chamber 13b can be properly discharged into the reservoir 31 via the second pressure chamber 13c, the third oil passage OL3, the second motor ports pm2, the return ports pr, and the fourth oil passages OL4, so that it is possible to properly apply a positive torque from the hydraulic motor 13 to the right rear wheel WRR.

Furthermore, in the switching valve 33a, when the valve element 33e is in the second rotational angle position θVA2, the inflow ports pp and the second motor ports pm2 are placed in the state communicating with each other, the inflow ports pp and the first motor ports pm1 are placed in a state shut off from each other, the second motor ports pm2 and the return ports pr are placed in the state shut off from each other, and the first motor ports pm1 and the return ports pr are placed in a state communicating with each other. Therefore, by bringing the valve element 33e to the second rotational angle position θVA2, hydraulic pressure supplied from the hydraulic pump 14 to the inflow ports pp can be properly supplied to the second pressure chamber 13c via the second motor ports pm2 and the third oil passage OL3, and the hydraulic pressure supplied to the second pressure chamber 13c can be properly discharged into the reservoir 31 via the first pressure chamber 13b, the second oil passage OL2, the first motor ports pm1, the return ports pr, and the fourth oil passages OL4, so that it is possible to properly apply a negative torque from the hydraulic motor 13 to the right rear wheel WRR.

Further, differently from the above-described conventional power plant, there are provided three port groups, each formed by an inflow port pp, first and second motor ports pm1 and pm2, and return ports pr (see FIG. 3). Since three ports are provided for each port, it is possible to reduce the flow rate (flow velocity) of oil flowing through each port, which in turn makes it possible to reduce loss. Further, even in such a case where one of the three port groups is blocked or narrowed by foreign matter mixed in oil, oil can be supplied to the hydraulic motor 13 via the ports of the other sets, and hence it is possible to cause the power plant 1 to properly operate, thereby making it possible to enhance robustness thereof.

Furthermore, the switching valve 33a is formed by a so-called rotary valve. The accommodation hole 33h having a cylindrical curved surface is formed in an inner periphery of the sleeve 33d, and the valve element 33e is formed into a solid cylindrical shape and is rotationally movably inserted into the accommodation hole 33h. Further, the inflow ports pp, the first and second motor ports pm1 and pm2, the return ports pr, and the LUB ports pl communicate with the accommodation hole 33h. The degree of communication and the degree of shutoff between these ports and the accommodation hole 33h are adjusted according to a rotation movement position of the valve element 33e. This makes it possible to switch the oil passages and adjust hydraulic pressure supplied to the first and second pressure chambers 13b and 13c, using only the switching valve 33a. Therefore, it is not required to form e.g. a control valve for adjusting hydraulic pressure, separately from the switching valve 33a, whereby it is possible to achieve downsizing and manufacturing cost reduction of the power plant 1.

Further, the three port groups, each formed by an inflow port pp, the first and second motor ports pm1 and pm2, return ports pr, and an LUB port pl, are arranged at equally-spaced intervals with respect to a circumferential direction about a rotation movement axis of the valve element 33e. With this, all the forces of a plurality of hydraulic pressures, which act on the valve element 33e, via three ports of each of pp, pm1, pm2, pr, and pl, can be directed toward the rotation movement axis of the valve element 33e, so that it is possible to properly reduce a frictional force between the valve element 33e and the sleeve 33d during operation of the valve element 33e.

Furthermore, the first oil passage OL1 connected to the inflow port pp is shared between the oil passages for communicating between the hydraulic pump 14 and the first pressure chamber 13b and the oil passages for communicating between the hydraulic pump 14 and the second pressure chamber 13c. As a consequence, it is not required to separately provide ports communicating with the first motor port pm1 when the valve element 33e is in the first rotational angle position θVA1, and ports communicating with the second motor port pm2 when the valve element 33e is in the second rotational angle position θVA2, and hence it is possible to downsize the switching valve 33a. For the same reason, since it is only required to provide one first oil passage OL1, the power plant 1 can be easily installed.

Further, the same port is shared as a return port pr of a first port group included in the above-mentioned three port groups, and as a return port pr of a second port group included in the three port groups, and accordingly, it is possible to downsize the switching valve 33a. For the same reason, it is possible to reduce the number of the fourth oil passages OL4, and accordingly, the power plant 1 can be easily installed.

Furthermore, when the valve element 33e is in the neutral position, the first motor ports pm1 to which is connected the second oil passage OL2 communicating with the first pressure chamber 13b, and the second motor ports pm2 to which is connected the third oil passage OL3 communicating with the second pressure chamber 13c are placed in the state communicating with each other. As a consequence, as described with reference to FIGS. 10 and 21 to 23, when a differential rotation is occurring between the left and right rear wheels WRL and WRR, oil which is drawn into one of the first and second pressure chambers 13b and 13c of the hydraulic motor 13 that functions as a pump, and is discharged from the other of 13b and 13c can be smoothly circulated through the switching valve 33a, and the second and third oil passages OL2 and OL3, so that it is possible to suppress a loss torque from occurring in the left and right rear wheels WRL and WRR via the hydraulic motor 13 due to the circulation of the oil.

Further, the valve element 33e is actuated from the neutral position to the first rotational angle position θVA1, and from the neutral position to the second rotational angle position θVA2, by the actuator 33b. Further, the valve element 33e is returned from the first rotational angle position θVA1 to the neutral position, and is returned from the second rotational angle position θVA2 to the neutral position, by the torsion spring 33c. With this, even in a case where the actuator 33b becomes inoperable, the valve element 33e can be returned to the neutral position, whereby it is possible to prevent a torque from being actively applied from the hydraulic motor 13 to the right rear wheel WRR, so that it is possible to prevent occurrence of a yaw moment of the vehicle V, which causes the driver to feel a sense of incompatibility Furthermore, when the valve element 33e is in the neutral position, no torque is actively applied from the hydraulic motor 13 to the right rear wheel WRR. Further, by rotating the valve element 33e to the first rotational angle position θVA1, it is possible to apply a positive torque to the right rear wheel WRR from the hydraulic motor 13, and by rotating the valve element 33e to the second rotational angle position θVA2, it is possible to apply a negative torque to the right rear wheel WRR from the hydraulic motor 13. In this case, the neutral position, and the first and second rotational angle positions θVA1 and θVA2 are arranged in the rotational direction of the valve element 33e with respect to the sleeve 33d in the order of the first rotational angle position θVA1, the neutral position, and the second rotational angle position θVA2, and hence it is possible to quickly shift the torque of the hydraulic motor 13 from a state where the torque is not being actively applied to the right rear wheel WRR, to a state where it is actively applied to the right rear wheel WRR.

Further, two return ports pr are provided for one port group of the above-described three port groups, and one of the two return ports pr is placed in the state communicating with the second motor ports pm2 when the valve element 33e is in the first rotational angle position θVA1, whereas the other of the two return ports pr is placed in the state communicating with the first motor ports pm1 when the valve element 33e is in the second rotational angle position θVA2. Thus, the return ports pr communicating with the first and second motor ports pm1 and pm2, respectively, are provided separately from each other, and hence it is possible to enhance the degree of freedom in the layout of the inflow ports pp and the first and second motor ports pm1 and pm2. Further, since the same oil passage is shared as the fourth oil passage OL4 connected to a return port pr of one port group of the three port groups and the fourth oil passage OL4 connected to a return port pr of another port group of the three port groups, it is possible to achieve downsizing of the power plant 1 and simplification of the arrangement thereof.

Furthermore, since the LUB ports pl, to which is connected the fifth oil passage OL5 communicating with the cooling and lubricating system CL for cooling and lubricating the rotating electric machine 11 and the transmission system 12, are formed in the sleeve 33d, it is possible to adjust supply of oil to the cooling and lubricating system CL by the switching valve 33a.

Further, in any of the cases when the valve element 33e is in the neutral position, when the same is in the first rotational angle position θVA1, and when the same is in the second rotational angle position θVA2, the inflow ports pp, to which is connected the first oil passage OL1 communicating with the hydraulic pump 14, and the LUB ports pl, to which is connected the fifth oil passage OL5 communicating with the cooling and lubricating system CL, are placed in the state communicating with each other. Therefore, it is possible to supply oil to the cooling and lubricating system CL irrespective of states of the torque of the hydraulic motor 13 being applied to the right rear wheel WRR.

Furthermore, when the valve element 33e is in the first rotational angle position θVA1, and when the same is in the second rotational angle position θVA2, the degree of communication between the inflow port pp and the LUB port pl is smaller than when the valve element 33e is in the neutral position (FIGS. 8, 12, and 14). With this, when the torque from the hydraulic motor 13 is being applied, it is possible to prevent an excessive amount of oil from being supplied from the hydraulic pump 14 to the cooling and lubricating system CL.

Further, when the valve element 33e is in the first rotational angle position θVA1, the first motor ports pm1 connected to the first pressure chamber 13b and the LUB ports pl connected to the cooling and lubricating system CL are placed in the state communicating with each other, and the second motor ports pm2 connected to the second pressure chamber 13c and the LUB ports pl are placed in the state shut off from each other. Further, when the valve element 33e is in the second rotational angle position θVA2, the first motor ports pm1 and the LUB ports pl are placed in the state shut off from each other, and the first motor ports pm1 and the LUB ports pl are placed in the state communicating with each other. From the above, when the torque from the hydraulic motor 13 is being applied, it is possible to shut off between the first or second pressure chamber 13b or 13c and the cooling and lubricating system CL, so that it is possible to more properly perform the application of the torque from the hydraulic motor 13.

Furthermore, the LUB port pl is formed into a shape of a perfect circle in cross-section orthogonal to an axial direction thereof, so that when the valve element 33e is rotated from the neutral position to the first or second rotational angle position θVA1 or θVA2, it is possible to suppress a sudden change in the degree of communication/shutoff between the inflow port pp and the LUB port pl.

Further, since the rotating electric machine 11 is shared as the drive source of the vehicle V and the drive source of the hydraulic pump 14, it is not required to provide the drive source of the hydraulic pump 14 separately from the drive source of the vehicle V.

Note that although in the first embodiment, the hydraulic pump 14 is connected to the carrier CD, it may be connected to the speed reduction sun gear SD. Further, although in the first embodiment, the first sun gear S1 is fixed, and the second sun gear S2 is connected to the hydraulic motor 13, inversely to this, the first sun gear S1 may be connected to the hydraulic motor 13, and the second sun gear S2 may be fixed. Furthermore, although in the first embodiment, the first sun gear S1 is fixed, the first ring gear R1 is connected to the carrier CD and the hydraulic pump 14, the second sun gear S2 is connected to the hydraulic motor 13, and the second ring gear R2 is connected to the right sun gear SR and the right rear wheel WRR, inversely to this, the first ring gear R1 may be fixed, the first sun gear S1 may be connected to the carrier CD and the hydraulic pump 14, the second ring gear R2 may be connected to the hydraulic motor 13, and the second sun gear S2 may be connected to the right sun gear SR and the right rear wheel WRR. In other words, the positional relationship between the first sun gear S1 and the first ring gear R1, and the positional relationship between the second sun gear S2 and the second ring gear R2 in the collinear chart may be reversed, respectively. In this case, the first ring gear R1 may be connected to the hydraulic motor 13, and the second ring gear R2 may be fixed.

Further, although in the first embodiment, the first ring gear R1 is connected to the carrier CD and the hydraulic pump 14, instead of these, the first ring gear R1 may be connected to the left sun gear SL and the left rear wheel WRL. In this case as well, the first sun gear S1 may be connected to the hydraulic motor 13, and the second sun gear S2 may be fixed, or alternatively, the positional relationship between the first sun gear S1 and the first ring gear R1, and the positional relationship between the second sun gear S2 and the second ring gear R2 in the collinear chart may be reversed, respectively. In this case as well, the first ring gear R1 may be connected to the hydraulic motor 13, and the second ring gear R2 may be fixed.

Furthermore, although in the first embodiment, the second sun gear S2 is connected to the right sun gear SR and the right rear wheel WRR, instead of these, the second sun gear S2 may be connected to the left sun gear SL and the left rear wheel WRL. In this case as well, the first sun gear S1 may be connected to the hydraulic motor 13, and the second sun gear S2 may be fixed, or alternatively, in the collinear charts, the positional relationship between the first sun gear S1 and the first ring gear R1, and the positional relationship between the second sun gear S2 and the second ring gear R2 may be reversed, respectively. In this case as well, the first ring gear R1 may be connected to the hydraulic motor 13, and the second ring gear R2 may be fixed.

Further, although in the first embodiment, the first and second planetary gear units PS1 and PS2 of the single pinion type are used, a differential gear including a pair of bevel gears may be used. Further, although in the first embodiment, the differential gear DS including the left and right sun gears SL and SR is used, a differential gear including a pair of bevel gears may be used. Further, as mentioned above, in the case where the first ring gear R1 is connected to the left sun gear SL and the left rear wheel WRL, a planetary gear unit of a so-called double pinion type may be used in place of the differential gear DS.

Furthermore, although in the first embodiment, the numbers of gear teeth of the gears forming the first planetary gear unit PS1 and the numbers of gear teeth of associated ones of the gears forming the second planetary gear unit PS2 are set to the same values, they may be set to different values from each other. The same applies to the case where the connection relationship between various elements is changed as described above. Furthermore, although in the first embodiment, the rotating electric machine 11 is connected to the hydraulic pump 14 and the first ring gear R1 via the reduction gear box DG, the reduction gear box DG may be omitted (provided that the carrier CD is not omitted since the carrier CD is shared by the differential gear DS), and the rotating electric machine 11 may be directly connected to the hydraulic pump 14 and the carrier CD. Furthermore, although in the first embodiment, the transmission system 12 is configured such that the torque transmitted from the rotating electric machine 11 and the hydraulic pump 14 to the carrier CD is distributed to the left and right rear wheels WRL and WRR at a distribution ratio of 1:1, the transmission system 12 may be configured such that the torque is distributed by unequal distribution.

Figure 39:
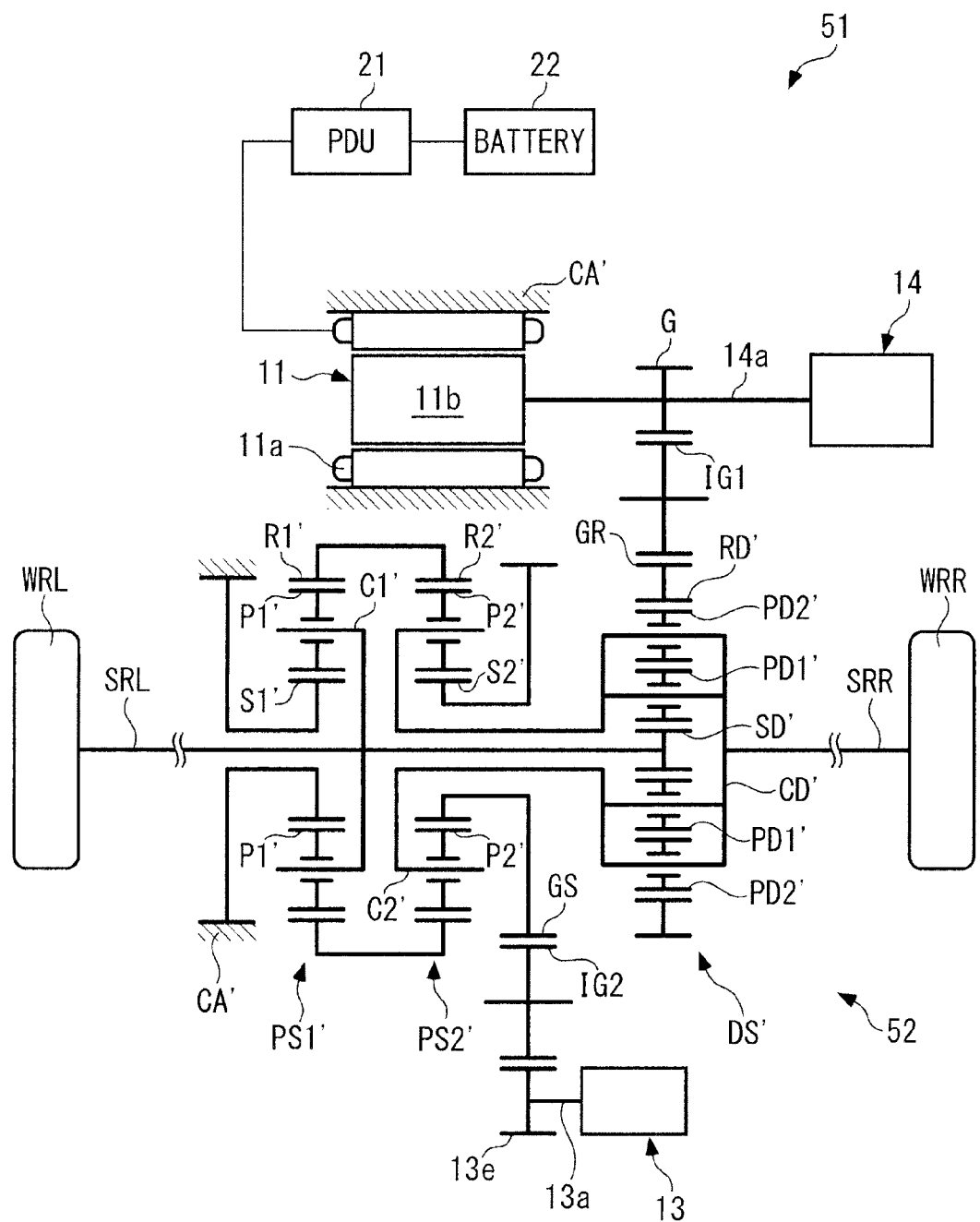
FIG. 39 A skeleton diagram of a power plant according to a second embodiment of the invention and the left and right rear wheels.

Next, a power plant 51 according to a second embodiment of the present invention will be described with reference to FIG. 39. Compared with the power plant 1 according to the first embodiment, the power plant 51 is different only in the arrangement of a transmission system 52. In FIG. 39, the same component elements as those of the first embodiment are denoted by the same reference numerals. The following description is given mainly of different points of the power plant 51 from the first embodiment.

The transmission system 52 of the power plant 51 includes a differential gear DS' which transmits the driving force of the rotating electric machine 11 to the left and right rear wheels WRL and WRR via the left and right output shafts SRL and SRR, and first and second planetary gear units PS1' and PS2' which transmit a torque from the hydraulic motor 13 to the two WRL and WRR in order to adjust the torques of the left and right rear wheels WRL and WRR. The first and second planetary gear units PS1' and PS2', and differential gear DS' are disposed coaxially with the left and right output shafts SRL and SRR, and are arranged between the left and right rear wheels WRL and WRR from the left side in the mentioned order.

The differential gear DS' is formed by a planetary gear unit of the double pinion type, and is comprised of a sun gear SD', a ring gear RD' disposed around an outer periphery of the sun gear SD', a plurality of first pinion gears PD1' (only two of which are shown) in mesh with the sun gear SD', a plurality of second pinion gears PD2' (only two of which are shown) in mesh with the first pinion gears PD1' and the ring gear RD', and a carrier CD' rotatably supporting the two pinion gears PD1' and PD2'. The sun gear SD' and the carrier CD' are connected to the left and right output shafts SRL and SRR, respectively. A gear GR is integrally formed on an outer periphery of the ring gear RD'. Further, the number of gear teeth of the sun gear SD' is set to a value equal to a half of the number of gear teeth of the ring gear RD'.

The first planetary gear unit PS1' is formed by a planetary gear unit of the single pinion type, and is comprised of a first sun gear S1', a first ring gear R1' disposed around an outer periphery of the first sun gear S1', a plurality of first pinion gears P1' (only two of which are shown) in mesh with the first sun gear S1' and the first ring gears R1', and a rotatable first carrier C1' rotatably supporting the first pinion gears P1'. The first sun gear S1' is fixed to an immovable casing CA', and the first carrier C1' is connected to the left output shaft SRL. With the above arrangement, the left output shaft SRL, the sun gear SD' of the differential gear DS', and the first carrier C1' of the first planetary gear unit PS1' are rotatable in unison with each other.

Similar to the first planetary gear unit PS1', the second planetary gear unit PS2' is formed by a planetary gear unit of the single pinion type. A gear GS is mounted on a second sun gear S2' of a second sun gear S2' of the second planetary gear unit PS2' via a hollow cylindrical first rotating shaft. The second sun gear S2' and the gear GS are rotatable in unison with each other. Further, in the second planetary gear unit PS2', a plurality of second pinion gears P2' (only two of which are shown) in mesh with the second sun gear S2' are rotatably supported by a second carrier C2', and the second carrier C2' is connected to the carrier CD' of the differential gear DS' via a hollow cylindrical second rotating shaft. The left output shaft SRL is rotatably fitted inside the second rotating shaft and the above-mentioned first rotating shaft is rotatably fitted outside the second rotating shaft, respectively.

With the above arrangement, the right output shaft SRR, the carrier CD' of the differential gear DS', and the second carrier C2' of the second planetary gear unit PS2' are rotatable in unison with each other. Furthermore, a second ring gear R2' in mesh with the second pinion gears P2' is connected to the first ring gear R1' of the first planetary gear unit PS1' via a hollow cylindrical rotating shaft. The two R1' and R2' are rotatable in unison with each other. Further, the numbers of gear teeth of the first and second sun gears S1' and S2' are set to the same value, and the numbers of gear teeth of the first and second ring gears R1' and R2' are set to the same value.

The rotor 11b of the rotating electric machine 11 is coaxially connected to the input shaft 14a of the hydraulic pump 14, and a gear G is coaxially mounted on the input shaft 14a. The gear G is in mesh with a first idler gear IG1. Further, the first idler gear IG1 is in mesh with the above-mentioned gear GR of the differential gear DS'. The number of gear teeth of the gear G is smaller than the number of gear teeth of the gear GR.

Further, a gear 13e is coaxially mounted on the output shaft 13a of the hydraulic motor 13, and is in mesh with a second idler gear IG2. Further, the second idler gear IG2 is in mesh with the above-mentioned gear GS of the second planetary gear unit PS2'. The number of gear teeth of the gear 13e is smaller than the number of gear teeth of the gear GS.

Similar to the first embodiment, the operation modes of the power plant 51 constructed as above include the normal mode, the AWD mode, the SH mode, the LSD mode, and the bad road traveling-time LSD mode. Hereinafter, a brief description will be sequentially given of these operation modes.

[Normal Mode (See FIGS. 40 and 41)]

Figure 40:
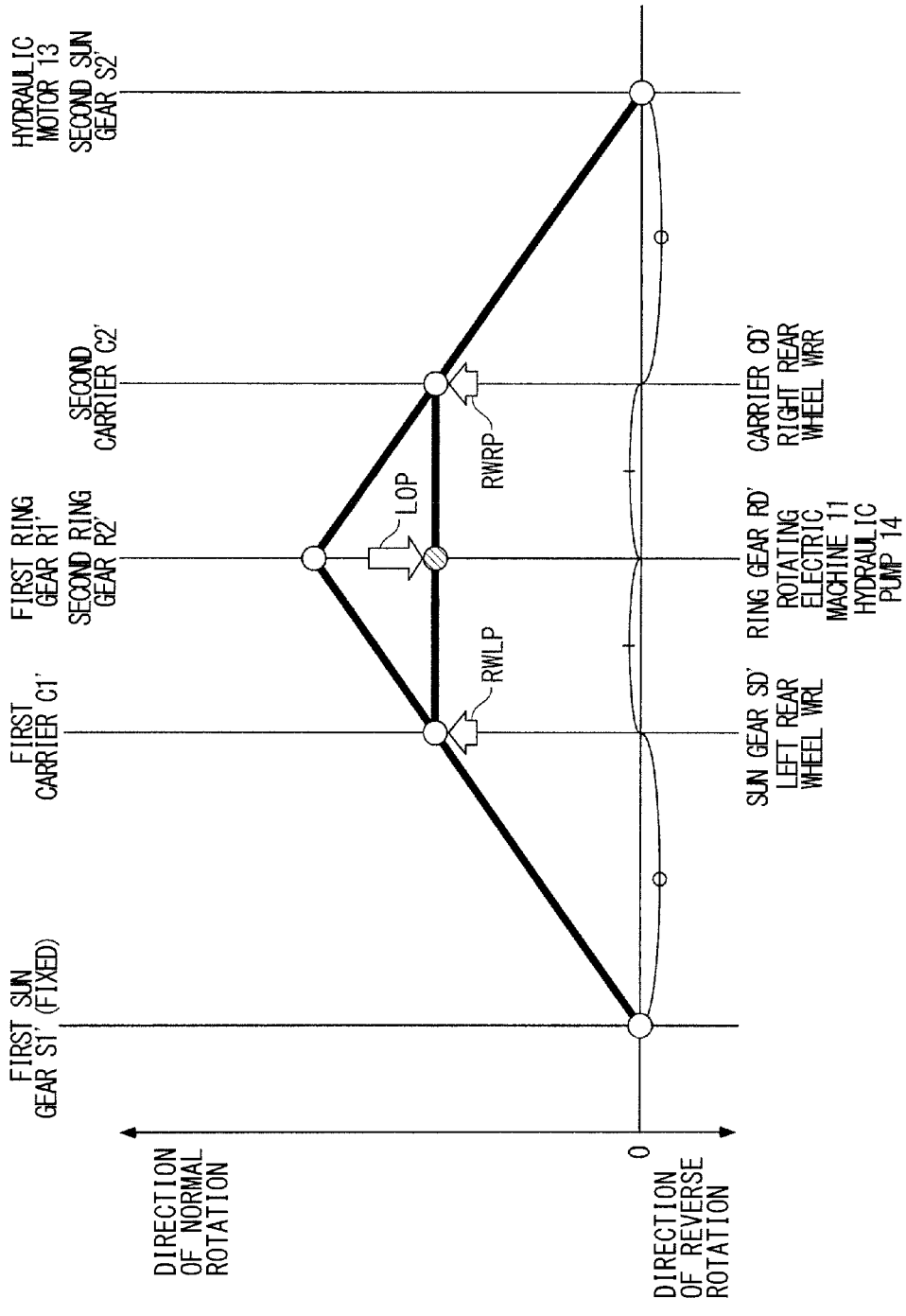
FIG. 40 A diagram of a speed collinear chart showing an example of a rotational speed relationship and a torque balance relationship between various types of rotary elements of the power plant in FIG. 39, as to during the normal mode and also during the straight forward traveling of the vehicle.

FIG. 40 is a diagram of a speed collinear chart showing a rotational speed relationship and a torque balance relationship between various types of rotary elements, such as the rotating electric machine 11 and the sun gear SD' of the transmission system 52, as to during the normal mode and also during the straight forward traveling of the vehicle V. As is apparent from the above-described connection relationship and meshing relationship between the various types of rotary elements, in the differential gear DS', the rotational speed of the sun gear SD', the rotational speed of the ring gear RD', and the rotational speed of the carrier CD' satisfy a collinear relationship in which the rotational speeds are aligned in the same straight line in a collinear chart in the mentioned order. Further, the rotational speed of the sun gear SD' is equal to the rotational speed of the left rear wheel rotational speed NWRL, and the rotational speed of the carrier CD' is equal to the right rear wheel rotational speed NWRR. Furthermore, the rotational speed of the rotating electric machine 11 and the rotational speed of the hydraulic pump 14 are equal to each other. The rotational speed of the ring gear RD' is equal to the rotational speed of the rotating electric machine 11 and the rotational speed of the hydraulic pump 14, provided that reduction in speed by the gear G and the gear GR is ignored.

Further, in the first planetary gear unit PS1', the rotational speed of the first sun gear S1', the rotational speed of the first carrier C1', and the rotational speed of the first ring gear R1' satisfy a collinear relationship in which the rotational speeds are aligned in the same straight line in a collinear chart in the mentioned order. In the second planetary gear unit PS2', the rotational speed of the second sun gear S2', the rotational speed of the second carrier C2', and the rotational speed of the second ring gear R2' satisfy a collinear relationship in which the rotational speeds are aligned in the same straight line in a collinear chart in the mentioned order. Furthermore, since the first sun gear S1' is fixed to the casing CA, the rotational speed thereof is always equal to 0, and the rotational speeds of the first and second carriers C1' and C2' are equal to the left rear wheel rotational speed NWRL and the right rear wheel rotational speed NWRR, respectively. Further, the rotational speeds of the first and second ring gears R1' and R2' are equal to each other, and provided that reduction in speed by the gear 13e and the gear GS is ignored, the rotational speed of the second sun gear S2' and the rotational speed of the hydraulic motor 13 are equal to each other. In this case, differently from the first embodiment, the output shaft 13a of the hydraulic motor 13 is rotating clockwise, as viewed in FIGS. 3 and 10, when the rotational direction thereof is the direction of the normal rotation, whereas when the rotational direction thereof is the direction of the reverse rotation, the output shaft 13a is rotating counterclockwise, as viewed in FIGS. 3 and 10.

Furthermore, as is apparent from the above-described settings of the numbers of the gear teeth of the various types of gears, in the collinear chart, the distance between the sun gear SD' and the ring gear RD', and the distance between the ring gear RD' and the carrier CD' are equal to each other, and the distance between the first carrier C1' and the first ring gear R1', and the distance between the second carrier C2' and the second ring gear R2' are equal to each other. Therefore, in FIG. 40, the rotational speed of the ring gear RD', the rotational speed of the rotating electric machine 11, the rotational speed of the hydraulic pump 14, and the rotational speeds of the first and second ring gears R1' and R2' are illustrated in the same vertical line. In the figure, a circle with hatching represents the rotational speed of the ring gear RD', the rotational speed of the rotating electric machine 11, and the rotational speed of the hydraulic pump 14, and a white circle represents the rotational speeds of the first and second ring gears R1' and R2'. Further, in the collinear chart, the distance between the first carrier C1' and the first sun gear S1' and the distance between the second carrier C2' and the second sun gear S2' are equal to each other. Note that various parameters (LOP, RWLP, and RERP) in FIG. 40 are as described in the first embodiment.

As shown in FIG. 40, during the normal mode and also during the straight forward traveling of the vehicle V, similar to the first embodiment, the left and right rear wheel rotational speeds NWRL and NWRR become equal to each other, and the rotational speed of the hydraulic motor 13 becomes equal to 0. Further, the control mode of the hydraulic motor 13 is set to the neutral mode, whereby the hydraulic motor 13 enters the neutral state without being operated by the hydraulic pressure from the hydraulic pump 14, so that the torques of the left and right rear wheels WRL and WRR are not adjusted by the hydraulic motor 13, and the pump load torque LOP is distributed to the left and right rear wheels WRL and WRR at 1:1 via the differential gear DS'. In other words, the torque formed by combining the torques of the left and right rear wheels WRL and WRR, which rotate along with driving of the left and right front wheels WFL and WFR by the engine 3, is transmitted to the hydraulic pump 14, whereby the hydraulic pump 14 is driven.

From the above, during the normal mode and also during the straight forward traveling of the vehicle V, similar to the first embodiment, the torques of the left and right rear wheels TRL and TRR become equal to each other. Assuming that the torques of the left and right rear wheels WRL and WRR, which are generated when the left and right front wheels WFL and WFR are driven by the engine 3, are represented by TIL and TIR, and the two TIL and TIR are equal to each other, TRL=TRR=TIL (or TIR)−LOP/2 holds.

Figure 41:
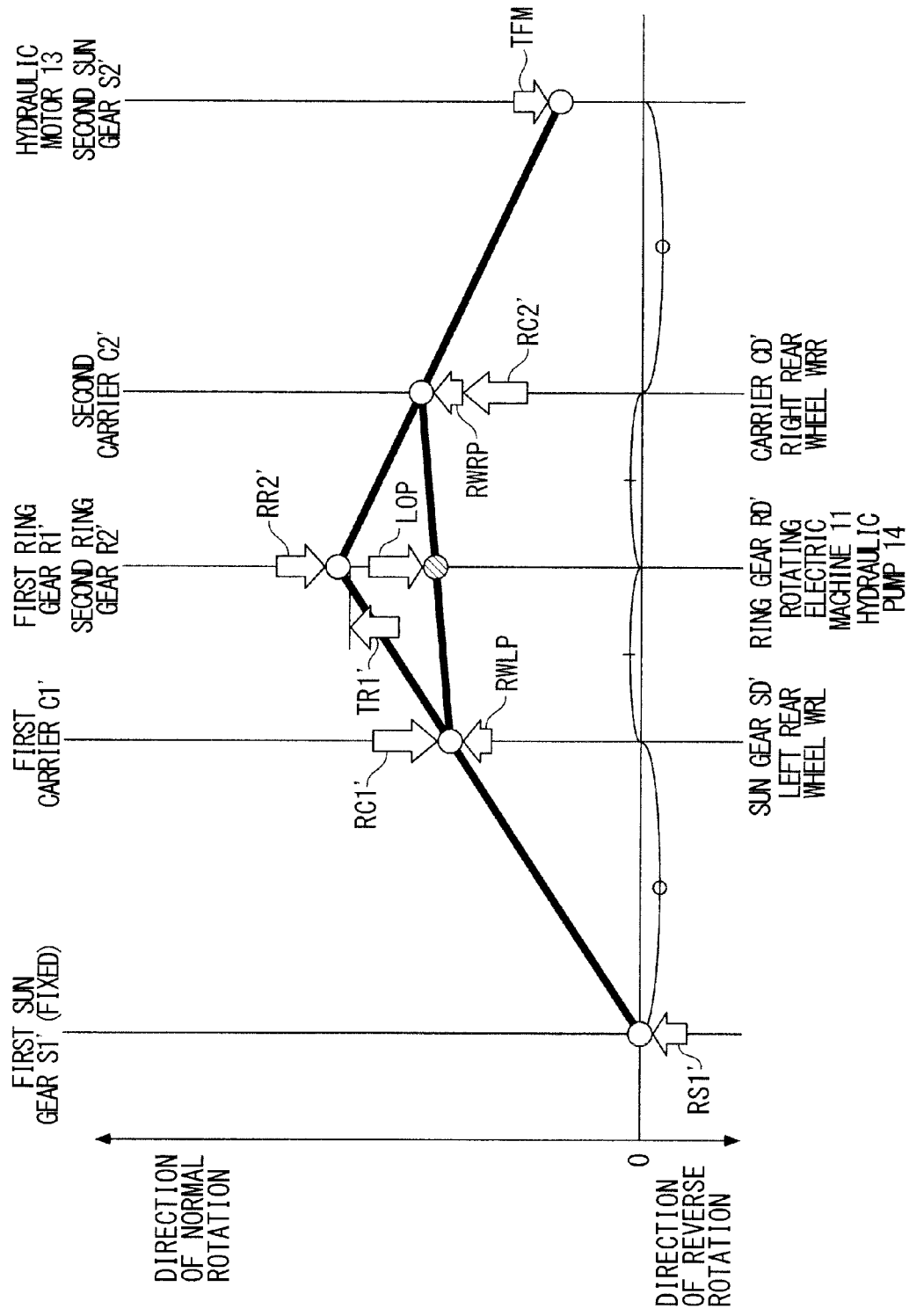
FIG. 41 A diagram of a speed collinear chart showing an example of a rotational speed relationship and a torque balance relationship between the various types of rotary elements of the power plant in FIG. 39, as to during the normal mode and also during left turning of the vehicle.

Further, FIG. 41 shows a rotational speed relationship and a torque balance relationship between the various types of rotary elements as to during the normal mode and also during the left turning of the vehicle V. In the figure, RC2' and RR2' represent reaction force torques acting on the second carrier C2' and the second ring gear R2' along with transmission of the hydraulic motor friction torque TFM to the second sun gear S2', respectively. Further, TR1' represents a torque transmitted to the first ring gear R1' along with transmission of the hydraulic motor friction torque TFM to the second sun gear S2'. RC1' and RS1' represent reaction force torques acting on the first carrier C1' and the first sun gear S1' according to TR1', respectively.

As shown in FIG. 41, during the normal mode, when the vehicle V is turning to the left, the right rear wheel rotational speed NWRR of the right rear wheel WRR which is the outer turning wheel becomes higher than the left rear wheel rotational speed NWRL of the left rear wheel WRL which is the inner turning wheel. Further, the output shaft 13a of the hydraulic motor 13 is driven by the driving force from the right rear wheel WRR to thereby perform normal rotation (clockwise rotation, as viewed in FIG. 10).

As mentioned above, the numbers of the gear teeth of the first and second sun gears S1' and S2' are equal to each other, and the numbers of the gear teeth of the first and second ring gears R1' and R2' are equal to each other. Here, assuming that the number of the gear teeth of the second sun gear S2' is represented by ZS2', and the number of the gear teeth of the second ring gear R2' is represented by ZR2', the relationship of |RC2'|=|(1+ZR2'/ZS2')TFM|=|RC1'| holds, and the relationship of |RR2'|=|(ZR2'/ZS2')TFM|=|TR1'| holds.

As is apparent from the above, during the normal mode and also during the left turning of the vehicle V, along with transmission of the hydraulic motor friction torque TFM (negative torque), a negative torque (braking torque) of RC2'=−(1+ZR2'/ZS2')TFM acts on the right rear wheel WRR which is the outer turning wheel. Further, a positive torque of RC1'=(1+ZR2'/ZS2')TFM acts on the left rear wheel WRL which is the inner turning wheel. In this case as well, the pump load torque LOP is distributed to the left and right rear wheels WRL and WRR at 1:1. As a consequence, during the normal mode and also during the left turning of the vehicle V, the right rear wheel torque TRR is expressed as TRR=TIR−LOP/2−(1+ZR2'/ZS2')TFM, and the left rear wheel torque TRL is expressed as TRL=TIL−LOP/2+(1+ZR2'/ZS2')TFM, so that the left rear wheel torque TRL becomes somewhat larger than the right rear wheel torque TRR (provided TIL=TIR).

On the other hand, although not shown, during the normal mode and also during right turning of the vehicle V, the left rear wheel rotational speed NWRL of the left rear wheel WRL which is the outer turning wheel becomes higher than the right rear wheel rotational speed NWRR of the right rear wheel WRR which is the inner turning wheel. Further, the output shaft 13a of the hydraulic motor 13 is driven by the driving force from the left rear wheel WRL to thereby perform reverse rotation (counterclockwise rotation, as viewed in FIG. 10).

In this case as well, the relationship of |RC2'|=|(1+ZR2'/ZS2')TFM|=|RC1'| holds, and the relationship of |RR2'|=|(ZR2'/ZS2')TFM|=|TR1'| holds. As is apparent from the above, during the normal mode and also during the right turning of the vehicle V, along with transmission of the hydraulic motor friction torque TFM, a positive torque of RC2'=(1+ZR2'/ZS2')TFM acts on the right rear wheel WRR which is the inner turning wheel, and a negative torque of RC1'=−(1+ZR2'/ZS2')TFM acts on the left rear wheel WRL which is the outer turning wheel. In this case as well, the pump load torque LOP is distributed to the left and right rear wheels WRL and WRR at 1:1. As a consequence, during the normal mode and also during the right turning of the vehicle V, the left rear wheel torque TRL is expressed as TRL=TIL−LOP/2−(1+ZR2'/ZS2')TFM, and the right rear wheel torque TRR is expressed as TRR=TIR−LOP/2+(1+ZR2'/ZS2') TFM, so that the right rear wheel torque TRR becomes somewhat larger than the left rear wheel torque TRL (not shown, provided TIL=TIR).

As described above, during the normal mode and also during turning of the vehicle V, the torque of the inner turning wheel is increased, and the torque of the outer turning wheel is reduced, whereby the former becomes somewhat larger than the latter. In this case, as described above, although the torque difference corresponding to 2(1+ZR2'/ZS2') TFM is generated between the left and right rear wheels WRL and WRR, the hydraulic motor friction torque TFM is very small, as mentioned above, and hence the driver is prevented from feeling a strong sense of incompatibility.

[AWD Mode (See FIG. 42)]

Figure 42:
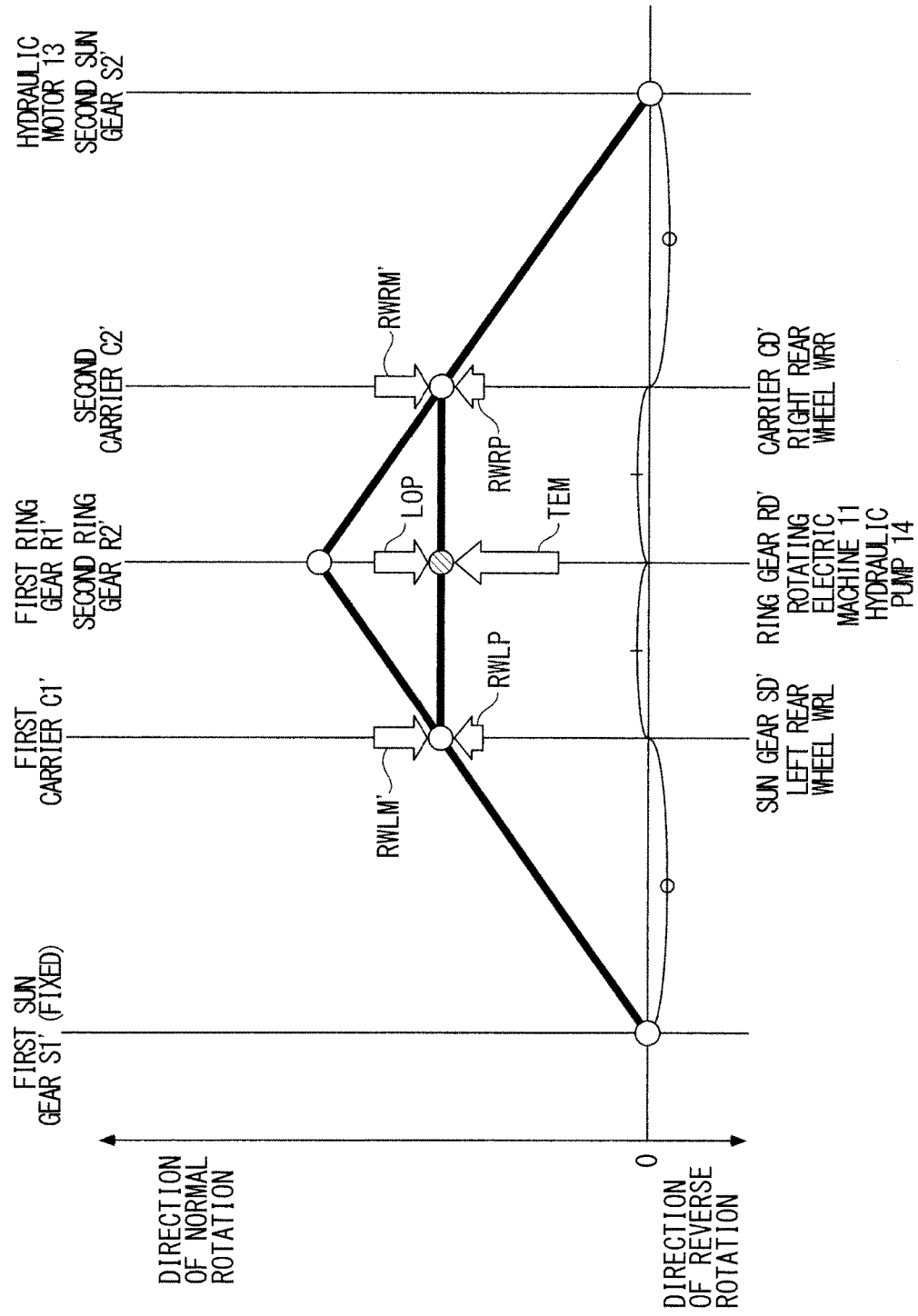
FIG. 42 A diagram of a speed collinear chart showing an example of a rotational speed relationship and a torque balance relationship between the various types of rotary elements of the power plant in FIG. 39, as to during the AWD mode and also during the straight forward traveling of the vehicle.

During the AWD mode, similar to the first embodiment, electric power is supplied to the rotating electric machine 11, and the rotor 11b is caused to perform normal rotation. FIG. 42 shows a rotational speed relationship and a torque balance relationship between the various types of rotary elements as to during the AWD mode and also during the straight forward traveling of the vehicle V. In FIG. 42, RWLM' and RWRM' represent reaction force torques acting on the left and right rear wheels WRL and WRR according to the rotating electric machine output torque TEM, respectively. In this case, the rotating electric machine output torque TEM is larger than the pump load torque LOP.

As is apparent from FIG. 42, a torque formed by combining the rotating electric machine output torque TEM and the pump load torque LOP is distributed to the left and right rear wheels WRL and WRR at 1:1, and the left and right rear wheels WRL and WRR are driven by the rotating electric machine 11. From the above, during the AWD mode, the left rear wheel torque TRL and the right rear wheel torque TRR become equal to each other, and TRL=TRR=TIL (or TIR)+TEM/2−LOP/2 holds.

Note that although not shown, during the AWD mode and also during turning of the vehicle V, similar to the normal mode, the negative torque (braking torque) of −(1+ZR2'/ZS2')TFM acts on the outer turning wheel, and the positive torque of (1+ZR2'/ZS2')TFM acts on the inner turning wheel, whereby the torque of the inner turning wheel becomes larger than the torque of the outer turning wheel. Further, the AWD mode can be used in combination with the SH mode, the LAD mode, and the bad road traveling-time LSD mode.

[SH Mode (See FIG. 43)]

Figure 43:
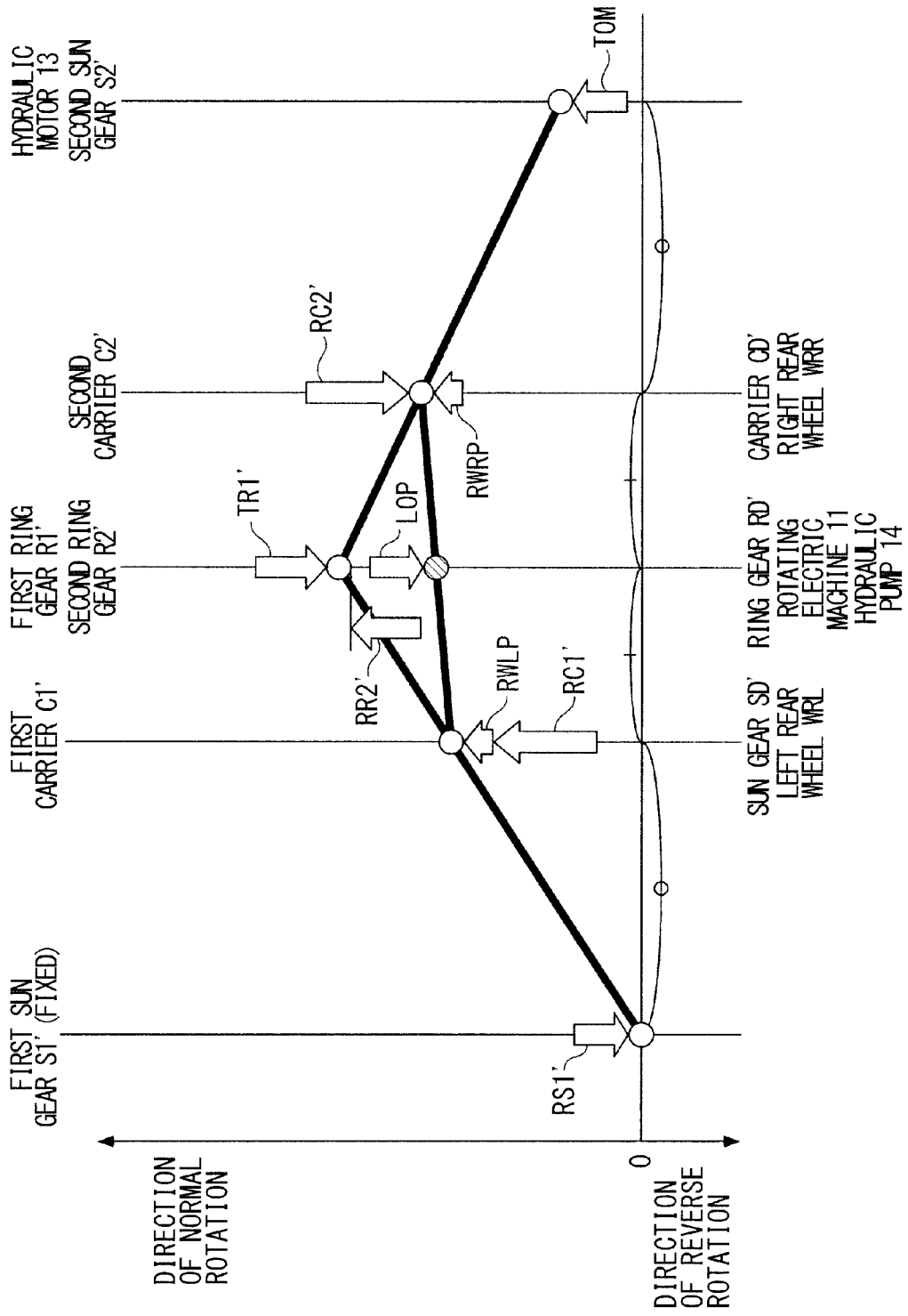
FIG. 43 A diagram of a speed collinear chart showing an example of a rotational speed relationship and a torque balance relationship between the various types of rotary elements of the power plant in FIG. 39, as to during the SH mode and also during the left turning of the vehicle.

During the SH mode, when the vehicle V is turning to the left, the control mode of the hydraulic motor 13 is set to the first motor mode, and the output shaft 13a of the hydraulic motor 13 is caused to perform normal rotation (clockwise rotation, as viewed in FIG. 11). FIG. 43 shows a rotational speed relationship and a torque balance relationship between the various types of rotary elements in this case.

In FIG. 43, RC2' and RR2' represent reaction force torques acting on the second carrier C2' and the second ring gear R2' along with transmission of the hydraulic motor output torque TOM to the second sun gear S2', respectively. Further, TR1' represents a torque transmitted to the first ring gear R1' along with transmission of the hydraulic motor output torque TOM to the second sun gear S2'. RC1' and RS1' represent reaction force torques acting on the first carrier C1' and the first sun gear S1' according to TR1', respectively.

As shown in FIG. 43, during the SH mode and also during the left turning of the vehicle V, the right rear wheel rotational speed NWRR of the right rear wheel WRR which is the outer turning wheel becomes higher than the left rear wheel rotational speed NWRL of the left rear wheel WRL which is the inner turning wheel. Further, the rotational direction of the second sun gear S2' and the rotational direction of the output shaft 13a of the hydraulic motor 13, determined by the left and right rear wheel rotational speeds NWRL and NWRR, become the direction of the normal rotation.

As is apparent from a comparison between FIGS. 43 and 41, during the SH mode and also during the left turning of the vehicle V, along with transmission of the hydraulic motor output torque TOM, a negative torque (braking torque) of $RC1'=-(1+ZR2'/ZS2')TOM$ acts on the left rear wheel WRL which is the inner turning wheel. Further, a positive torque of $RC2'=(1+ZR2'/ZS2')TOM$ acts on the right rear wheel WRR which is the outer turning wheel. In this case as well, the pump load torque LOP is distributed to the left and right rear wheels WRL and WRR at 1:1. As a consequence, during the SH mode and also during the left turning of the vehicle V, the left rear wheel torque TRL is expressed as $TRL=TIL-LOP/2-(1+ZR2'/ZS2')TOM$, and the right rear wheel torque TRR is expressed as $TRR=TIR-LOP/2+(1+ZR2'/ZS2')TOM$, so that the right rear wheel torque TRR becomes larger than the left rear wheel torque TRL (provided TIL=TIR).

On the other hand, during the SH mode, when the vehicle V is turning to the right, the control mode of the hydraulic motor 13 is set to the second motor mode, and the output shaft 13a of the hydraulic motor 13 is caused to perform reverse rotation (counterclockwise rotation, as viewed in FIG. 13). Although a diagram showing a rotational speed relationship and a torque balance relationship between the various types of rotary elements in this case is omitted, the left rear wheel rotational speed NWRL of the left rear wheel WRL which is the outer turning wheel becomes higher than the right rear wheel rotational speed NWRR of the right rear wheel WRR which is the inner turning wheel. Further, the rotational direction of the second sun gear S2' and the rotational direction of the output shaft 13a of the hydraulic motor 13, determined by the left and right rear wheel rotational speeds NWRL and NWRR, become the direction of the reverse rotation.

During the SH mode and also during the right turning of the vehicle V, along with transmission of the hydraulic motor output torque TOM, a positive torque of $RC1'=(1+ZR2'/ZS2')TOM$ acts on the left rear wheel WRL which is the outer turning wheel. Further, a negative torque (braking torque) of $RC2'=-(1+ZR2'/ZS2')TOM$ acts on the right rear wheel WRR which is the inner turning wheel. In this case as well, the pump load torque LOP is distributed to the left and right rear wheels WRL and WRR at 1:1. As a consequence, during the SH mode and also during the right turning of the vehicle V, the right rear wheel torque TRR is expressed as $TRR=TIR-LOP/2-(1+ZR2'/ZS2')TOM$, and the left rear wheel torque TRL is expressed as $TRL=TIL-LOP/2+(1+ZR2'/ZS2')TOM$, so that the left rear wheel torque TRL becomes larger than the right rear wheel torque TRR (provided TIL=TIR).

[LSD Mode (See FIG. 44)]

Figure 44:
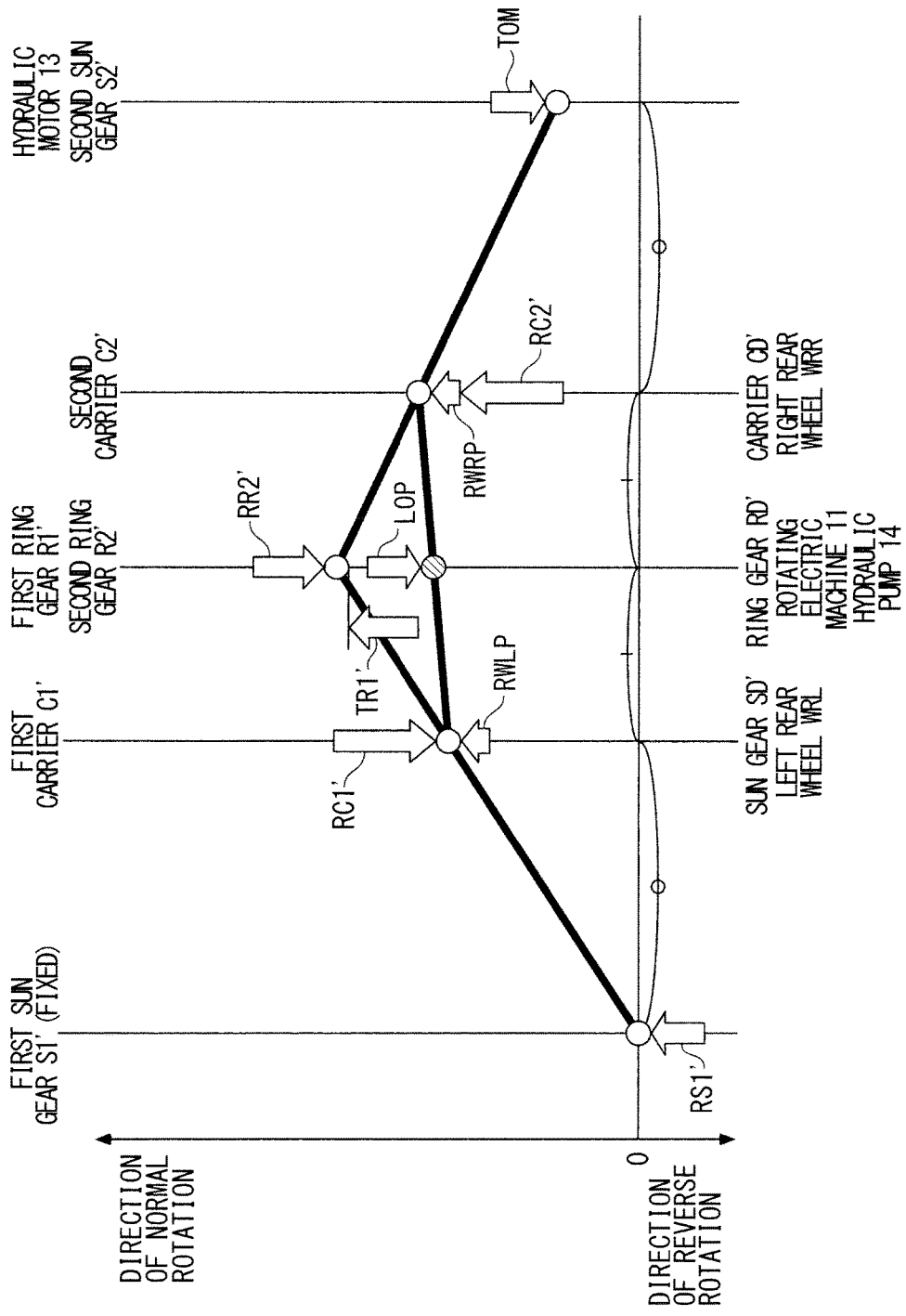
FIG. 44 A diagram of a speed collinear chart showing an example of a rotational speed relationship and a torque balance relationship between the various types of rotary elements of the power plant in FIG. 39, as to during the LSD mode and also during the left turning of the vehicle.

During the LSD mode, when the vehicle V is turning to the left, the control mode of the hydraulic motor 13 is set to the first pump mode, and the hydraulic motor 13 is caused to function as a pump. FIG. 44 shows a rotational speed relationship and a torque balance relationship between the various types of rotary elements in this case. Note that since the hydraulic motor 13 functions as a pump, the hydraulic motor output torque TOM is a negative torque.

As shown in FIG. 44, during the LSD mode and also during the left turning of the vehicle V, similar to the case of FIG. 43, the right rear wheel rotational speed NWRR of the right rear wheel WRR which is the outer turning wheel becomes higher than the left rear wheel rotational speed NWRL of the left rear wheel WRL which is the inner turning wheel. Further, the output shaft 13a of the hydraulic motor 13 is driven by the driving force from the right rear wheel WRR to thereby perform normal rotation (clockwise rotation, as viewed in FIG. 15).

As is apparent from a comparison between FIGS. 44 and 43, during the LSD mode and also during the left turning of the vehicle V, along with transmission of the hydraulic motor output torque TOM, the positive torque of $RC1'=(1+ZR2'/ZS2')TOM$ acts on the left rear wheel WRL which is the inner turning wheel. Further, the negative torque (braking torque) of $RC2'=-(1+ZR2'/ZS2')TOM$ acts on the right rear wheel WRR which is the outer turning wheel. In this case as well, the pump load torque LOP is distributed to the left and right rear wheels WRL and WRR at 1:1. As a consequence, during the LSD mode and also during the left turning of the vehicle V, the right rear wheel torque TRR is expressed as $TRR=TIR-LOP/2-(1+ZR2'/ZS2')TOM$, and the left rear wheel torque TRL is expressed as $TRL=TIL-LOP/2+(1+ZR2'/ZS2')TOM$, so that the left rear wheel torque TRL becomes larger than the right rear wheel torque TRR (provided TIL=TIR).

On the other hand, during the LSD mode, when the vehicle V is turning to the right, the control mode of the hydraulic motor 13 is set to the second pump mode. Although a diagram showing a rotational speed relationship and a torque balance relationship between the various types of rotary elements in this case is omitted, the left rear wheel rotational speed NWRL of the left rear wheel WRL which is the outer turning wheel becomes higher than the right rear wheel rotational speed NWRR of the right rear wheel WRR which is the inner turning wheel. Further, the output shaft 13a of the hydraulic motor 13 is driven by the driving force from the left rear wheel WRL to thereby perform reverse rotation (counterclockwise rotation, as viewed in FIG. 16).

Further, during the LSD mode and also during the right turning of the vehicle V, along with transmission of the hydraulic motor output torque TOM (negative torque), the negative torque (braking torque) of $RC1'=-(1+ZR2'/ZS2')TOM$ acts on the left rear wheel WRL which is the outer turning wheel. Further, the positive torque of $RC2'=(1+ZR2'/ZS2')TOM$ acts on the right rear wheel WRR which is the inner turning wheel. In this case as well, the pump load torque LOP is distributed to the left and right rear wheels WRL and WRR at 1:1. As a consequence, during the LSD mode and also during the right turning of the vehicle V, the left rear wheel torque TRL is expressed as $TRL=TIL-LOP/2-(1+ZR2'/ZS2')TOM$, and the right rear wheel torque TRR is expressed as $TRR=TIR-LOP/2+(1+ZR2'/ZS2')TOM$, so that the right rear wheel torque TRR becomes larger than the left rear wheel torque TRL (provided TIL=TIR).

[Bad Road Traveling-Time LSD Mode (See FIG. 45)]

Figure 45:
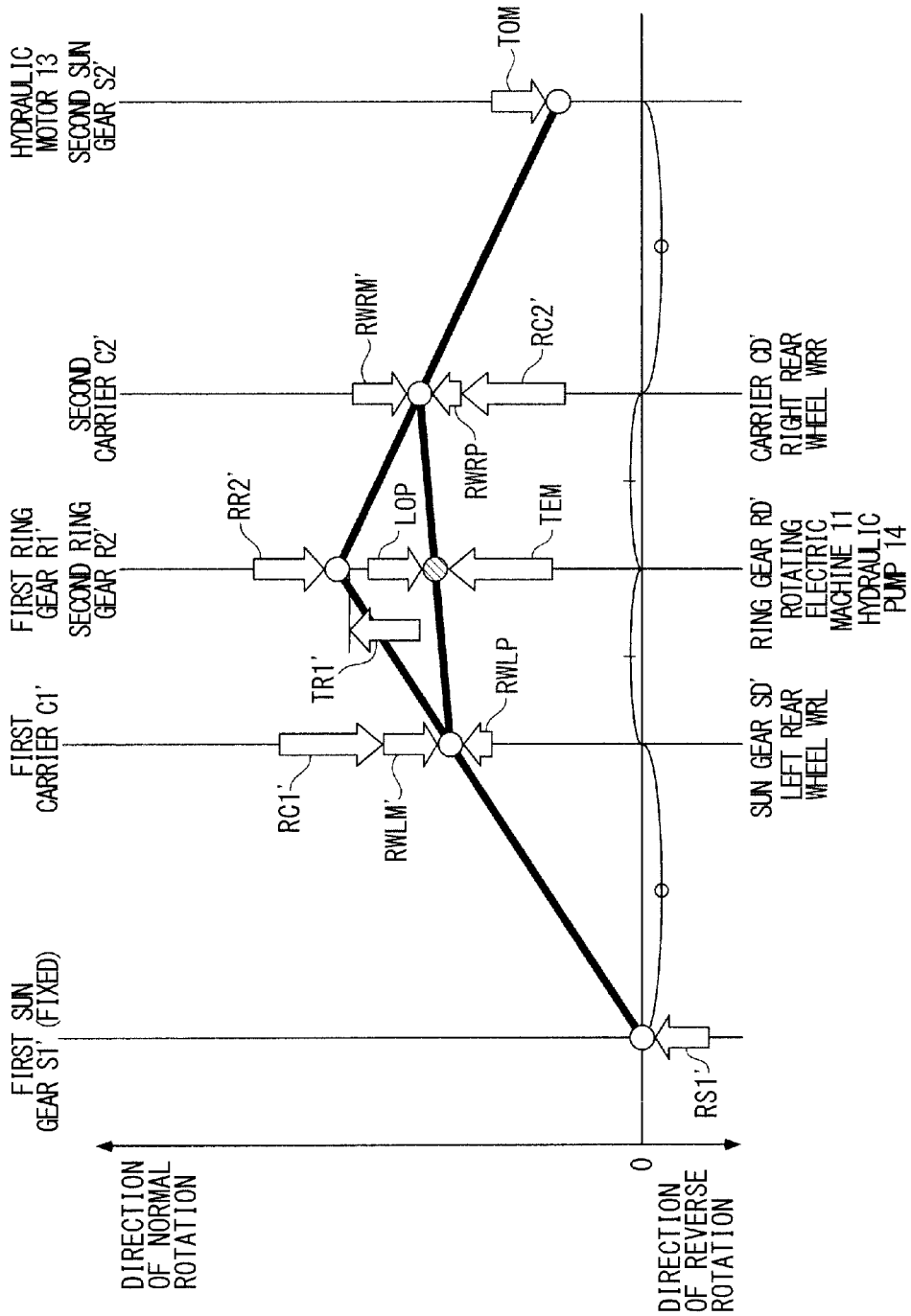
FIG. 45 A diagram of a speed collinear chart showing an example of a rotational speed relationship and a torque balance relationship between the various types of rotary elements of the power plant in FIG. 39, as to during the bad road traveling-time LSD mode and also during the left turning of the vehicle.

During the first BLSD mode (when the right rear wheel WRR is slipping more than the left rear wheel WRL) of the bad road traveling-time LSD mode, when the right rear wheel rotational speed NWRR is higher than the left rear wheel rotational speed NWRL, the control mode of the hydraulic motor 13 is set to the first pump mode. FIG. 45 shows a rotational speed relationship and a torque balance relationship between the various types of rotary elements in a case where during the first BLSD mode, the AWD mode is used as an operation mode in combination.

As shown in FIG. 45, during the first BLSD mode, the right rear wheel rotational speed NWRR becomes higher than the left rear wheel rotational speed NWRL. Further, the output shaft 13$a$ of the hydraulic motor 13 is driven by the driving force from the right rear wheel WRR to thereby perform normal rotation (clockwise rotation, as viewed in FIG. 15).

As is apparent from a comparison between FIGS. 45 and 44, the rotational speed relationship and the torque balance relationship between the various types of rotary elements in this case is basically the same as the rotational speed relationship and the torque balance relationship between the various types of rotary elements as to during the LSD mode and also during the left turning of the vehicle V. Therefore, along with transmission of the hydraulic motor output torque TOM, the positive torque of RC1'=(1+ZR2'/ZS2')TOM acts on the left rear wheel WRL which is not slipping or the degree of slip of which is smaller. Further, the negative torque (braking torque) of RC2'=−(1+ZR2'/ZS2')TOM acts on the right rear wheel WRR which is slipping or the degree of slip of which is larger. In this case, the torque formed by combining the rotating electric machine output torque TEM and the pump load torque LOP is distributed to the left and right rear wheels WRL and WRR at 1:1. As a consequence, during the first BLSD mode, the right rear wheel torque TRR is expressed as TRR=TIR−LOP/2+TEM/2−(1+ZR2'/ZS2')TOM, and the left rear wheel torque TRL is expressed as TRL=TIL−LOP/2+TEM/2+(1+ZR2'/ZS2')TOM, so that the left rear wheel torque TRL becomes larger than the right rear wheel torque TRR (provided TIL=TIR).

Note that although not shown, during the first BLSD mode and also when the AWD mode is not used in combination, the same basic operation is performed although TEM, RWLM', and RWRM' are eliminated. In other words, in this case as well, the positive torque of (1+ZR2'/ZS2')TOM acts on the left rear wheel WRL which is not slipping or the degree of slip of which is smaller, and the negative torque (braking torque) of −(1+ZR2'/ZS2')TOM acts on the right rear wheel WRR which is slipping or the degree of slip of which is larger.

Further, during the second BLSD mode (when the left rear wheel WRL is slipping more than the right rear wheel WRR) of the bad road traveling-time LSD mode, the control mode of the hydraulic motor 13 is set to the second pump mode. Although not shown, the rotational speed relationship and the torque balance relationship between the various types of rotary elements as to during the second BLSD mode are basically the same as those during the LSD mode and also during the right turning of the vehicle V. Therefore, along with transmission of the hydraulic motor output torque TOM (negative torque), the negative torque (braking torque) of −(1+ZR2'/ZS2')TOM acts on the left rear wheel WRL which is slipping or the degree of slip of which is larger. Further, the positive torque of (1+ZR2'/ZS2')TOM acts on the right rear wheel WRR which is not slipping or the degree of slip of which is smaller.

During the second BLSD mode, when the AWD mode is not used in combination, the pump load torque LOP is distributed to the left and right rear wheels WRL and WRR at 1:1, whereas when the AWD mode is used in combination, the torque formed by combining the rotating electric machine output torque TEM and the pump load torque LOP is distributed to the left and right rear wheels WRL and WRR at 1:1. As a consequence, during the second BLSD mode, the torque of the right rear wheel WRR which is not slipping or the degree of slip of which is smaller becomes larger than the torque of the left rear wheel WRL. During the second BLSD mode, when the AWD mode is used in combination, the left rear wheel torque TRL is expressed as TRL=TIL−LOP/2+TEM/2−(1+ZR2'/ZS2')TOM, the right rear wheel torque TRR is expressed as TRR=TIR−LOP/2+TEM/2+(1+ZR2'/ZS2')TOM. When the AWD mode is not used in combination, the left rear wheel torque TRL is expressed as TRL=TIL−LOP/2−(1+ZR2'/ZS2')TOM, and the right rear wheel torque TRR is expressed as TRR=TIR−LOP/2+(1+ZR2'/ZS2')TOM (provided TIL=TIR).

Further, correspondence between the various types of elements of the second embodiment and the various types of elements of the present invention is as follows: The transmission system 52 of the present embodiment corresponds to the differential gear and the motive power transmission member of the present invention, and the ring gear RD', the sun gear SD', and the carrier CD' of the present embodiment correspond to the first to third rotary elements of the present invention, respectively.

Further, in the second embodiment, the control process by the ECU 2 is performed similarly to the first embodiment described with reference to FIG. 34, and hence detailed description thereof is omitted. From the above, according to the second embodiment, it is possible to obtain the same advantageous effects as provided by the first embodiment.

Note that although in the second embodiment, the first sun gear S1' is fixed, and the second sun gear S2' is connected to the hydraulic motor 13, inversely to the above, the first sun gear S1' may be connected to the hydraulic motor 13, and the second sun gear S2' may be fixed. Further, although in the second embodiment, the first sun gear S1' is fixed, the second sun gear S2' is connected to the hydraulic motor 13, and the first and second ring gears R1' and R2' are connected to each other, the first and second sun gears S1' and S2' may be connected to each other, the first ring gear R1' may be fixed, and the second ring gear R2' may be connected to the hydraulic motor 13. That is, in the collinear charts, the positional relationship between the first sun gear S1' and the first ring gear R1', and the positional relationship between the second sun gear S2' and the second ring gear R2' may be reversed, respectively. In this case, the first ring gear R1' may be connected to the hydraulic motor 13, and the second ring gear R2' may be fixed.

Further, although in the second embodiment, the first and second planetary gear units PS1' and PS2' of the single pinion type are used, a differential gear including a pair of bevel gears may be used. Further, although in the second embodiment, the first carrier C1' is connected to a rotary element, as one of three rotary elements formed by the sun gear SD', the ring gear RD', and the carrier CD' of the differential gear DS', which is positioned on the left side in each collinear chart, the first carrier C1' may be connected to one of the three rotary elements, positioned in the center in each collinear chart. Furthermore, although in the second embodiment, the second carrier C2' is connected to a rotary element, as one of three rotary elements, which is positioned on the right side in each collinear chart, the second carrier C2' may be connected to one of the three rotary elements, positioned in the center in each collinear chart. As described above, in the case where the first and second carriers C1' and C2' are connected, the differential gear including a pair of bevel gears is used as the differential gear DS'. Further, in these case as well, the first sun gear S1' may connected to the hydraulic motor 13, and the second sun gear S2' may be fixed, or alternatively, in the collinear charts, the positional relationship between the first sun gear S1' and the first ring gear R1', and the positional relationship between the second sun gear S2' and the second ring gear R2' may be reversed, respectively. In this case, the first ring gear R1' may be connected to the hydraulic motor 13, and the second ring gear R2' may be fixed.

Further, although in the second embodiment, the transmission system 52 is configured such that the torque transmitted from the rotating electric machine 11 and the hydraulic pump 14 to the ring gear RD' is distributed to the left and right rear wheels WRL and WRR at a distribution ratio of 1:1, the transmission system 52 may be configured such that the torque is distributed by unequal distribution.

Note that the present invention is by no means limited to the above-described first and second embodiments (hereinafter, collectively referred to as the "embodiment"), but can be practiced in various forms. For example, although in the embodiment, the transmission systems 12 and 52 are used in which the rotational speeds of the various types of rotary elements thereof satisfy the relationships shown e.g. in FIGS. 19 and 40, there may be used a transmission system that includes first to ninth rotary elements the rotational speeds of which satisfy a relationship shown in FIG. 46. Note that in FIG. 46, the rotational speed of the rotating electric machine, the rotational speed of the hydraulic pump, the rotational speed of the second rotary element, the rotational speed of the sixth rotary element, and the rotational speed of the ninth rotary element are illustrated in the same vertical line. In the figure, a white circle represents the rotational speed of the rotating electric machine, the rotational speed of the hydraulic pump, and the rotational speed of the second rotary element, and a circle with hatching represents the rotational speed of the sixth rotary element and the rotational speed of the ninth rotary element.

Figure 46:
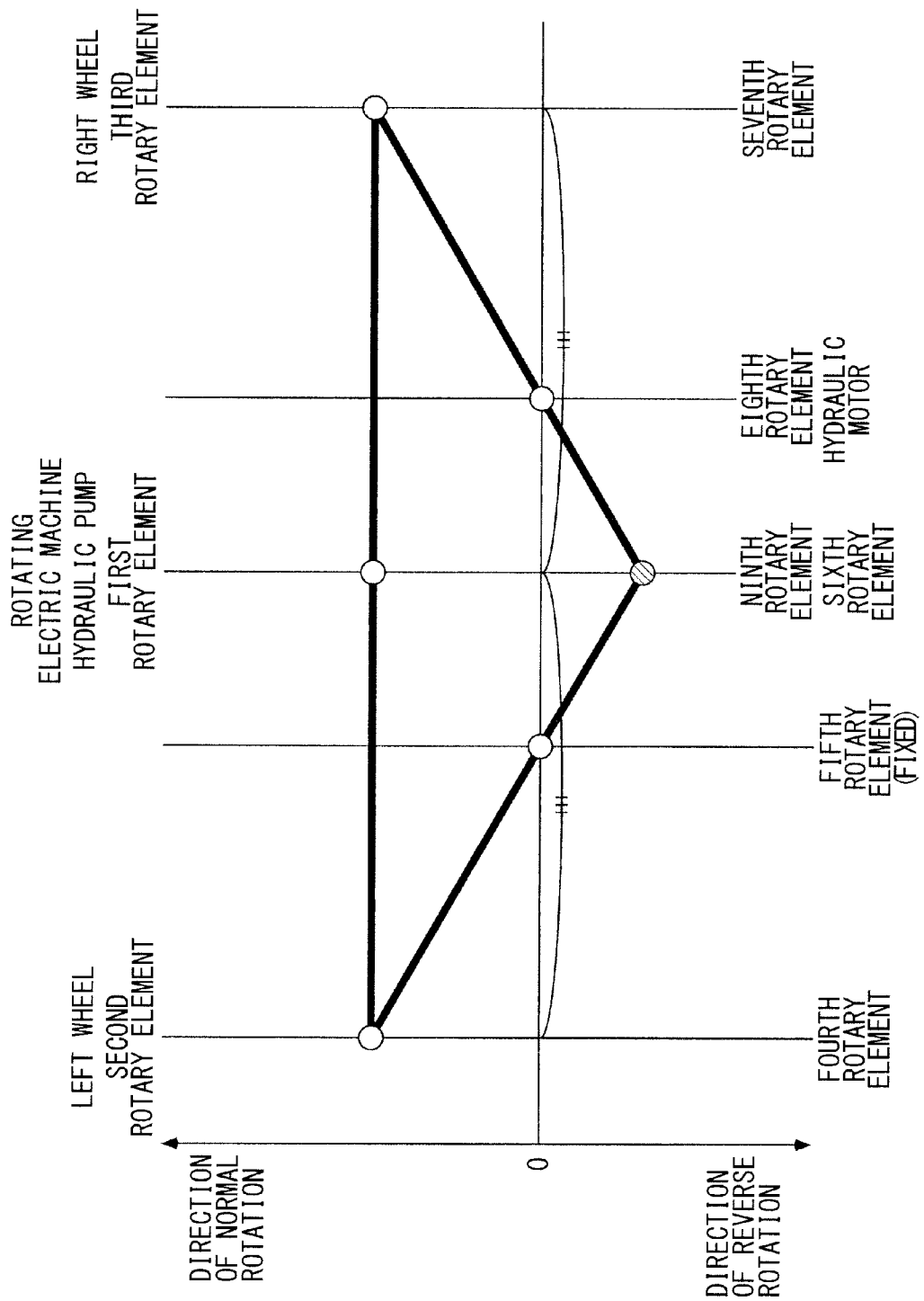
FIG. 46 A diagram of a speed collinear chart showing an example of a rotational speed relationship between various types of rotary elements of a power plant according to a variation.

As shown in FIG. 46, the rotational speeds of the first to third rotary elements, the rotational speeds of the fourth to sixth rotary elements, and the rotational speeds of the seventh to ninth rotary elements satisfy collinear relationships, respectively, and the first and fourth rotary elements are connected to each other, the third and seventh rotary elements are connected to each other, and the sixth and ninth rotary elements are connected to each other. Further, the first rotary element is connected to the rotating electric machine and the hydraulic pump, and the second and third rotary elements are connected to the left and right wheels, respectively. Furthermore, the fifth rotary element is unrotatably fixed, and the eighth rotary element is connected to the hydraulic motor. As is apparent from FIG. 46, a torque transmitted from the rotating electric machine and the hydraulic pump to the second rotary element is distributed to the left and right wheels (the first and third rotary elements) at 1:1. Further, during traveling of the vehicle (during normal rotation of the left and right wheels), by causing the hydraulic motor to generate a torque in the direction of normal rotation, it is possible to increase the torque of the right wheel and reduce the torque of the left wheel, and by causing the hydraulic motor to generate a torque in the direction of reverse rotation, it is possible reduce the torque of the right wheel and increase the torque of the left wheel.

In this case, the hydraulic motor may be connected to the fifth rotary element, and the eighth rotary element may be unrotatably fixed. Alternatively, the fourth rotary element may be connected not to the first rotary element but to the second rotary element. Alternatively, the seventh rotary element may be connected not to the third rotary element but to the second rotary element. Further, although in FIG. 46, a difference between the rotational speed of the fourth rotary element and the rotational speed of the fifth rotary element is larger than a difference between the rotational speed of the fifth rotary element and the rotational speed of the sixth rotary element, inversely to this, the difference between the rotational speed of the fifth rotary element and the rotational speed of the sixth rotary element may be larger than the difference between the rotational speed of the fourth rotary element and the rotational speed of the fifth rotary element. Alternatively, it is to be understood that the differences are equal to each other. Similarly, although a difference between the rotational speed of the seventh rotary element and the rotational speed of the eighth rotary element is larger than a difference between the rotational speed of the eighth rotary element and the rotational speed of the ninth rotary element, inversely to this, the difference between the rotational speed of the eighth rotary element and the rotational speed of the ninth rotary element may be larger than the difference between the rotational speed of the seventh rotary element and the rotational speed of the eighth rotary element. Alternatively, it is to be understood that the differences are equal to each other. Further, although in FIG. 46, the transmission system is configured such that the torque transmitted from the rotating electric machine and the hydraulic pump to the second rotary element is distributed to the first and third rotary elements at a distribution ratio of 1:1, the transmission system may be configured such that the torque is distributed by unequal distribution.

Furthermore, in the case where the transmission system configured as above is employed, a planetary gear unit of the single pinion type, a planetary gear unit of the double pinion type, a differential gear including a pair of bevel gears, or the like can be used for differential gears forming the first to third rotary elements, the fourth to sixth rotary elements, and the seventh to ninth rotary elements, respectively, as deemed appropriate.

Alternatively, the transmission systems 12 and 52 may be replaced by a differential gear which includes the first to third rotary elements the rotational speeds of which are in a collinear relationship with each other, and configured such that when the first to third rotary elements are rotated in the state of the second rotary element being fixed, the rotational speed of the third rotary element becomes higher than the rotational speed of the first rotary element. Further, the first rotary element may be connected to the rotating electric machine, the second and third rotary elements may be connected to one and the other of the left and right wheels, and the third rotary element may be connected to the hydraulic motor. In this case, as the differential gear, it is possible to use a planetary gear unit of the double pinion type, or a differential gear including a pair of bevel gears.

Further, although in the embodiment, the left and right wheels of the present invention are the left and right rear wheels WRL and WRR, they may be the left and right front wheels. Furthermore, although in the embodiment, the drive source of the present invention is the rotating electric machine 11, there may be used any other suitable device which generates a driving force, for example, the internal combustion engine.

Furthermore, although in the embodiment, the hydraulic motor 13 is a vane motor, there may be used any other suitable hydraulic motor, for example, a gear motor. Further, although in the embodiment, the fluid pressure motor of the present invention is the hydraulic motor 13 operated by oil pressure, a motor may be used which is operated by any other suitable fluid pressure. In this case, it is to be understood that in place of the hydraulic pump 14, there is used a fluid pressure supply source which is capable of supplying the other suitable fluid pressure. Further, although in the embodiment, the hydraulic pump 14 is a hydraulic pump of a vane type, there may be used any other suitable hydraulic pump, for example, a hydraulic pump of trochoidal type.

Further, although in the embodiment, the hydraulic pump 14 is used which is driven by motive power of the left and right rear wheels WRL and WRR or motive power of the rotating electric machine 11, an electric pump may be used which is operated by electric power externally supplied. Furthermore, although in the embodiment, the hydraulic pump 14 is shared as an oil supply source for supplying oil to the hydraulic motor 13 and the cooling and lubricating system CL, the hydraulic pump 14 may be shared as an oil supply source for supplying oil to the hydraulic motor 13 and any other suitable device, or alternatively, may be used only as an oil supply source for supplying oil to the hydraulic motor 13. Further, although in the embodiment, both the rotating electric machine 11 and the transmission system 12, 52 are cooled and lubricated by the cooling and lubricating system CL, only one of the two 11, and 12, 52 may be cooled and lubricated. In this case, only one of cooling and lubricating may be performed.

Furthermore, although in the embodiment, the switching valve 33a is a rotary valve, the switching valve 33a may be a spool valve. In this case, the sleeve as the first member of the present invention may be formed into a square hollow cylindrical shape and the valve element as the second member of the present invention may be formed into a prismatic shape, respectively. Further, although in the embodiment, the inflow ports pp, the first and second motor ports pm1 and pm2, the return ports pr, and the LUB ports pl are arranged at equally-spaced intervals in the circumferential direction of the sleeve 33d, they may be arranged at unequally-spaced intervals. Furthermore, although in the embodiment, the rotational angle positions of the valve element 33e are arranged in the order of the first rotational angle position θVA1, the neutral position, and the second rotational angle position θVA2, they may be arranged in any other suitable order.

Further, although in the embodiment, the first oil passage OL1 is shared as a fluid passage for communicating between the hydraulic pump 14 and the first pressure chamber 13b, and a fluid passage for communicating between the hydraulic pump 14 and the second pressure chamber 13c, the fluid passages may be provided separately from each other. Furthermore, although in the embodiment, the same port is shared as a return port pr of one port group and a return port pr of another of the three port groups, the return ports pr may be provided separately from each other.

Further, although in the embodiment, when the valve element 33e is in the neutral position, the first and second motor ports pm1 and pm2 are communicated with each other, they may not be communicated with each other. Furthermore, although in the embodiment, the LUB port pl is formed into a shape of a perfect circle in cross section orthogonal to the axial direction thereof, it is only required that an outer periphery thereof, as viewed from the front of the LUB port pl, is formed into a curved shape. For example, the LUB port pl may be formed into an elliptical shape elongated in the circumferential direction of the sleeve 33d. Further, although in the embodiment, the power plant 1 is applied to the vehicle V provided with the cooling and lubricating system CL by way of example, the power plant 1 may be applied to a vehicle which is not provided with the cooling and lubricating system CL. In this case, it is to be understood that the LUB ports pl and the fifth oil passage OL5 may be eliminated. Furthermore, although in the embodiment, the return means of the present invention is the torsion spring 33c, the return means may be any other suitable means for returning the valve element 33e to the neutral position, for example, a rubber.

Further, although in the embodiment, the hydraulic motor 13 is connected to the left and right rear wheels WRL and WRR via the transmission system 12 or 52, there may be used a so-called repulsion motor, which includes an inner rotor and an outer rotor, as a hydraulic motor, and the inner rotor and the outer rotor may be connected to one and the other of the left and right rear wheels, respectively. In this case, the transmission system 12, 52 as the differential gear of the present invention, and the rotating electric machine 11 as the drive source of the present invention may be eliminated. It is to be understood that the variations of the above embodiment may be combined, as required. It is further understood by those skilled in the art that the foregoing are preferred embodiments of the invention, and that various changes and modifications may be made without departing from the spirit and scope thereof.

REFERENCE SIGNS LIST

V vehicle
WRL left rear wheel (left wheel, one of left and right wheels)
WRR right rear wheel (right wheel, the other of left and right wheels)
1 power plant
2 ECU (drive device)
11 rotating electric machine (drive source)
12 transmission system (differential gear, motive power transmission member)
SD speed reduction sun gear (first rotary element)
SR right sun gear (second rotary element)
SL left sun gear (third rotary element)
13 hydraulic motor (fluid pressure motor)
13b first pressure chamber
13c second pressure chamber
14 hydraulic pump (fluid pressure supply source)
31 reservoir (reservoir)
33a switching valve (fluid passage switching mechanism)
33b actuator (drive device)
33c torsion spring (return means)
33d sleeve (first member)
pp inflow port (first communication port)
pm1 first motor port (second communication port)
pm2 second motor port (third communication port)
pr return port (fourth communication port)
pl LUB port (fifth communication port)
33e valve element (second member)
33h accommodation hole
OL1 first oil passage (fluid supply passage)
OL2 second oil passage (first fluid passage)
OL3 third oil passage (second fluid passage)
OL4 fourth oil passage (fluid discharge passage)
OL5 fifth oil passage (cooling and lubricating fluid passage)
CL cooling and lubricating system (cooled portion and/or lubricated portion)
51 power plant
52 transmission system (differential gear, motive power transmission member)
RD' ring gear (first rotary element)
SD' sun gear (second rotary element)
CD' carrier (third rotary element)

The invention claimed is:

1. A power plant that drives left and right wheels of a vehicle, comprising:
a drive source;
a differential gear that includes a first rotary element mechanically connected to the drive source, a second rotary element mechanically connected to one of the left and right wheels, and a third rotary element mechanically connected to the other of the left and right wheels;
a fluid pressure motor that includes a first pressure chamber and a second pressure chamber which communicate with a fluid pressure supply source for pumping fluid, respectively, and is configured such that fluid pressure is supplied to the first pressure chamber, and the supplied fluid pressure is discharged into the second pressure chamber to thereby apply a positive torque to the third rotary element, and that fluid pressure is supplied to the second pressure chamber, and the supplied fluid pressure is discharged into the first pressure chamber to thereby apply a negative torque to the third rotary element; and
a fluid passage switching mechanism that is arranged on a fluid passage communicating between the fluid pressure supply source and the first pressure chamber and on a fluid passage communicating between the fluid pressure supply source and the second pressure chamber, to switch communication and shutoff of the fluid passages,
wherein the fluid passage switching mechanism includes:
a first member that is provided with a first communication port to which is connected a fluid supply passage communicating with the fluid pressure supply source, a second communication port to which is connected a first fluid passage communicating with the first pressure chamber, a third communication port to which is connected a second fluid passage communicating with the second pressure chamber, and a fourth communication port to which is connected a fluid discharge passage communicating with a reservoir which stores the fluid; and
a second member that is provided in a manner movable to a first position, a second position, and a third position, with respect to the first member, for switching communicating states and shut-off states between the first to fourth communication ports,
wherein the fluid supply passage, the first fluid passage, the second fluid passage, and the fluid discharge passage form the fluid passages,
wherein the fluid passage switching mechanism is configured such that:
when the second member is in the first position, the first communication port and the second communication port are placed in a state communicating with each other, the first communication port and the third communication port are placed in a state communicating with each other, the second communication port and the fourth communication port are placed in a state shut off from each other, and the third communication port and the fourth communication port are placed in a state shut off from each other,
when the second member is in the second position, the first communication port and the second communication port are placed in the state communicating with each other, the first communication port and the third communication port are placed in a state shut off from each other, the second communication port and the fourth communication port are placed in the state shut off from each other, and the third communication port and the fourth communication port are placed in a state communicating with each other, and
when the second member is in the third position, the first communication port and the second communication port are placed in a state shut off from each other, the first communication port and the third communication port are placed in the state communicating with each other, the second communication port and the fourth communication port are placed in a state communicating with each other, and the third communication port and the fourth communication port are placed in the state shut off from each other, and
wherein the first member is provided with a plurality of communication port groups, each formed by the first to fourth communication ports.

2. The power plant according to claim 1, wherein an accommodation hole having a cylindrical curved surface is formed in an inner periphery of the first member,
wherein the second member is formed into a cylindrical shape, and is rotationally movably inserted into the accommodation hole,
wherein the first to fourth communication ports communicate with the accommodation hole,
wherein a degree of communication and a degree of shutoff between the first to fourth communication ports are adjusted according to a rotation movement position of the second member, and
wherein the plurality of communication port groups are arranged in a dispersed manner with respect to a circumferential direction about a rotation movement axis of the second member.

3. The power plant according to claim 2, wherein the plurality of communication port groups are arranged at equally-spaced intervals with respect to the circumferential direction about the rotation movement axis of the second member.

4. The power plant according to claim 1, wherein the fluid supply passage is shared by the fluid passage communicating between the fluid pressure supply source and the first pressure chamber and the fluid passage communicating between the fluid pressure supply source and the second pressure chamber.

5. The power plant according to claim 1, wherein a first communication port group and a second communication port group are included in the plurality of communication port groups, and the same communication port is shared as the fourth communication port of the first communication port group and the fourth communication port of the second communication port group.

6. The power plant according to claim 1, wherein the fluid passage switching mechanism is configured such that when the second member is in the first position, the second communication port and the third communication port are placed in a state communicating with each other.

7. The power plant according to claim 1, wherein the fluid passage switching mechanism further includes:
a drive device for driving the second member from the first position to the second position, and from the first position to the third position; and
return means for returning the second member from the second position to the first position, and from the third position to the first position.

8. The power plant according to claim 1, wherein the first to third positions are arranged in an order of the second position, the first position, and the third position in a direction of movement of the second member with respect to the first member.

9. The power plant according to claim 8, wherein the first member is provided with two fourth communication ports for one communication port group of the plurality of communication port groups, as the fourth communication ports,
wherein one of the two fourth communication ports is placed in a state communicating with the third communication port when the second member is in the second position, and the other of the two fourth communication ports is placed in a state communicating with the second communication port when the second member is in the third position, and
wherein the same fluid discharge passage is shared as a first fluid discharge passage connected to the fourth communication port of the first communication port group and a second fluid discharge passage connected to the fourth communication port of the second communication port group.

10. The power plant according to claim 1, wherein the first member is further provided with a fifth communication port to which are/is connected a motive power transmission member mechanically connected to the drive source and/or a cooling and lubricating fluid passage communicating with a cooled portion and/or a lubricated portion of the drive source.

11. The power plant according to claim 10, wherein the fluid passage switching mechanism is configured such that when the second member is in the first position to the third position, the first communication port and the fifth communication port are placed in a state communicating with each other.

12. The power plant according to claim 11, wherein the fluid passage switching mechanism is configured such that a degree of communication between the first communication port and the fifth communication port as to when the second member is in the second position and when the second member is in the third position becomes smaller than a degree of communication between the first communication port and the fifth communication port as to when the second member is in the first position.

13. The power plant according to claim 10, wherein the fluid passage switching mechanism is configured such that:
when the second member is in the first position, the second communication port and the fifth communication port are placed in a state communicating with each other, and the third communication port and the fifth communication port are placed in a state communicating with each other,
when the second member is in the second position, the second communication port and the fifth communication port are placed in the state communicating with each other, and the third communication port and the fifth communication port are placed in a state shut off from each other, and
when the second member is in the third position, the second communication port and the fifth communication port are placed in a state shut off from each other, and the third communication port and the fifth communication port are placed in the state communicating with each other.

14. The power plant according to claim 10, wherein an outer periphery of the fifth communication port is formed into a curved shape, as viewed from the front of the fifth communication port.

15. The power plant according to claim 1, wherein the fluid pressure supply source is mechanically connected to the drive source.

* * * * *